(12) United States Patent
Kamo

(10) Patent No.: US 6,643,062 B1
(45) Date of Patent: Nov. 4, 2003

(54) FINDER OPTICAL SYSTEM AND IMAGE PICKUP APPARATUS USING THE SAME

(75) Inventor: Yuji Kamo, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/657,517

(22) Filed: Sep. 7, 2000

(30) Foreign Application Priority Data

Sep. 7, 1999 (JP) ............................................ 11-252535

(51) Int. Cl.[7] .............................. G02B 23/00; G02B 5/04
(52) U.S. Cl. ........................ 359/431; 359/432; 359/831
(58) Field of Search ................................ 359/362, 399, 359/405–410, 422–432, 676–677, 690–691, 831–837, 708, 629–634; 396/373–386

(56) References Cited

U.S. PATENT DOCUMENTS

| 5,231,534 A |  | 7/1993 | Kato | 359/432 |
| 5,323,264 A |  | 6/1994 | Kato | 359/432 |
| 6,178,052 B1 | * | 1/2001 | Aoki et al. | 359/730 |
| 6,259,564 B1 | * | 7/2001 | Kamo | 359/627 |

FOREIGN PATENT DOCUMENTS

| EP | 0 722 106 | 7/1996 |
| JP | 10-197796 | 7/1998 |
| JP | 11-38472 | 2/1999 |
| JP | 11-38473 | 2/1999 |

* cited by examiner

Primary Examiner—Thong Nguyen
(74) Attorney, Agent, or Firm—Pillsbury Winthrop LLP

(57) ABSTRACT

A high-performance real-image finder optical system reduced in size, particularly in thickness, includes a positive objective optical system, an image-inverting optical system for erecting an intermediate image formed by the objective optical system, and a positive ocular optical system. The objective optical system has at least two movable units moving when zooming is performed. A prism is placed on the object side of the intermediate image. At least one reflecting surface of the prism has a rotationally asymmetric surface configuration. At least one reflecting surface of the image-inverting optical system is formed from a roof surface. The finder optical system satisfies the following condition:

$$1.0 < d/(f_W \cdot \tan\theta_W \cdot Z) < 2.5$$

where d is the distance from the entrance surface of the objective optical system to the first reflecting surface of the image-inverting optical system; $f_W$ is the focal length of the objective optical system at the wide-angle end; $\theta_W$ is the maximum field angle of the objective optical system at the wide-angle end; and Z is a zoom ratio.

57 Claims, 16 Drawing Sheets

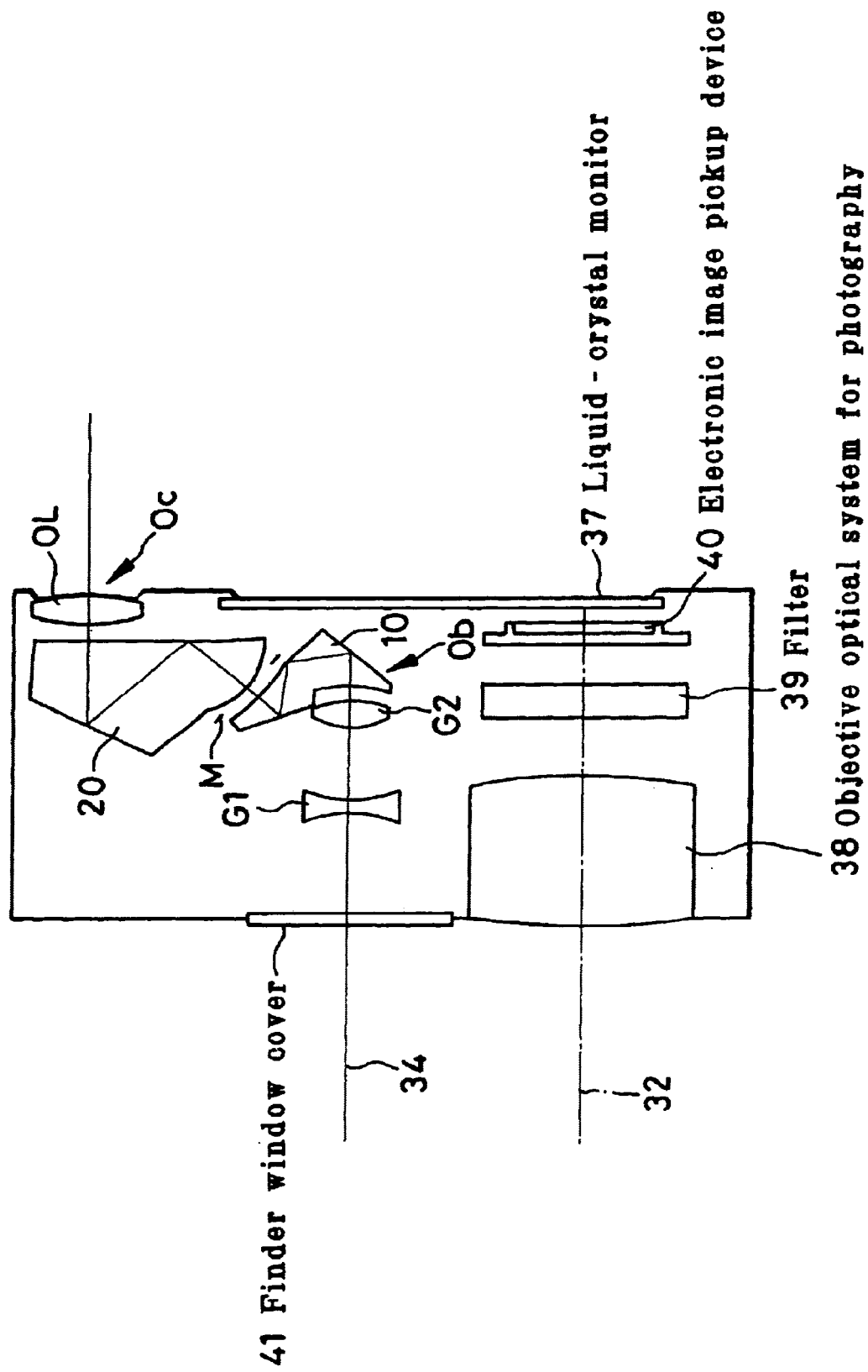

FINDER OPTICAL SYSTEM AND IMAGE PICKUP APPARATUS USING THE SAME

This application claims benefit of Japanese Application No. Hei 11-252535 filed in Japan on Sep. 7, 1999, the contents of which are incorporated by this reference.

BACKGROUND OF THE INVENTION

The present invention relates to a finder optical system having an image-inverting optical system. More particularly, the present invention relates to a finder optical system for use in a camera, a video camera, etc. which uses an image-inverting optical system whereby an inverted image of an object formed by an objective optical system is observed as an erect image. The present invention also relates to an image pickup apparatus using the finder optical system.

A finder optical system used in a compact camera or the like is constructed separately from a photographic optical system and generally placed above the photographic optical system. Among finder optical systems of this type, real-image finders are well known, in which a real image formed as a first image by an objective optical system is inverted by an image-inverting optical system and observed as an erect image through an ocular optical system.

Recently, it has been demanded that compact cameras should be further reduced in size, particularly in thickness, i.e. size in the direction of the optical axis. In a zoom lens, zooming is performed by varying the spacing between lens units. Therefore, if the zoom lens is arranged to attain a higher zoom ratio, the zoom lens basically becomes large in size in the direction of the entering optical axis. In the case of taking lenses, therefore, schemes have been devised for the lens mount structure to attain a reduction in thickness. That is, when not used for photography, the taking lens is stored with the zooming spaces reduced (this system will hereinafter be referred to as the "collapsible barrel").

In the case of finder optical systems, however, the collapsible barrel system as used in taking lenses is unfavorable from the viewpoint of camera design. Therefore, it is very difficult to reduce the thickness of finder optical systems. This is an obstacle in attaining a reduction in size of cameras.

Cameras have also been demanded to provide a higher zoom ratio. Therefore, it is also necessary to form a finder optical system from an increased number of optical units in order to ensure the required performance. However, if the number of optical units is increased, the sum total of the thicknesses of lenses increases. Therefore, such a finder optical system arrangement is not always favorable for attaining a reduction in thickness.

As a conventional technique, Japanese Patent Application Unexamined Publication Number [hereinafter referred to as "JP(A)"] Hei 5-53054 has, in order from the object side, a negative first unit, a positive second unit, and a negative third unit. The first and second units move for zooming. The negative third unit, which is stationary, ensures the negative power by refraction through a refracting lens or a prism entrance surface. The optical system attains a reduction in overall length by disposing a negative unit closest to the pupil.

Meanwhile, it has heretofore been common practice to use a plane, powerless surface as a reflecting surface of an image-inverting optical system. Accordingly, there have been made some propositions that a reflecting surface of a prism or a mirror constituting an image-inverting optical system is given a power so as to have the function of an objective optical system or the function of an ocular optical system, thereby attaining a reduction in size.

JP(A) Hei 8-248481 used a rotationally symmetric curved surface as a reflecting surface of a prism in a real-image finder. Although it is stated that an aspherical surface or a toric surface is applicable to the curved surface, the curved surface disclosed in the specification is a rotationally symmetric aspherical surface. In general, a toric surface is symmetric with respect to two coordinate axes. Therefore, it is not an asymmetric surface. No numerical values are mentioned in regard to the amounts of displacement of reflecting surfaces in Examples.

JP(A) Hei 10-197796-uses a rotationally asymmetric curved surface in an image-inverting optical system of a real-image finder optical system. However, almost all Examples of this finder optical system fail to disclose design examples. Therefore, the performance, size, etc. of the finder optical system are unclear. Numerical Example 5 of this finder optical system uses rotationally asymmetric curved surfaces as refracting and reflecting surfaces of a prism in the finder optical system. In addition, the image-inverting optical system is arranged to have the function of an ocular lens, thereby reducing the number of lenses used.

JP(A) Hei 11-38472 and 11-38473 use a rotationally asymmetric surface as a reflecting surface of one of Porro prisms of a real-image finder that is disposed on the object side of the intermediate image formation plane, thereby attaining a reduction in the thickness of the finder optical system.

However, these prior art optical systems suffer from various problems as stated below.

In JP(A) Hei 5-53054, if a strong power is given to the negative third unit, the positive power of the second unit unavoidably needs to be increased in order to ensure the required power, which is unfavorable from the viewpoint of performance. For this reason, a very strong power cannot be given to the third unit. Therefore, the effect of reducing the overall length is limited. Moreover, an optical system having a power cannot be placed on the pupil side of the third unit, and it is therefore necessary to ensure a long back focus. For this reason, the basic structure of the optical system is the retrofocus type. Accordingly, it is still difficult to reduce the overall length of the optical system.

In JP(A) Hei 8-248481, a power is given to a reflecting surface of a prism. However, because this reflecting surface is tilted so as to be decentered with respect to the axial principal ray, rotationally asymmetric decentration aberrations are produced. The aberrations cannot be corrected by the rotationally symmetric aspherical surface configuration. At the toric surface also, aberration correction with respect to skew rays cannot satisfactorily be performed. In this regard, no solution means is disclosed for any of the arrangements of this optical system. Thus, the disclosed optical system is unsatisfactory in terms of performance. Furthermore, the size of the optical system is unclear from the numerical values mentioned in the specification.

JP(A) Hei 10-197796 states a layout and arrangement of prisms, etc. that seem to allow the finder optical system to be reduced in size. However, no consideration is given in terms of performance. Therefore, the disclosed technique lacks feasibility. In Numerical Example 5, a reduction in thickness is attained by reducing the number of lenses constituting the ocular optical system. Accordingly, the objective optical system itself cannot be reduced in thickness. When the optical system is arranged to attain a higher zoom ratio, it is difficult to reduce the thickness satisfactorily.

In JP(A) Hei 11-38472 and 11-38473, the prisms are large in size although the spacing between the movable lens units is reduced. Accordingly, the overall size of the finder optical system, including the prism arrangement, has not yet been reduced satisfactorily.

Thus, all the prior art optical systems have problems to be solved in terms of performance or size. A compact and high-performance finder that simultaneously satisfies the demands for high performance and size reduction has not yet been attained.

SUMMARY OF THE INVENTION

In view of the above-described problems with the prior art, an object of the present invention is to provide a high-performance real-image finder optical system reduced in size, particularly reduced in thickness.

To attain the above-described object, the present invention provides a first finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes at least one reflecting surface having a rotationally asymmetric surface configuration. The image-inverting optical system has at least one reflecting surface formed from a roof surface. The finder optical system satisfies the following condition:

$$1.0 < d/(f_W \cdot \tan \theta_W \cdot Z) < 2.5 \quad (1)$$

where d is the distance from the entrance surface of the objective optical system to the first reflecting surface of the image-inverting optical system; $f_W$ is the focal length of the objective optical system at the wide-angle end; $\theta_W$ is the maximum field angle of the objective optical system at the wide-angle end; and Z is a zoom ratio.

In addition, the present invention provides a second finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes at least one reflecting surface having a rotationally asymmetric surface configuration. The image-inverting optical system is formed from a Porro prism. The finder optical system satisfies the following conditions:

$$1.0 < d/(f_W \cdot \tan \theta_W \cdot Z) < 2.5 \quad (3)$$

$$0.5 < dp/(f_W \tan \theta_W) < 1.1 \quad (4)$$

where d is the distance from the entrance surface of the objective optical system to the first reflecting surface of the image-inverting optical system; $f_W$ is the focal length of the objective optical system at the wide-angle end; $\theta_W$ is the maximum field angle of the objective optical system at the wide-angle end; Z is a zoom ratio; and dp is the distance from the entrance surface of the image-inverting optical system placed on the object side of the intermediate image to the first reflecting surface.

In addition, the present invention provides a third finder optical system that includes, in order from the object side thereof: an objective optical system having a positive refracting power; an image-inverting optical system for erecting an intermediate image formed by the objective optical system; and an ocular optical system having a positive refracting power. The objective optical system includes an optical system having at least two movable units moving when zooming is performed. The optical system has a positive composite power. A prism is placed on the pupil side of the optical system having at least two movable units. The prism includes an image-inverting function. The prism includes at least one reflecting surface having a rotationally asymmetric surface configuration. At least either one of the first transmitting surface and first reflecting surface of the prism has a negative power. The second transmitting surface of the prism has a positive power.

In addition, the present invention provides a fourth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism has two reflecting surfaces. At least one of the reflecting surfaces has a rotationally asymmetric surface configuration. The finder optical system satisfies the following condition:

$$0.5 < dp/(f_W \cdot \tan \theta_W) < 1.1 \quad (9)$$

where $f_W$ is the focal length of the objective optical system at the wide-angle end; $\theta_W$ is the maximum field angle of the objective optical system at the wide-angle end; and dp is the distance from the entrance surface of the image-inverting optical system placed on the object side of the intermediate image to the first reflecting surface thereof.

In addition, the present invention provides a fifth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism has three reflecting surfaces. At least one of the reflecting surfaces has a rotationally asymmetric surface configuration.

In addition, the present invention provides a sixth finder optical system that includes, in order from the object side thereof: an objective optical system having a positive refracting power; an image-inverting optical system for erecting an intermediate image formed by the objective optical system; and an ocular optical system having a positive refracting power. The objective optical system includes, in order from the object side thereof, a negative first unit, a positive second unit, and a negative third unit. At least the first unit and the second unit are movable units moving when zooming is performed. The third unit is formed from a prism including an image-inverting function. The prism includes at least one reflecting surface having a rotationally asymmetric surface configuration.

In addition, the present invention provides a seventh finder optical system that includes, in order from the object side thereof: an objective optical system having a positive refracting power; an image-inverting optical system for erecting an intermediate image formed by the objective optical system; and an ocular optical system having a positive refracting power. The objective optical system includes, in order from the object side thereof, a negative first unit, a positive second unit, and a positive third unit. At least the first unit and the second unit are movable units moving when zooming is performed. The third unit is formed from a prism including an image-inverting function. The prism includes at least one reflecting surface having a rotationally asymmetric surface configuration. The prism includes at least one transmitting surface or reflecting surface that has a negative power. The third unit has a principal point positioned on the pupil side of a plane where the intermediate image is formed.

An eighth finder optical system according to the present invention includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes two reflecting surfaces. At least one of the reflecting surfaces has a rotationally asymmetric surface configuration. The first transmitting surface and second reflecting surface of the prism are formed from the identical surface having both transmitting and reflecting actions. The prism has an optical path in which the axial principal ray or a projective axial principal ray defined by projecting the axial principal ray onto a plane containing a part of the axial principal ray bends in different directions from each other with respect to the travel direction of light rays at the two reflecting surfaces.

In addition, the present invention provides a ninth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes two reflecting surfaces. Both of the reflecting surfaces are independent of other transmitting and reflecting surfaces. At least one of the reflecting surfaces has a rotationally asymmetric surface configuration. The prism has an optical path in which the axial principal ray or a projective axial principal ray defined by projecting the axial principal ray onto a plane containing a part of the axial principal ray bends in the same direction with respect to the travel direction of light rays at the two reflecting surfaces. The finder optical system satisfies the following condition:

$$0.5 < dp/(f_W \cdot \tan \theta_W) < 1.1 \qquad (21)$$

where dp is the distance from the entrance surface of the image-inverting optical system placed on the object side of the intermediate image to the first reflecting surface thereof; $f_W$ is the focal length of the objective optical system at the wide-angle end; and $\theta_W$ is the maximum field angle of the objective optical system at the wide-angle end.

In addition, the present invention provides a tenth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes three reflecting surfaces. All of the reflecting surfaces are independent of other transmitting and reflecting surfaces. At least one of the reflecting surfaces has a rotationally asymmetric surface configuration. The prism has an optical path in which the axial principal ray or a projective axial principal ray defined by projecting the axial principal ray onto a plane containing a part of the axial principal ray bends in the same direction with respect to the travel direction of light rays at two consecutive reflecting surfaces and bends in a direction different from the above-mentioned direction at the other reflecting surface.

In addition, the present invention provides an eleventh finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes three reflecting surfaces. At least one of the reflecting surfaces has a rotationally asymmetric surface configuration. The first reflecting surface and third reflecting surface of the prism are independent of other transmitting and reflecting surfaces. The second reflecting surface of the prism is formed from the identical surface with the second transmitting surface of the prism. The prism has an optical path in which the axial principal ray or a projective axial principal ray defined by projecting the axial principal ray onto a plane containing a part of the axial principal ray bends in the same direction with respect to the travel direction of light rays at two consecutive reflecting surfaces and bends in a direction different from the above-mentioned direction at the other reflecting surface.

In addition, the present invention provides a twelfth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes three reflecting surfaces. At least one of the reflecting surfaces has a rotationally asymmetric surface configuration. The first reflecting surface and third reflecting surface of the prism are independent of other transmitting and reflecting surfaces. The second reflecting surface of the prism is formed from the identical surface with the first and second transmitting surfaces of the prism. The prism has an optical path in which the axial principal ray or a projective axial principal ray defined by projecting the axial principal ray onto a plane containing a part of the axial principal ray bends at each of the three reflecting surfaces in a direction different from the direction of bending at the preceding reflecting surface with respect to the travel direction of light rays.

In addition, the present invention provides a thirteenth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes three reflecting surfaces. At least one of the reflecting surfaces has a rotationally asymmetric surface configuration. The three reflecting surfaces are all independent of other transmitting and reflecting surfaces. The prism has an optical path in which the axial principal ray or a projective axial principal ray defined by projecting the axial principal ray onto a plane containing a part of the axial principal ray bends in the same direction with respect to the travel direction of light rays at the first reflecting surface and the second reflecting surface and is twisted by the third reflecting surface.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 19 is a ray path diagram showing an optical system of the electronic camera in FIG. 18.

DESCRIPTION OF THE PREFERRED EMBODIMENTS

Figure 1:
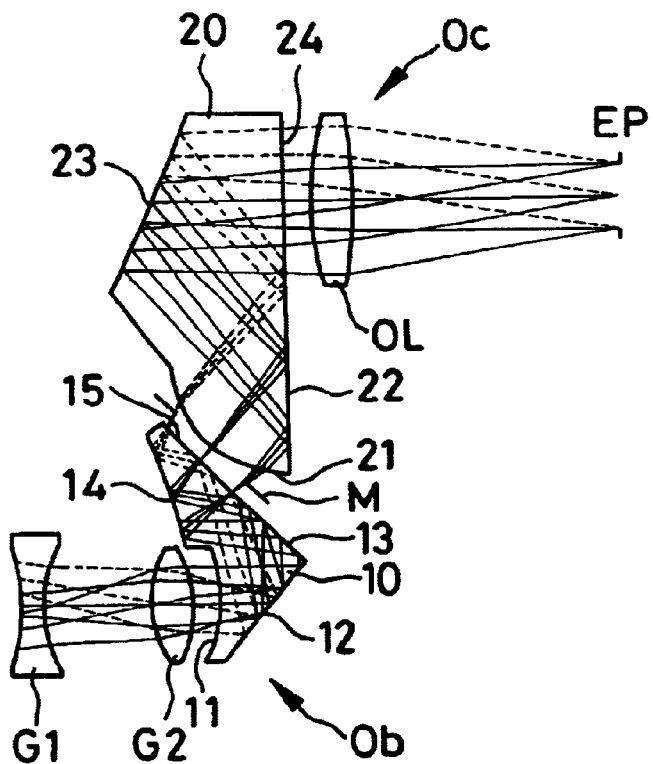
FIG. 1 is a sectional view of a finder optical system according to Example 1 of the present invention at the wide-angle end.

The present invention provides a first finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes at least one reflecting surface having a rotationally asymmetric surface configuration. The image-inverting optical system has at least one reflecting surface formed from a roof surface. The finder optical system satisfies the following condition:

$$1.0 < d/(f_w \cdot \tan \theta_w \cdot Z) < 2.5 \qquad (1)$$

where d is the distance from the entrance surface of the objective optical system to the first reflecting surface of the image-inverting optical system; $f_w$ is the focal length of the objective optical system at the wide-angle end; $\theta_w$ is the maximum field angle of the objective optical system at the wide-angle end; and Z is a zoom ratio.

The function of the first finder optical system will be described below.

In a real-image finder, an image-inverting optical system is generally placed on the pupil side of an objective optical system. Therefore, the objective optical system needs to be arranged in the form a retrofocus type such that the image-inverting optical system can be placed on the pupil side thereof, thereby ensuring the required back focus. However, the retrofocus type arrangement makes it difficult to reduce the overall length of the optical system. Therefore, it is an unfavorable lens arrangement for the attainment of a reduction in size. In addition, because the type of adoptable image-inverting prisms is limited by the amount of back focus, there are cases where the finder optical system cannot be arranged in a compact form.

Therefore, according to the present invention, a power is given to a reflecting surface of the image-inverting optical system. By giving a power to a reflecting surface of the image-inverting optical system, the function of an objective optical system can also be imparted to the image-inverting optical system. As a result, it becomes possible to relax the restriction in terms of the back focus, which is an obstacle in attaining a reduction in size.

It should be noted that if a power is simply given to a decentered reflecting surface, rotationally asymmetric decentration aberrations are produced, and the decentration aberrations cannot, be corrected by a rotationally symmetric aspherical surface or the like. Therefore, it is necessary to use at least one rotationally asymmetric surface. It is possible to correct the decentration aberrations favorably by using at least one rotationally asymmetric surface.

Meanwhile, when the taking lens is arranged to have a higher zoom ratio, a larger aperture is needed in order to keep the same F-number at the telephoto end. Consequently, the lens barrel becomes undesirably large in diameter. Accordingly, when the taking lens is arranged to have a higher zoom ratio, the size of the camera in the direction of height is also likely to increase. When laid out in a camera, the finder optical system is often placed above the taking lens. Therefore, an effective way of preventing the height of the camera from increasing even when the taking lens is arranged to have a higher zoom ratio is to minimize the size of the finder in the direction of height. For this reason, it is desirable to use a roof surface in the image-inverting optical system.

Thus, it becomes possible to reduce the finder optical system in both size and thickness. However, a reduction in thickness cannot always be attained unless careful consideration is given to the layout and arrangement of the objective optical system and the image-inverting optical system, which also has the function of an objective optical system. Conventionally, the reflecting surfaces of the image-inverting optical system are powerless and irrespective of the optical performance. Therefore, it has heretofore been possible to set the reflecting surface separation and position relatively freely. However, when a power is given to a reflecting surface of the image-inverting optical system, the reflecting surface separation also needs to be considered.

Accordingly, it is necessary in order to reduce the thickness of the finder optical system to reduce the space in which the objective movable units are movable and the distance from the entrance surface of the objective optical system to the entrance surface of the image-inverting optical system and to reduce the distance from the entrance surface of the image-inverting optical system to the first reflecting surface thereof. The object of the present invention cannot be attained unless the movable range of the movable units and the above-described distances are reduced. Accordingly, it is necessary to satisfy the following condition:

$$1.0 < d/(f_W \cdot \tan \theta_w \cdot Z) < 2.5 \quad (1)$$

where d is the distance from the entrance surface of the objective optical system to the first reflecting surface of the image-inverting optical system at the wide-angle end; $f_W$ is the focal length of the objective optical system at the wide-angle end; $\theta_w$ is the maximum field angle of the objective optical system at the wide-angle end; and Z is a zoom ratio.

The definition of the focal length f in the following description of the present invention is as follows. A light ray which is parallel to the axial principal ray and which has a small height h is made to enter the objective optical system from the object side thereof. The angle that is formed between that ray and the axial principal ray exiting from the objective optical system is denoted by α (units:radian). The focal length f is given by $$f = h/\alpha$$

In addition, d is the distance between the two surfaces as measured at the points on the axial principal ray in parallel to the entering optical axis.

If $d/(f_W \cdot \tan \theta_w \cdot Z)$ is not smaller than the upper limit of the condition (1), i.e. 2.5, it becomes impossible to attain a reduction in thickness. If $d/(f_W \cdot \tan \theta_w \cdot Z)$ is not larger than the lower limit, i.e. 1.0, the power of each unit becomes excessively strong, causing the performance to be degraded.

It is preferable to satisfy the following condition:

$$1.2 < d/(f_W \cdot \tan \theta_w \cdot Z) < 1.7 \quad (2)$$

In the first finder optical system, it is desirable that the roof surface should be placed on the pupil side of the intermediate image.

If a power is given to a roof surface, the roof edge generally fails to be a continuous surface because of the structure thereof. Therefore, such a roof surface cannot be produced. Accordingly, the roof surface needs to be formed from plane surfaces. For this reason, if the roof surface is placed closer to the objective optical system, the finder optical system becomes unfavorable from the viewpoint of performance, and the thickness of the finder optical system cannot be reduced satisfactorily. For this reason, it is desirable to place the roof surface closer to the ocular optical system, i.e. on the pupil side of the intermediate image.

In addition, the present invention provides a second finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes at least one reflecting surface having a rotationally asymmetric surface configuration. The image-inverting optical system is formed from a Porro prism. The finder optical system satisfies the following conditions:

$$1.0 < d/(f_W \cdot \tan \theta_w \cdot Z) < 2.5 \quad (3)$$

$$0.5 < dp/(f_W \cdot \tan \theta_w) < 1.1 \quad (4)$$

where d is the distance from the entrance surface of the objective optical system to the first reflecting surface of the image-inverting optical system at the wide-angle end; $f_W$ is the focal length of the objective optical system at the wide-angle end; $\theta_w$ is the maximum field angle of the objective optical system at the wide-angle end; Z is a zoom ratio; and dp is the distance from the entrance surface of the image-inverting optical system placed on the object side of the intermediate image to the first reflecting surface.

The function of the second finder optical system will be described below.

In general, when an image-inverting optical system is formed by using a Porro prism, the reflection angle at the first reflecting surface is set at approximately 45°. When the first reflecting surface has such a large reflection angle, the effective area of the reflecting surface becomes large. In this case, further, the size in the direction of thickness becomes large unfavorably. For this reason, it is necessary in order to attain a reduction in thickness to minimize at least the distance from the entrance surface of the Porro prism to the first reflecting surface thereof. Accordingly, it is desirable to satisfy the following condition in addition to the already-described condition (3):

$$1.0 < d/(f_W \cdot \tan \theta_w \cdot Z) < 2.5 \quad (3)$$

$$0.5 < dp/(f_W \cdot \tan \theta_w) < 1.1 \quad (4)$$

It should be noted that dp is the distance between the two surfaces as measured at the points on the axial principal ray in parallel to the entering optical axis as in the case of the distance d.

If $d/(f_W \cdot \tan\theta_w \cdot Z)$ is not smaller than the upper limit of the condition (3), i.e. 2.5, it becomes impossible to attain a reduction in thickness. If $d/d/(f_W \cdot \tan\theta_w \cdot Z)$ is not larger than the lower limit, i.e. 1.0, the power of each unit becomes excessively strong, causing the performance to be degraded.

If $dp/(fw \cdot \tan\theta_w)$ is not smaller than the upper limit of the condition (4), i.e. 1.1, it becomes difficult to attain a reduction in thickness. If $dp/(f_W \cdot \tan\theta_w))$ is not larger than the lower limit, i.e. 0.5, the effective portions of the first transmitting surface and the first reflecting surface overlap each other undesirably. Consequently, it becomes impossible to ensure the required edge wall thickness.

It is preferable to satisfy the following conditions:

$$1.2 < d/(f_W \cdot \tan\theta_w Z) < 1.7 \quad (5)$$

$$0.6 < dp/(fw \cdot \tan\theta_w) < 1.0 \quad (6)$$

In the second finder optical system, it is desirable that the second transmitting surface of the prism of the objective optical system should have a power.

In general, reflecting surfaces are decentered. Therefore, if an excessively strong power is given to a reflecting surface, decentration aberrations are produced. Therefore, to give a strong power to a prism, a power should preferably be given to a transmitting surface as well. In particular, giving a power to the second transmitting surface facilitates the correction of distortion and also makes it possible to change the position of the exit pupil of the objective optical system. This is favorable from the viewpoint of design and performance.

In this case, it is desirable that the second transmitting surface of the prism should have a rotationally asymmetric surface configuration.

In the case of a real-image finder, it is necessary to adjust the position of the exit pupil of the objective optical system in advance in order to relay an intermediate image formed by the objective optical system to the ocular optical system. If a rotationally asymmetric surface is used as a reflecting surface as in the present invention, the exit pupil position also becomes rotationally asymmetric. If this is corrected by the reflecting surface itself, other aberrations are affected unfavorably. Therefore, it is preferable to correct the exit pupil position by using a rotationally asymmetric surface for the second transmitting surface, at which the light beam is narrowed and which has minimal influence on other aberrations.

In the second finder optical system, it is desirable that the first reflecting surface of the objective optical system should have a power.

When a Porro prism is used, the reflection angle at the second reflecting surface is also large, i.e. about 45°. Therefore, the performance is degraded unless the power distribution is optimized. Of the reflecting surfaces, the first reflecting surface is far from the intermediate image formation plane. Therefore, the axial ray height is large at the first reflecting surface. Accordingly, the first reflecting surface can produce a strong aberration correcting effect. For this reason, it is desirable to give a power to the first reflecting surface.

In the first or second finder optical system, it is desirable that the number of reflections in the prism should be two or three.

If there is only one reflection in the prism, it is impossible to give a sufficient power for aberration correction. Therefore, the aberration correcting effect is weak. If the number of reflections in the prism is four or more, the prism becomes undesirably large in size. Therefore, a reduction in size cannot be attained. If the prism is arranged so that two or three reflections take place therein, it is possible to attain both high performance and size reduction with good balance.

In the first or second finder optical system, it is desirable that the number of movable units should be two.

If the number of movable units placed in the direction of the optical axis is increased, the sum total of the thicknesses of lenses increases. Therefore, it is preferable to use two movable units, which is the smallest number of optical units for zooming.

In addition, the present invention provides a third finder optical system that includes, in order from the object side thereof: an objective optical system having a positive refracting power; an image-inverting optical system for erecting an intermediate image formed by the objective optical system; and an ocular optical system having a positive refracting power. The objective optical system includes an optical system having at least two movable units moving when zooming is performed. The optical system has a positive composite power. A prism is placed on the pupil side of the optical system having at least two movable units. The prism includes an image-inverting function. The prism includes at least one reflecting surface having a rotationally asymmetric surface configuration. At least either one of the first transmitting surface and first reflecting surface of the prism has a negative power. The second transmitting surface of the prism has a positive power.

The function of the third finder optical system will be described below.

The prism power arrangement for reducing the thickness of the finder even more effectively will be described. To attain the object of the present invention, it is necessary to simultaneously meet the need to reduce the thickness of the optical system and the need to reduce the size of the prism itself. Therefore, in the present invention, the prism is placed on the pupil side of an optical system having a positive composite power to fold the optical axis. In addition, a negative power is distributed to the prism to form a telephoto type lens system, thereby effectively reducing the thickness of the optical system. In this case, to enhance the advantageous effect of the telephoto type lens system and to ensure the required magnification, a negative power is given to at least either one of the first transmitting surface and the first reflecting surface, which are relatively close to the object. Furthermore, to favorably correct aberrations produced by the surface of negative power, at least one reflecting surface is formed from a rotationally asymmetric surface.

Meanwhile, the volume of the prism itself depends on the area of each effective surface. Therefore, it is necessary to reduce the effective area of each reflecting surface. Accordingly, in the present invention, a positive power is given to the second transmitting surface, at which the light beam is narrowed and the influence of power on aberrations weakens, thereby bringing the entrance pupil position close to the prism while minimizing the influence on the performance, and thus reducing the size of the prism.

In this case, it is desirable that either one of the first transmitting surface and the first reflecting surface should have a positive power.

To form a telephoto type lens system to shorten the overall length, a relatively strong negative power is needed. Consequently, the amount of aberration produced in the optical system becomes unfavorably large. Therefore, it is preferable to give a positive power to either the first transmitting surface or the first reflecting surface so that the aberrations produced by the surface of negative power are corrected by cancellation with the surface of positive power.

It is desirable that the number of reflections in the prism should be two or three.

If there is only one reflection in the prism, it is impossible to give a sufficient power for aberration correction. Therefore, the aberration correcting effect is weak. If the number of reflections in the prism is four or more, the prism becomes undesirably large in size. Therefore, a reduction in size cannot be attained. If the prism is arranged so that two or three reflections take place therein, it is possible to attain both high performance and size reduction with good balance.

It is desirable that the composite focal length of the objective movable units should satisfy the following condition:

$$0.3 < f_{move}/f_W < 0.9 \quad (7)$$

where $f_{move}$ is the composite focal length of the objective movable units at the wide-angle end, and $f_W$ is the focal length of the objective optical system at the wide-angle end.

In the present invention, a telephoto type lens system is constructed of the first and second units that have a positive composite power and the third unit having a negative power. In this case, because the composite power of the first and second units is stronger than the power of the whole objective optical system, the amount of aberration produced by the first and second units tends to increase. Accordingly, from the viewpoint of attaining a further reduction in size while maintaining favorable performance over the entire zooming range, it is desirable to satisfy the following condition:

$$0.3 < f_{move}/f_W < 0.9 \quad (7)$$

If $f_{move}/f_W$ is not smaller than the upper limit of the condition (7), i.e. 0.9, the advantageous effect of the telephoto type lens system weakens, and it becomes impossible to attain a reduction in thickness. If $f_{move}/f_W$ is not larger than the lower limit, i.e. 0.3, the power of each unit becomes excessively strong, causing the performance to be degraded.

It is preferable to satisfy the following condition:

$$0.4 < f_{move}/f_W < 0.8 \quad (8)$$

In addition, the present invention provides a fourth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism has two reflecting surfaces. At least one of the reflecting surfaces has a rotationally asymmetric surface configuration. The finder optical system satisfies the following condition:

$$0.5 < dp/(f_W \cdot \tan \theta_w) < 1.1 \quad (9)$$

where $f_W$ is the focal length of the objective optical system at the wide-angle end; $\theta_w$ is the max mum field angle of the objective optical system at the wide-angle end: and dp is the distance from the entrance surface of the image-inverting optical system placed on the object side of the intermediate image to the first reflecting surface thereof.

The function of the fourth finder optical system will be described below.

The optimum arrangement of the reflecting surfaces of the prism will be described. If an excessively strong power is given to a reflecting surface of the image-inverting optical system, the amount of aberration produced by the surface becomes unfavorably large. This is unfavorable from the viewpoint of performance. As is generally known, even when the curvature of a surface is the same, as the reflection angle becomes larger, the amount of aberration produced by the surface increases undesirably. Finder optical systems are generally required to allow observation in the same direction as the observer's viewing direction. Therefore, it is necessary to make the entering optical axis and the exiting optical axis approximately parallel to each other. For this reason, the reflection angle of the image-inverting optical system is limited, and an arrangement having an excessively small number of reflecting surfaces is unfavorable from the viewpoint of performance. Accordingly, it is necessary to provide at least two reflecting surfaces on the objective optical system side in order to ensure the required performance.

Meanwhile, it is known that reflecting surfaces are sensitive to errors that may occur during production, assembly, etc. in comparison to refracting surfaces. Therefore, if the number of reflecting surfaces with power is large, the performance is degraded severely. In view of this fact, it is preferable to use a prism in which the number of reflecting surfaces is only two.

From the viewpoint of minimizing the site of the prism, it is desirable to satisfy the following condition:

$$0.5 < dp/(f_W \cdot \tan \theta_w) < 1.1 \quad (9)$$

If $dp/(f_W \cdot \tan \theta_w)$ is not smaller than the upper limit of the condition (9), i.e. 1.1, it becomes difficult to attain a reduction in thickness. If $dp/(f_W \cdot \tan \theta_w)$ is not larger than the lower limit, i.e. 0.5, the effective portions of the first transmitting surface an the first reflecting surface overlap each other undesirably. Consequently, it becomes impossible to ensure the required edge wall thickness.

It is preferable to satisfy the following condition:

$$0.6 < dp/(f_W \cdot \tan \theta_w) < 1.0 \quad (10)$$

In the third finder optical system, it's desirable that the first reflecting surface of the prism should have a rotationally asymmetric surface configuration and be formed from an independent surface that is separate from other transmitting and reflecting surfaces.

When a reflecting surface is arranged to have a total reflection critical angle, it can serve as both reflecting and transmitting surfaces. That is, a transmitting surface and a reflecting surface can be formed on the identical surface by using a total reflection critical angle. With this arrangement, because it is unnecessary to separate the effective portions of the transmitting surface and the reflecting surface, the prism can be reduced in size. However, because the prism needs to have a total reflection critical angle as a reflection angle, the arrangement is unfavorable from the viewpoint of performance.

In the prism of the present invention, because the axial ray height is the highest at the first reflecting surface of the reflecting surfaces thereof, the effect of correcting aberrations such as spherical aberration is remarkable at the first reflecting surface. Therefore, it is not preferable to increase the reflection angle at the first reflecting surface. Accordingly, it is preferable that the first reflecting surface should be formed separately from other transmitting and reflecting surfaces.

In addition, it is desirable that the second transmitting surface of the prism should have a power.

In general, reflecting surfaces are decentered. Therefore, if an excessively strong power is given to a reflecting surface, decentration aberrations are produced. Therefore, to give a strong power to a prism, a power should preferably be given to a transmitting surface as well. In particular, giving a power to the second transmitting surface facilitates the correction of distortion and also makes it possible to change the position of the exit pupil of the objective optical system. This is favorable from the viewpoint of design and performance.

In this case, it is desirable that the second transmitting surface should have a rotationally asymmetric surface configuration.

In the case of a real-image finder, it is necessary to adjust the position of the exit pupil of the objective optical system in advance in order to relay an intermediate image formed by the objective optical system to the ocular optical system. If a rotationally asymmetric surface is used as a reflecting surface as in the present invention, the exit pupil position also becomes rotationally asymmetric. If this is corrected by the reflecting surface itself, other aberrations are affected unfavorably. Therefore, it is preferable to correct the exit pupil position by using a rotationally asymmetric surface for the second transmitting surface, at which the light beam is narrowed and which has minimal influence on other aberrations.

It is desirable that the axial principal ray or a projective axial principal ray defined by projecting the axial principal ray onto a plane containing a part of the axial principal ray should not cross itself in the prism.

Let us describe optical paths that a prism can take. A prism allows an optical system to be arranged in a compact form by folding the axial principal ray (optical axis) with reflecting surfaces. However, in order to attain a reduction in thickness, which is the object of the present invention, it is necessary to appropriately set the direction of travel of the optical axis (hereinafter referred to as the "optical path").

Figure 20:
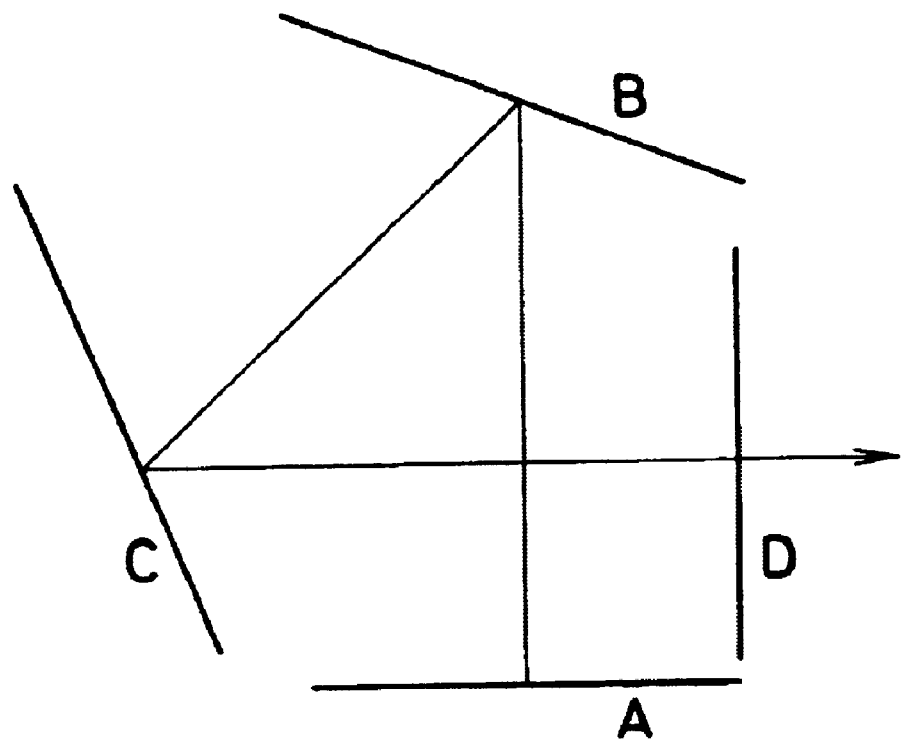
FIG. 20 is a diagram for describing problems associated with a prism in which an optical path crosses itself.

It may be considered that if the optical path is arranged to cross itself, the prism can be made compact in size because light rays pass through the same portion of the prism twice. However, if the prism is constructed by making the optical path cross itself, as shown in FIG. 20, the separation between the surfaces A and B depends on the size of the effective portion of the surface C or D, and the separation between the surfaces C and D depends on the size of the effective portion of the surface A or B. Therefore, there are cases where the prism cannot be reduced in size when the effective portions are large in size. Accordingly, it is preferable in the present invention that the axial principal ray should not cross itself.

If the axial principal ray is twisted, the optical path does not cross itself. This is, however, technically the same as the above. Therefore, in the present invention, a plane containing a part of the axial principal ray is defined. The axial principal ray is projected onto the plane, and the resulting two-dimensional axial principal ray is defined as a projective axial principal ray. The prism is preferably constructed so that the projective axial principal ray does not cross itself in the prism.

In addition, it is desirable that either the first transmitting surface or first reflecting surface of the prism should have a negative power.

By placing a negative power on the pupil side of the objective units having a positive composite power, a substantially telephoto type lens system can be constructed. Thus, it is possible to obtain an arrangement most suitable for attaining a reduction in thickness.

In addition, it is desirable that the composite focal length of the objective movable units should satisfy the following condition:

$$0.3 < f_{move}/f_W < 0.9 \quad (11)$$

where $f_{move}$ is the composite focal length of the objective movable units at the wide-angle end, and $f_W$ is the focal length of the objective optical system at the wide-angle end.

In the present invention, a telephoto type lens system is constructed of the first and second units that have a positive composite power and the third unit having a negative power. In this case, because the composite power of the first and second units is stronger than the power of the whole objective optical system, the amount of aberration produced by the first and second units tends to increase. Accordingly, from the viewpoint of attaining a further reduction in size while maintaining favorable performance over the entire zooming range, it is desirable to satisfy the following condition:

$$0.3 < f_{move}/f_W < 0.9 \quad (11)$$

If $f_{move}/f_W$ is not smaller than the upper limit of the condition (11), i.e. 0.9, the advantageous effect of the telephoto type lens system weakens, and it becomes impossible to attain a reduction in thickness,. If $f_{move}/f_W$ is not larger than the lower limit, i.e. 0.3, the power of each unit becomes excessively strong, causing the performance to be degraded.

It is preferable to satisfy the following condition:

$$0.4 < f_{move}/f_W < 0.8 \quad (12)$$

In addition, the present invention provides a fifth finder optical system that includes, in order from the object side thereof an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism has three reflecting surfaces. At least one of the reflecting surfaces has a rotationally asymmetric surface configuration.

The function of the fifth finder optical system will be described below.

To attain a higher zoom ratio, aberrations produced by each unit need to be corrected even more strictly. Meanwhile, finder optical systems are generally required to allow observation in the same direction as the observer's viewing direction. Therefore, it is necessary to make the entering optical axis and the existing optical axis approximately parallel to each other. For this reason, when the number of reflections taking place in the prism is two, the position and reflection direction of each reflecting surface are limited to a certain extent, and hence the reflection angle, which relates to the amount of aberration produced, is limited undesirably. Therefore, if the optical system is arranged to provide a higher zoom ratio while maintaining a thin structure, there are cases where aberrations cannot sufficiently be corrected.

Accordingly, the prism is formed from three reflecting surfaces, thereby allowing residual aberrations to be corrected favorably even when the reflection angle is made relatively large. Thus, it is possible to construct a finder optical system exhibiting favorable performance even if it is arranged to provide a higher zoom ratio while maintaining a thin structure.

In this case, it is desirable that at least two of the three reflecting surfaces of the prism should be formed from independent surfaces, respectively, which are separate from other transmitting and reflecting surfaces.

When a reflecting surface is arranged to have a total reflection critical angle, it can serve as both reflecting and transmitting surfaces. That is, a transmitting surface and a reflecting surface can be formed on the identical surface by using a total reflection critical angle. However, because the reflection angle needs to be a total reflection critical angle, the arrangement becomes unfavorable from the viewpoint of performance. Moreover, the exit direction of the prism is limited undesirably. Accordingly, the use of total reflection may be unfavorable for the reduction in thickness of the finder.

In the present invention, aberration correction is performed even more strictly by using three reflecting surfaces in the prism. Therefore, if an excessively large number of reflecting surfaces are formed as the identical surfaces with other surfaces, the prism becomes unfavorable from the viewpoint of performance, and it becomes impossible to fully satisfy the object of the present invention. Accordingly, it is desirable that at least two of the three reflecting surfaces of the prism should be formed from independent surfaces, respectively, which are separate from other transmitting and reflecting surfaces.

In addition, it is desirable that the first reflecting surface of the prism should have a rotationally asymmetric surface configuration and be formed from an independent surface that is separate from other transmitting and reflecting surfaces.

When a reflecting surface is arranged to have a total reflection critical angle, it can serve as both reflecting and transmitting surfaces. That is, a transmitting surface and a reflecting surface can be formed on the identical surface by using a total reflection critical angle. With this arrangement, because it is unnecessary to separate the effective portions of the transmitting surface and the reflecting surface, the prism can be reduced in size. However, because the prism needs to have a total reflection critical angle as a reflection angle, the arrangement is unfavorable from the viewpoint of performance.

In the prism of the present invention, because the axial ray height is the highest at the first reflecting surface of the reflecting surfaces thereof, the effect of correcting aberrations such as spherical aberration is remarkable at the first reflecting surface. Therefore, it is not preferable to increase the-reflection angle at the first reflecting surface. Accordingly, it is preferable that the first reflecting surface should be formed separately from other transmitting and reflecting surfaces.

In addition, it is desirable that the third reflecting surface of the prism should have a rotationally asymmetric surface configuration and be formed from an independent surface that is separate from other transmitting and reflecting surfaces.

In the prism of the present invention, because the marginal ray height is the highest at the third reflecting surface of the reflecting surfaces thereof, the effect of correcting aberrations such as astigmatic and comatic aberrations is remarkable at the third reflecting surface. Therefore, it is not preferable to increase the reflection angle at the third reflecting surface. Accordingly, it is preferable that the third reflecting surface should be formed separately from other transmitting and reflecting surfaces.

In addition, it is desirable that the second transmitting surface of the prism should have a power.

In general, reflecting surfaces are decentered. Therefore, if an excessively strong power is given to a reflecting surface, decentration aberrations are produced. Therefore, to give a strong power to a prism, a power should preferably be given to a transmitting surface as well. In particular, giving a power to the second transmitting surface facilitates the correction of distortion and also makes it possible to change the position of the exit pupil of the objective optical system. This is favorable from the viewpoint of design and performance.

In this case, it is desirable that the second transmitting surface should have a rotationally asymmetric surface configuration.

In the case of a real-image finder, it is necessary to adjust the position of the exit pupil of the objective optical system in advance in order to relay an intermediate image formed by the objective optical system to the ocular optical system. If a rotationally asymmetric surface is used as a reflecting surface as in the present invention, the exit pupil position also becomes rotationally asymmetric. If this is corrected by the reflecting surface itself, other aberrations are affected unfavorably. Therefore, it is preferable to correct the exit pupil position by using a rotationally asymmetric surface for the second transmitting surface, at which the light beam is narrowed and which has minimal influence on other aberrations.

In addition, it is desirable that the axial principal ray or a projective axial principal ray defined by projecting the axial principal ray onto a plane containing a part of the axial principal ray should not cross itself in the prism.

Let us describe optical paths that a prism can take. A prism allows an optical system to be arranged in a compact form by folding the axial principal ray (optical axis) with reflecting surfaces. However, in order to attain a reduction in thickness, which is the object of the present invention, it is necessary to appropriately set the direction of travel of the optical axis (hereinafter referred to as the "optical path").

It may be considered that if the optical path is arranged to cross itself, the prism can be made compact in size because light rays pass through the same portion of the prism twice. However, if the prism is constructed by making the optical path cross itself, as shown in FIG. 20, the separation between the surfaces A and B depends on the size of the effective portion of the surface C or D, and the separation between the surfaces C and D depends on the size of the effective portion of the surface A or B. Therefore, there are cases where the prism cannot be reduced in size when the effective portions are large in size. Accordingly, it is preferable in the present invention that the axial principal ray should not cross itself.

If the axial principal ray is twisted, the optical path does not cross itself. This is, however, technically the same as the above. Therefore, in the present invention, a plane containing a part of the axial principal ray is defined. The axial principal ray is projected onto the plane, and the resulting two-dimensional axial principal ray is defined as a projective axial principal ray. The prism is preferably constructed so that the projective axial principal ray does not cross itself in the prism.

In addition, it is desirable that either the first transmitting surface or first reflecting surface of the prism should have a negative power.

By placing a negative power on the pupil side of the objective units having a positive composite power, a substantially telephoto type lens system can be constructed. Thus, it is possible to obtain an arrangement most suitable for attaining a reduction in thickness.

In addition, it is desirable that the composite focal length of the objective movable units should satisfy the following condition:

$$0.3 < f_{move}/f_W < 0.9 \quad (13)$$

where $f_{move}$ is the composite focal length of the objective movable units at the wide-angle end, and $f_W$ is the focal length of the objective optical system at the wide-angle end.

In the present invention, a telephoto type lens system is constructed of the first and second units that have a positive composite power and the third unit having a negative power. In this case, because the composite power of the first and second units is stronger than the power of the whole objective optical system, the amount of aberration produced by the first and second units tends to increase. Accordingly, from the viewpoint of attaining a further reduction in size while maintaining favorable performance over the entire zooming range, it is desirable to satisfy the following condition:

$$0.3 < f_{move}/f_W < 0.9 \quad (13)$$

If $f_{move}/f_W$ is not smaller than the upper limit of the condition (13), i.e. 0.9, the advantageous effect of the telephoto type lens system weakens, and it becomes impossible to attain a reduction in thickness. If $f_{move}/f_W$ is not larger than the lower limit, i.e. 0.3, the power of each unit becomes excessively strong, causing the performance to be degraded.

It is preferable to satisfy the following condition:

$$0.4 < f_{move}/f_W < 0.8 \quad (14)$$

In addition, the present invention provides a sixth finder optical system that includes, in order from the object side thereof: an objective optical system having a positive refracting power; an image-inverting optical system for erecting an intermediate image formed by the objective optical system; and an ocular optical system having a positive refracting power. The objective optical system includes, in order from the object side thereof, a negative first unit, a positive second unit, and a negative third unit. At least the first unit and the second unit are movable units moving when zooming is performed. The third unit is formed from a prism including an image-inverting function. The prism includes at least one reflecting surface having a rotationally asymmetric surface configuration. In addition, the present invention provides a seventh finder optical system that includes, in order from the object side thereof: an objective optical system having a positive refracting power; an image-inverting optical system for erecting an intermediate image formed by the objective optical; and an ocular optical system having a positive refracting power. The objective optical system includes, in order from the object side thereof, a negative first unit, a positive second unit, and a positive third unit. At least the first unit and the second unit are movable units moving when zooming is performed. The third unit is formed from a prism including an image-inverting function. The prism includes at least one reflecting surface having a rotationally asymmetric surface configuration. The prism includes at least one transmitting surface or reflecting surface that has a negative power. The third unit has a principal point positioned on the pupil side of a plane where the intermediate image is formed.

The function of the sixth and seventh finder optical systems will be described below.

As has been stated above, by giving a power to a reflecting surface of the image-inverting optical system, it is possible to relax the restriction in terms of the back focus and hence possible to reduce the thickness of the finder optical system. However, to attain a reduction in thickness satisfactorily, it is necessary to optimize the arrangement of the objective units.

Although the smallest number of optical units for zooming is two, it is necessary to increase the number of optical units in order to attain a higher zoom ratio. It is difficult to ensure the required performance unless the number of optical units is increased. However, if optical units are disposed in the direction of the entering optical axis, the sum total of the thicknesses of optical components increases undesirably as the number of optical units increases. Consequently, it becomes difficult to attain a reduction in thickness.

Accordingly, in the present invention, the objective optical system is formed from three units, in which the first and second units are arranged in the form of moving units to have a zooming function. The third unit is formed from an image-inverting prism having the function of an objective optical system to fold the optical axis, thereby preventing the optical system from increasing in size in the direction of thickness while ensuring the required performance.

Regarding the power distribution, the first unit is given a negative power and the second unit is given a positive power to ensure a certain back focus. Meanwhile, a surface of negative power is disposed in the third unit. Thus, a substantially telephoto type lens system is constructed of the first and second units having a positive composite power and the third unit of negative power to provide an arrangement that is most suitable for attaining a reduction in thickness. Further, in the third unit, a reflecting surface in the prism is given a power and formed from a rotationally asymmetric surface, thereby allowing the practical back focus to be shortened effectively.

Of the prism surfaces, a surface of low magnification that is not very closely related to the construction of a telephoto type lens system, e.g. the second transmitting surface, which is located near the intermediate image plane, does not exert a very strong influence on the focal length and the effect of shortening the overall length even when the power of the surface is changed. Therefore, the power of the whole prism, which constitutes the third unit, does not always need to be made negative. Accordingly, the prism may be arranged to have a positive power. In this case, however, at least one transmitting surface or reflecting surface needs to have a negative power in order to construct a telephoto type lens system as stated above. When the composite power of the first and second units and the power of the third unit are both positive, the composite focal length becomes excessively short if the principal point separation is small. Therefore, it is necessary to increase the separation between the principal point of the first and second units and the principal point of the third unit as shown by the composite focal length computing expression $(1/f = 1/f1 + 1/f2 - d/(f1 \cdot f2))$. For this reason, the principal point of the third unit needs to be positioned on the pupil side of a plane where the intermediate image is formed.

In the sixth and seventh finder optical systems, it is desirable that the second transmitting surface should have a power.

In general, reflecting surfaces are decentered. Therefore, if an excessively strong power is given to a reflecting surface, decentration aberrations are produced. Therefore, to give a strong power to a prism, a power should preferably be given to a transmitting surface as well. In particular, giving a power to the second transmitting surface facilitates the correction of distortion and also makes it possible to change the position of the exit pupil of the objective optical system. This is favorable from the viewpoint of design and performance.

In this case, it is desirable that the second transmitting surface should have a rotationally asymmetric surface configuration.

In the case of a real-image finder, it is necessary to adjust the position of the exit pupil of the objective optical system in advance in order to relay an intermediate image formed by the objective optical system to the ocular optical system. If a rotationally asymmetric surface is used as a reflecting surface as in the present invention, the exit pupil position also becomes rotationally asymmetric. If this is corrected by the reflecting surface itself, other aberrations are affected unfavorably. Therefore, it is preferable to correct the exit pupil position by using a rotationally asymmetric surface for the second transmitting surface, at which the light beam is narrowed and which has minimal influence on other aberrations.

In addition, it is desirable that the number of reflections in the prism should be two or three.

If there is only one reflection in the prism, it is impossible to give a sufficient power for aberration correction. Therefore, the aberration correcting effect is weak. If the number of reflections in the prism is four or more, the prism becomes undesirably large in size. Therefore, a reduction in size cannot be attained. If the prism is arranged so that two or three reflections take place therein, it is possible to attain both high performance and size reduction with good balance.

In addition, it is desirable that the composite focal length of the objective movable units should satisfy the following condition:

$$0.3 < f_{move}/f_W < 0.9 \quad (15)$$

where $f_{move}$ is the composite focal length of the objective movable units at the wide-angle end, and $f_W$ is the focal length of the objective optical system at the wide-angle end.

In the present invention, a telephoto type lens system is constructed of the first and second units that have a positive composite power and the third unit having a negative power. In this case, because the composite power of the first and second units is stronger than the power of the whole objective optical system, the amount of aberration produced by the first and second units tends to increase. Accordingly, from the viewpoint of attaining a further reduction in size while maintaining favorable performance over the entire zooming range, it is desirable to satisfy the following condition:

$$0.3 < f_{move}/f_W < 0.9 \quad (15)$$

If $f_{move}/f_W$ is not smaller than the upper limit of the condition (15), i.e. 0.9, the advantageous effect of the telephoto type lens system weakens, and it becomes impossible to attain a reduction in thickness. If $f_{move}/f_W$ is not larger than the lower limit, i.e. 0.3, the power of each unit becomes excessively strong, causing the performance to be degraded.

It is preferable to satisfy the following condition:

$$0.4 < f_{move}/f_W < 0.8 \quad (16)$$

In addition, it is desirable that when zooming is performed, the third unit should be stationary with respect to a plane where the intermediate image is formed.

In a case where the direction of the optical axis exiting from the prism constituting the third unit has an angle with respect to the optical axis entering the prism, if the prism is arranged to be movable, the intermediate image formation plane moves undesirably as the prism is moved for zooming. Consequently, a complicated mechanism is needed unfavorably to transmit the image to the ocular optical system. In addition, because the prism becomes large in size in comparison to a refracting lens, the mechanism for moving the prism also becomes unfavorably complicated. Accordingly, it is desirable that the third unit should be stationary with respect to the intermediate image formation plane.

In addition, it is desirable that both the objective movable units should be formed from refracting lenses.

The objective movable units can be formed from prisms as in the case of the third unit. However, if prisms are used, the objective movable units become large in size in comparison to refracting lenses, making it impossible to attain a reduction in thickness satisfactorily. Therefore, it is preferable to form the objective movable units by using refracting lenses.

In addition, it is desirable that the objective movable units should be each formed from a single refracting lens.

As has been stated above, as the number of refracting lenses constituting the first and second units increases, the sum total of the thicknesses increases, and hence it becomes impossible to attain a reduction in thickness satisfactorily. Therefore, it is preferable to form each of the objective movable units from a single refracting lens.

The following is a detailed description of the arrangement of an optical system for attaining the object of the present invention.

An eighth finder optical system according to the present invention includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes two reflecting surfaces. At least one of the reflecting surfaces has a rotationally asymmetric surface configuration. The first transmitting surface and second reflecting surface of the prism are formed from the identical surface having both transmitting and reflecting actions. The prism has an optical path in which the axial principal ray or a projective axial principal ray defined by projecting the axial principal ray onto a plane containing a part of the axial principal ray bends in different directions from each other with respect to the travel direction of light rays at the two reflecting surfaces.

The function of the eighth finder optical system will be described below.

By forming the first transmitting surface and second reflecting surface of the prism from the identical surface, it becomes unnecessary to separate the respective effective areas of the two surfaces. Consequently, it is possible to minimize the separation between the first transmitting surface and the first reflecting surface and hence possible to attain a reduction in thickness.

In this case, it is desirable that the first reflecting surface of the prism should have a negative power.

Because it is the identical with the first transmitting surface, the second reflecting surface needs to have a total reflection critical angle. For this reason, giving a strong power to the remaining reflecting surface (i.e. the first reflecting surface) is favorable from the viewpoint of aberration correcting performance. On the other hand, it is preferable to give a negative power to the prism from the viewpoint of attaining a reduction in thickness, as has been stated above. Accordingly, it is preferable to give a negative power to the first reflecting surface.

In addition, it is desirable that the reflection angle at the first reflecting surface of the prism should satisfy the following condition:

$$15° \theta_{A1} 40° \tag{17}$$

where $\theta_{A1}$ is the reflection angle at the first reflecting surface.

In Example 2 (described later), $\theta_{A1}$ is 27.2°. As has been stated above, it is preferable to give a strong power to the first reflecting surface from the viewpoint of aberration correction. Therefore, decentration aberrations are unlikely to occur if the reflection angle at the first reflecting surface is small. Accordingly, it is desirable for the first reflecting surface to satisfy the condition (17). If $\theta_{A1}$ is not smaller than the upper limit of the condition (17), i.e. 40°, decentration aberrations are produced unfavorably. If $\theta_{A1}$ is not larger than the lower limit, i.e. 15°, rays cannot be totally reflected by the second reflecting surface.

It is preferable to satisfy the following condition:

$$20° < \theta_{A1} < 35° \tag{18}$$

In addition, it is desirable that the exit angle of the prism with respect to the optical axis entering the objective optical system should satisfy the following condition:

$$25° < \theta_{A1} < 75° \tag{19}$$

where $\theta_A$ is the exit angle of the prism with respect to the optical axis entering the objective optical system.

In Example 2 (described later), $\theta_A$ is 55.6°. As has been stated above, if the number of optical units placed in the direction of the optical axis entering the objective optical system is increased, it becomes difficult to attain a reduction in thickness. Therefore, it is preferable to change the direction of the exiting optical axis by appropriately arranging the reflecting surfaces of the prism. However, if the reflection angle is excessively large, the performance is degraded. For this reason, it is necessary to set an optimum exit angle. Accordingly, it is desirable to satisfy the condition (19). If $\theta_A$ is not smaller than the upper limit of the condition (19), i.e. 75°, the reflection angle at each reflecting surface becomes excessively large, causing the performance to be degraded. If $\theta_A$ is not larger than the lower limit, i.e. 25°, it becomes impossible to attain a reduction in thickness.

It is preferable to satisfy the following condition:

$$40° \theta_A < 65° \tag{20}$$

In addition, the present invention provides a ninth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes two reflecting surfaces. Both of the reflecting surfaces are independent of other transmitting and reflecting surfaces. At least one of the reflecting surfaces has a rotationally asymmetric surface configuration. The prism has an optical path in which the axial principal ray or a projective axial principal ray defined by projecting the axial principal ray onto a plane containing a part of the axial principal ray bends in the same direction with respect to the travel direction of light rays at the two reflecting surfaces. The finder optical system satisfies the following condition:

$$0.5 < dp/(f_W \cdot \tan \theta_w) < 1.1 \tag{21}$$

where dp is the distance from the entrance surface of the image-inverting optical system placed on the object side of the intermediate image to the first reflecting surface thereof; $f_W$ is the focal length of the objective optical system at the wide-angle end; and $\theta_w$ is the maximum field angle of the objective optical system at the wide-angle end.

The function of the ninth finder optical system will be described below.

In the ninth finder optical system, two transmitting surfaces and two reflecting surfaces of the prism can be formed from independent surface configurations, respectively. This is favorable from the viewpoint of performance. A reduction in thickness of the finder cannot be attained unless the prism itself is reduced in size. In particular, the optical path from the first transmitting surface to the first reflecting surface is approximately parallel to the direction of the entering optical axis. Therefore, it is necessary to minimize the distance between the first transmitting surface and the first reflecting surface. Accordingly, it is desirable to satisfy the following condition:

$$0.5 < dp/(f_W \cdot \tan \theta_w) < 1.1 \tag{21}$$

where dp is the distance from the entrance surface of the image-inverting optical system placed on the object side of the intermediate image to the first reflecting surface thereof; $f_W$ is the focal length of the objective optical system at the wide-angle end; and 6w is the maximum field angle of the objective optical system at the wide-angle end.

If $dp/(f_W \cdot \tan \theta_w)$ is not smaller than the upper limit of the condition (21), i.e. 1.1, it becomes difficult to attain a reduction in thickness, whereas if $dp/(f_W \cdot \tan \theta_w)$ is not larger than the lower limit, i.e. 0.5, the effective portions of the first transmitting surface and the first reflecting surface overlap each other undesirably. Consequently, it becomes impossible to ensure the required edge wall thickness.

It is preferable to satisfy the following condition:

$$0.6 < dp/(f_W \cdot \tan \theta_w) < 1.0 \tag{22}$$

In the ninth finder optical system, it is desirable that the first transmitting surface of the prism should have a negative power.

As has been stated above, it is preferable to arrange the optical system in the form of a telephoto type lens system from the viewpoint of attaining a reduction in thickness. In this case, if all of the negative power is given to a decentered reflecting surface, the amount of decentration aberrations produced by this surface becomes large. This is unfavorable from the viewpoint of performance. In addition, of the transmitting surfaces, the first transmitting surface, which is the entrance surface, is more away from the intermediate image than the other transmitting surface. Therefore, at the first transmitting surface, the axial ray height is high, and this is effective in correcting aberrations. Accordingly, it is preferable to give a negative power to the first transmitting surface of the prism.

In addition, it is desirable that the second transmitting surface of the prism should have a positive power.

The volume of the prism depends on the area of each effective surface. Therefore, it is preferable to minimize the area of the effective portion of each reflecting surface by bringing the position of the entrance pupil of the objective lens system close to the prism. Accordingly, it is desirable to bring the entrance pupil position close to the prism by giving a positive power to the second transmitting surface, at which the light beam is narrowed and the influence of power on aberrations weakens.

In addition, it is preferable that the reflection angle at the first reflecting surface of the prism should satisfy the following condition:

$$30° < \theta_{B1} < 60° \qquad (23)$$

where $\theta_{B1}$ is the reflection angle at the first reflecting surface.

In Example 3 (described later), $\theta_{B1}$ is 49.00. The prism in this, finder optical system has an optical path in which the axial principal ray bends in the same direction with respect to the travel direction of light rays at the two reflecting surfaces. Therefore, it is impossible to attain both high performance and size reduction with good balance unless the reflection angle at the first reflecting surface is set appropriately. Accordingly, it is desirable to satisfy the condition (23). If $\theta_{B1}$ is not smaller than the upper limit of the condition (23), i.e. 60°, decentration aberrations are produced undesirably, and moreover, it is necessary to position the second reflecting surface even closer to the pupil. Consequently, it is impossible to attain a reduction in thickness. If OBI is not larger than the lower limit, i.e. 30°, the second reflecting surface and the objective optical system interfere with each other unfavorably.

It is preferable to satisfy the following condition:

$$38° < \theta_{B1} < 52° \qquad (24)$$

In addition, it is desirable that the reflection angle at the second reflecting surface of the prism satisfies the following condition:

$$30° < \theta_{B2} < 60° \qquad (25)$$

where $\theta_{B2}$ is the reflection angle at the second reflecting surface.

In Example 3 (described later), $\theta_{B2}$ is 41.0°. The second reflecting surface should preferably satisfy the condition (25) for the same reasons as stated above. If $\theta_{B2}$ is not smaller than the upper limit of the condition (25), i.e. 60°, decentration aberrations are produced undesirably, which is unfavorable from the viewpoint of performance. If $\theta_{B2}$ is not larger than the lower limit, i.e. 30°, the ocular optical system and the objective optical system interfere with each other unfavorably.

It is preferable to satisfy the following condition:

$$38° < \theta_{B2} < 52° \qquad (26)$$

In addition, it is desirable that the exit angle of the prism with respect to the optical axis entering the objective optical system should satisfy the following condition:

$$150° < \phi_B < 210° \qquad (27)$$

where $\phi_B$ is the exit angle of the prism with respect to the optical axis entering the objective optical system.

In Example 3 (described later), $\phi_B$ is 180°. The exit angle of the prism should preferably satisfy the condition (27). If $\phi_B$ is not smaller than the upper limit of the condition (27), i.e. 210°, it becomes necessary to increase the reflection angle at each surface. Therefore, the optical system becomes unfavorable from the viewpoint of performance. If $\phi_B$ is not larger than the lower limit, i.e. 150°, the ocular optical system and the objective optical system interfere with each other unfavorably.

It is preferable to satisfy the following condition:

$$165° < \phi_B < 195° \qquad (28)$$

In addition, it is desirable that a roof surface should be disposed on the pupil side of the intermediate image.

If a power is given to a roof surface, the roof edge generally fails to be a continuous surface because of the structure thereof. Therefore, such a roof surface cannot be produced. Accordingly, the roof surface needs to be formed from plane surfaces. For this reason, if the roof surface is placed closer to the objective optical system, the finder optical system becomes unfavorable from the viewpoint of performance, and the thickness of the finder optical system cannot be reduced satisfactorily. For this reason, it is desirable to place the roof surface closer to the ocular optical system, i.e. on the pupil side of the intermediate image.

In addition, it is desirable that the image-inverting optical system should be a Porro prism.

In the case of a Porro prism, the number of reflections is smaller than that in the case of using a roof surface by one. Therefore, the use of a Porro prism is favorable in terms of light quantity.

In addition, the present invention provides a tenth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes three reflecting surfaces. All of the reflecting surfaces are independent of other transmitting and reflecting surfaces. At least one of the reflecting surfaces has a rotationally asymmetric surface configuration. The prism has an optical path in which the axial principal ray or a projective axial principal ray defined by projecting the axial principal ray onto a plane containing a part of the axial principal ray bends in the same direction with respect to the travel direction of light rays at two consecutive reflecting surfaces and bends in a direction different from the above-mentioned direction at the other reflecting surface.

The function of the tenth finder optical system will be described below.

In the tenth finder optical system, two transmitting surfaces and three reflecting surfaces of the prism can be formed from independent surface configurations, respectively. This is favorable from the viewpoint of performance. Further, performance degradation is small even when the angle of each reflecting surface is set relatively large. Therefore, the degree of freedom for the exit direction is high, so that it is possible to dispose the prism while taking into consideration the layout of the camera. In addition, at one of the three reflecting surfaces, the optical path bends in a different direction from the direction of bending at the other two reflecting surfaces. Therefore, even when the reflection angle is reduced, it is unlikely that the prism will interfere with another optical system or the effective portions of the reflecting surfaces will overlap each other. Accordingly, it is possible to construct a compact and high-performance prism.

In this case, it is desirable that the first transmitting surface of the prism should have a negative power.

As has been stated above, it is preferable to arrange the optical system in the form of a telephoto type lens system from the viewpoint of attaining a reduction in thickness. In this case, if all of the negative power is given to a decentered reflecting surface, the amount of decentration aberrations produced by this surface becomes large. This is unfavorable from the viewpoint of performance. In addition, of the transmitting surfaces, the first transmitting surface, which is the entrance surface, is more away from the intermediate image than the other transmitting surface. Therefore, at the first transmitting surface, the axial ray height is high, and this is effective in correcting aberrations. Accordingly, it is preferable to give a negative power to the first transmitting surface of the prism.

In addition, it is desirable that the reflection angle at the first reflecting surface of the prism should satisfy the following condition:

$$30°<\theta_{C1}<600 \quad (29)$$

where $\theta_{C1}$ is the reflection angle at the first reflecting surface.

In Example 4 (described later), $\theta_{C1}$ is 43.8°. Because it folds the axial principal ray first, the first reflecting surface affects the size of the optical system and the prism arrangement adversely unless the reflection angle at the first reflecting surface is set appropriately. Therefore, it is desirable to satisfy the condition (29). If Ac, is not smaller than the upper limit of the condition (29), i.e. 60°, the second reflecting surface is placed closer to the pupil. Consequently, it becomes impossible to attain a reduction in thickness. If $\theta_{C1}$ is not larger than the lower limit, i.e. 30°, the third reflecting surface interferes with the objective optical system undesirably.

It is preferable to satisfy the following condition:

$$38°<\theta_{C1}<52° \quad (30)$$

In addition, it is desirable that the reflection angle at the third reflecting surface of the prism should satisfy the following condition:

$$30°<\theta_{C3}<60° \quad (31)$$

where $\theta_{C3}$ is the reflection angle at the third reflecting surface.

In Example 4 (described later), $\theta_{C3}$ is 41.7°. It is desirable for the third reflecting surface to satisfy the condition (31). If $\theta_{C3}$ is not smaller than the upper limit of the condition (31), i.e. 60°, the third reflecting surface overlaps the effective portion of the second reflecting surface. If 6C3 is not larger than the lower limit, i.e. 30°, the amount of decentration aberrations produced by the third reflecting surface becomes large. This is unfavorable from the viewpoint of performance.

It is preferable to satisfy the following condition:

$$38°<\theta_{C3}<52° \quad (32)$$

In addition, it is desirable that the exit angle of the prism with respect to the optical axis entering the objective optical system should satisfy the following condition:

$$70°<\phi_C<100 \quad (33)$$

where $\phi_C$ is the exit angle of the prism with respect to the optical axis entering the objective optical system.

In Example 4 (described later), $\phi_C$ is 90°. It is desirable for the exit angle of the prism to satisfy the condition (33). If $\phi_C$ is not smaller than the upper limit of the condition (33), i.e. 110°, or not larger than the lower limit, i.e. 70°, the amount to which the ocular optical system extends in the direction of the entering optical axis increases. Consequently, it becomes impossible to attain a reduction in thickness.

It is preferable to satisfy the following condition:

$$80°\phi_C<10° \quad (34)$$

In addition, the present invention provides an eleventh finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes three reflecting surfaces. At least one of the reflecting surfaces has a rotationally asymmetric surface configuration. The first reflecting surface and third reflecting surface of the prism are independent of other transmitting and reflecting surfaces. The second reflecting surface of the prism is formed from the identical surface with the second transmitting surface of the prism. The prism has an optical path in which the axial principal ray or a projective axial principal ray defined by projecting the axial principal ray onto a plane containing a part of the axial principal ray bends in the same direction with respect to the travel direction of light rays at two consecutive reflecting surfaces and bends in a direction different from the above-mentioned direction at the other reflecting surface.

The function of the eleventh finder optical system will be described below.

In the eleventh finder optical system, two transmitting surfaces and two reflecting surfaces of the prism can be formed from independent surface configurations, respectively. This is favorable from the viewpoint of performance. Further, performance degradation is small even when the angle of each reflecting surface is set relatively large. Therefore, the degree of freedom for the exit direction is high, so that it is possible to dispose the prism while taking into consideration the layout of the camera. In addition, at one of the three reflecting surfaces, the optical path bends in a different direction from the direction of. bending at the other two reflecting surfaces. Therefore, even when the reflection angle is reduced, it is unlikely that the prism will interfere with another optical system or the effective portions of the reflecting surfaces will overlap each other. Accordingly, it is possible to construct a compact and high-performance prism. In addition, because total reflection takes place at one surface, the prism arrangement is favorable in terms of light quantity.

When the three reflecting surfaces of the prism are formed independently of each other, each pair of adjacent reflecting surfaces needs to have a sufficiently large separation therebetween to separate the effective portions of the reflecting surfaces from each other. Meanwhile, when a reflecting surface is arranged to have a total reflection critical angle, it can serve as both reflecting and transmitting surfaces. That is, a transmitting surface and a reflecting surface can be formed on the identical surface by using a total reflection critical angle. In the eighth arrangement of the present invention in particular, the optical path between the second and third reflecting surfaces is approximately parallel to the direction of the entering optical axis. Therefore, if these reflecting surfaces are formed from independent surfaces, it is necessary to increase the separation between the reflecting surfaces. This adversely affects the attainment of a reduction in thickness. Therefore, according to the present invention, the second reflecting surface and the second transmitting surface are formed from the identical surface, thereby setting a minimal separation between the second and third reflecting surfaces, and thus attaining a further reduction in thickness.

In this case, it is desirable that the first transmitting surface of the prism should have a negative power.

As has been stated above, it is preferable to arrange the optical system in the form of a telephoto type lens system from the viewpoint of attaining a reduction in thickness. In this case, if all of the negative power is given to a decentered reflecting surface, the amount of decentration aberrations produced by this surface becomes large. This is unfavorable from the viewpoint of performance. In addition, of the transmitting surfaces, the first transmitting surface, which is the entrance surface, is more away from the intermediate image than the other transmitting surface. Therefore, at the first transmitting surface, the axial ray height is high, and this is effective in correcting aberrations. Accordingly, it is preferable to give a negative power to the first transmitting surface of the prism.

In the eleventh finder optical system, it is desirable that the reflection angle at the first reflecting surface of the prism should satisfy the following condition:

$$20° < \theta_{D1} < 60° \quad (35)$$

where $\theta_{D1}$ is the reflection angle at the first reflecting surface.

In Example 1 (described later), $\theta_{D1}$ is 39.4°. Because it folds the axial principal ray first, the first reflecting surface affects the size of the optical system and the prism arrangement adversely unless the reflection angle at the first reflecting surface is set appropriately. Therefore, it is desirable to satisfy the condition (35). If $\theta_{D1}$ is not smaller than the upper limit of the condition (35), i.e. 60°, the second reflecting surface is placed closer to the pupil. Consequently, it becomes impossible to attain a reduction in thickness. If 8D1 is not larger than the lower limit, i.e. 20°, the third reflecting surface interferes with the objective optical system undesirably.

It is preferable to satisfy the following condition:

$$30° < \theta_{D1} < 50° \quad (36)$$

In this case, it is desirable that the reflection angle at the third reflecting surface of the prism should satisfy the following condition:

$$10° < \theta_{D3} < 50° \quad (37)$$

where $\theta_{D3}$ is the reflection angle at the third reflecting surface.

In Example 1 (described later), $\theta_{D3}$ is 29.3°. It is desirable for the third reflecting surface of the prism to satisfy the condition (37). If $\theta_{D3}$ is not smaller than the upper limit of the condition (37), i.e. 50°, rays are totally reflected by the second transmitting surface, failing to pass therethrough. If $\theta_{D3}$ is not larger than the lower limit, i.e. 10°, the amount of decentration aberrations produced by the third reflecting surface becomes large. This is unfavorable from the viewpoint of performance.

It is preferable to satisfy the following condition:

$$20° < \theta_{D3} < 40° \quad (38)$$

In addition, it is desirable that the exit angle of the prism with respect to the optical axis entering the objective optical system should satisfy the following condition:

$$20° < \phi_D < 60° \quad (39)$$

where $\phi_D$ is the exit angle of the prism with respect to the optical axis entering the objective optical system.

In Example 1 (described later), $\phi_D$ is 40.5°. It is desirable for the exit angle of the prism to satisfy the condition (39). If $\phi_D$ is not smaller than the upper limit of the condition (39), i.e. 60°, the prism and the objective optical system interfere with each other undesirably. If $\phi_D$ is not larger than the lower limit, i.e. 20°, it becomes necessary to increase the reflection angle at each surface. This is unfavorable from the viewpoint of performance.

It is preferable to satisfy the following condition:

$$30° < \phi_D < 50° \quad (40)$$

In addition, the present invention provides a twelfth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes three reflecting surfaces. At least one of the reflecting surfaces has a rotationally asymmetric surface configuration. The first reflecting surface and third reflecting surface of the prism are independent of other transmitting and reflecting surfaces. The second reflecting surface of the prism is formed from the identical surface with the first and second transmitting surfaces of the prism. The prism has an optical path in which the axial principal ray or a projective axial principal ray defined by projecting the axial principal ray onto a plane containing a part of the axial principal ray bends at each of the three reflecting surfaces in a direction different from the direction of bending at the preceding reflecting surface with respect to the travel direction of light rays.

The function of the twelfth finder optical system will be described below.

The prism in the twelfth finder optical system is very thin in thickness despite the fact that it has three reflecting surfaces. Moreover, the prism has an optical path in which the axial principal ray bends at each of the three reflecting surfaces in a direction different from the direction of bending at the preceding reflecting surface. Accordingly, the optical path extends in the lateral direction. Thus, the prism is unlikely to interfere with the objective optical system or the ocular optical system. For this reason, the reflection angle at each reflecting surface can be reduced, which is favorable from the viewpoint of performance. In addition, because total reflection takes place at one surface, the prism arrangement is favorable in terms of light quantity.

In this case, it is desirable that the first reflecting surface of the prism should have a negative power.

Because the second reflecting surface is the identical with the first transmitting surface, the second reflecting surface needs to have a total reflection critical angle. Therefore, if a strong power is given to the second reflecting surface, the amount of decentration aberrations produced by this surface becomes unfavorably large. The third reflecting surface is not very effective in correcting aberrations because the axial ray height is not very high at this surface. Accordingly, giving a strong power to the remaining reflecting surface (i.e. the first reflecting surface) is favorable from the viewpoint of aberration correcting performance. On the other hand, it is preferable to give a negative power to a surface of the prism from the viewpoint of attaining a reduction in thickness. Accordingly, it is preferable to give a negative power to the first reflecting surface.

In addition, it is desirable that the reflection angle at the first reflecting surface of the prism should satisfy the following condition:

$$15°<\theta_{E1}<45° \quad (41)$$

where $\theta_{E1}$ is the reflection angle at the first reflecting surface.

In Example 5 (described later), $\theta_{E1}$ is 30.4°. It is desirable for the first reflecting surface of the prism to satisfy the condition (41). If $\theta_{E1}$ is not smaller than the upper limit of the condition (41), i.e. 45°, the amount of decentration aberrations produced by the first reflecting surface becomes large, which is unfavorable from the viewpoint of performance. If $\theta_{E1}$ is not larger than the lower limit, i.e. 15°, it becomes difficult for rays to be totally reflected by the second reflecting surface.

It is preferable to satisfy the following condition:

$$20°<\theta_{E1}<40° \quad (42)$$

In addition, it is desirable that the reflection angle at the third reflecting surface of the prism should satisfy the following condition:

$$15°<\theta_{E3}<45° \quad (43)$$

where $\theta_{E3}$ is the reflection angle at the third reflecting surface.

In Example 5 (described later), $\theta_{E3}$ is 30.7°. It is desirable for the third reflecting surface of the prism to satisfy the condition (43). If $\theta_{E3}$ is not smaller than the upper limit of the condition (43), i.e. 45°, the amount of decentration aberrations produced by the third reflecting surface becomes large, which is unfavorable from the viewpoint of performance. If $\theta_{E3}$ is not larger than the lower limit, i.e. 15°, it becomes difficult for rays to be totally reflected by the second reflecting surface.

It is preferable to satisfy the following condition:

$$20°<\theta_{E3}<40° \quad (44)$$

In addition, it is desirable that the exit angle of the prism with respect to the optical axis entering the objective optical system should satisfy the following condition:

$$160°<\phi_E<200° \quad (45)$$

where $\phi_E$ is the exit angle of the prism with respect to the optical axis entering the objective optical system.

In Example 5 (described later), $\phi_E$ is 180°.

In the prism of this finder optical system, the first and second transmitting surfaces are the identical surface. Therefore, if the positional relationship between the entering optical axis and the exiting optical axis deviates from being parallel, decentration aberrations are produced in the prism undesirably. Accordingly, it is desirable for the exit angle of the prism to satisfy the condition (45). If $\phi_E$ is not smaller than the upper limit of the condition (45), i.e. 200°, or not larger than the lower limit, i.e. 160°, the amount of decentration aberrations produced in the prism becomes large, which is unfavorable from the viewpoint of performance.

It is preferable to satisfy the following condition:

$$170°<\phi_E<190° \quad (46)$$

In addition, the present invention provides a thirteenth finder optical system that includes, in order from the object side thereof: an objective optical system having a positive refracting power; an image-inverting optical system for erecting an intermediate image formed by the objective optical system; and an ocular optical system having a positive refracting power. The objective optical system has at least two movable units moving when zooming is performed. A prism is placed on the object side of the intermediate image formed by the objective optical system. The prism includes three reflecting surfaces. At least one of the reflecting surfaces has a rotationally asymmetric surface configuration. The three reflecting surfaces are all independent of other transmitting and reflecting surfaces. The prism has an optical path in which the axial principal ray or a projective axial principal ray defined by projecting the axial principal ray onto a plane containing a part of the axial principal ray bends in the same direction with respect to the travel direction of light rays at the first reflecting surface and the second reflecting surface and is twisted by the third reflecting surface.

The function of the thirteenth finder optical system will be described below.

By providing a prism incorporating one reflection as a component of the ocular optical system, it becomes possible to obtain an erect image without using a roof surface, which requires relatively strict manufacturing accuracy. In addition, because two transmitting surfaces and three reflecting surfaces of the prism can be formed from independent surface configurations, respectively, the prism arrangement is favorable from the viewpoint of performance.

In the thirteenth finder optical system, it is desirable that the reflection angle at the first reflecting surface of the prism should satisfy the following condition:

$$30°<\theta_{F1}<60° \quad (47)$$

where $\theta_{F1}$ is the reflection angle at the first reflecting surface.

In Example 6 (described later), $\theta_{F1}$ is 45°. It is desirable for the first reflecting surface of the prism to satisfy the condition (47). If $\theta_{F1}$ is not smaller than the upper limit of the condition (47). i.e. 60°, the second reflecting surface is placed closer to the pupil. Consequently, it becomes impossible to attain a reduction in thickness. If $\theta_{F1}$ is not larger than the lower limit, i.e. 30°, the third reflecting surface interferes with the objective optical system undesirably.

It is preferable to satisfy the following condition:

$$35°<\theta_{F1}<55° \quad (48)$$

In addition, it is desirable that the reflection angle at the third reflecting surface of the prism should satisfy the following condition:

$$30°<\theta_{F3}<60° \quad (49)$$

where $\theta_{F3}$ is the reflection angle at the third reflecting surface.

In Example 6 (described later), $\theta_{F3}$ is 45°. It is desirable for the third reflecting surface of the prism to satisfy the condition (49). If $\theta_{F3}$ is not smaller than the upper limit of the condition (49), i.e. 60°, the third reflecting surface overlaps the effective portion of the second reflecting surface. If 6.3 is not larger than the lower limit, i.e. 30°, the amount of decentration aberrations produced by the third reflecting surface becomes large. This is unfavorable from the viewpoint of performance.

It is preferable to satisfy the following condition:

$$35°<\theta_{F3}<55° \quad (50)$$

In addition, it is desirable that the exit angle of the prism with respect to the optical axis entering the objective optical system should satisfy the following condition:

$$70° < \phi_F < 110° \quad (51)$$

where $\phi_F$ is the exit angle of the prism with respect to the optical axis entering the objective optical system.

In Example 6 (described later), $\phi_F$ is 90°. It is desirable for the exit angle of the prism to satisfy the condition (51). If $\phi_F$ is not smaller than the upper limit of the condition (51), i.e. 110°, or not larger than the lower limit, i.e. 70°, the amount to which the ocular optical system extends in the direction of the entering optical axis increases. Consequently, it becomes impossible to attain a reduction in thickness.

It is preferable to satisfy the following condition:

$$80 < \phi_F < 100° \quad (52)$$

In any of the above-described finder optical systems, it is desirable that the prism should be placed closer to the pupil than any of the movable units.

The back focus of an optical system can be shortened by selecting an appropriate lens type. However, it is difficult to reduce the back focus to zero. That is, there is a limit to the reduction of the back focus. In- a zoom lens system in particular, it is difficult to shorten the back focus because the focal length is long at the telephoto end. In the case of the objective system of a finder optical system, a reduction in size cannot be attained unless the space for the back focus is effectively disposed. Therefore, it is preferable in the present invention that the optical path should be folded by the prism to minimize the space required for the back focus. Accordingly, it is desirable that the prism should be placed closer to the pupil than any of the movable units having a zooming function.

Numerical Examples 1 to 6 of the finder optical system according to the present invention will be described below. It should be noted that constituent parameters of each example will be shown later.

In each Example, as shown in FIGS. 1 to 8, the center of a specific plane (hypothetic plane of surface No. 5: HRP) of the optical system is defined as the origin of a decentered optical system, and an axial principal ray is defined by a ray emanating from the center of an object (not shown in the figures) and passing through the center of a stop (eye point: EP). A Z-axis is taken in the direction in which the axial principal ray travels from the object center to the first surface of the optical system. A plane containing the Z-axis and the center of an image plane formed by the objective optical system is defined as a YZ-plane. A Y-axis is taken in a direction in a plane in which rays are folded by the surfaces of the optical system, perpendicularly intersecting the Z-axis in the YZ-plane. The direction in which the Z-axis extends from the object point toward the first surface of the optical system is defined as a positive direction of the Z-axis. The upward direction as viewed in the figures is defined as a positive direction of the Y-axis. An axis that constitutes a right-handed orthogonal coordinate system in combination with the Y- and Z-axes is defined as an X-axis.

In Examples 1 to 5, decentration of each surface is made in the YZ-plane, and one and only plane of symmetry of each rotationally asymmetric free-form surface is the YZ-plane. In Example 6, the third reflecting surface is decentered in the XY-plane, and each rotationally asymmetric free-form surface has no plane of symmetry.

Regarding decentered surfaces, each surface is given displacements in the X-, Y- and Z-axis directions (X, Y and Z, respectively) of the vertex position of the surface from the origin of the optical system, and tilt angles (degrees) of the center axis of the surface [the Z-axis of the following equation (a) in regard to free-form surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical functional surfaces constituting the optical system in each example, a specific surface and a surface subsequent thereto are given a surface separation when these surfaces form a coaxial optical system. In addition, the refractive index and Abbe's number of each medium are given according to the conventional method.

It should be noted that those terms concerning aspherical surfaces for which no data is shown are zero. The refractive index is expressed by the refractive index for the spectral d-line (wavelength: 587.56 nanometers). Lengths are given in millimeters.

The configuration of a free-form surface used in the present invention is defined by the following equation (a). The Z-axis of the defining equation is the axis of the free-form surface.

$$Z = cr^2 / \left[1 + \{1 - (1+k)c^2 r^2\}^{1/2}\right] + \sum_{j=2}^{66} C_j X^m Y^n \quad (a)$$

In the equation (a), the first term is a spherical surface term, and the second term is a free-form surface term.

In the spherical surface term:
c: the curvature at the vertex
k: a conic constant $$r = (X^2 + Y^2)^{1/2}$$

The free-form surface term is given by $$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

where $C_j$ (j is an integer of 2 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms of odd-numbered degrees with respect to X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... are set equal to zero. By doing so, it is possible to obtain a free-form surface having only one plane of symmetry parallel to the YZ-plane.

A free-form surface having only one plane of symmetry parallel to the XZ-plane is obtained by making all terms of odd-numbered degrees with respect to Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... are set equal to zero. By doing so, it is possible to obtain a free-form surface having only one plane of symmetry parallel to the XZ-plane.

Free-form surfaces may also be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$x = R \times \cos(A) \quad\quad\quad (b)$$
$$y = R \times \sin(A)$$
$$Z = D_2 + D_3 R\cos(A) + D_4 R\sin(A) + D_5 R^2\cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$
$$D_{26}(20R^6 - 30R^4 + 12R^2 - 1) + D_{27}(15R^6 - 20R^4 + 6R^2)\sin(2A) +$$
$$D_{28}(6R^6 - 5R^4)\sin(4A) + D_{29} R^6 \sin(6A) \dots$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ ... should be used.

Other examples of surfaces usable in the present invention are expressed by the following defining equation (c):

$$Z = \Sigma\Sigma C_{nm} XY$$

Assuming that k=7 (polynomial of degree 7), for example, a free-form surface is expressed by an expanded form of the above equation as follows:

$$Z = C_2 + C_3 y + C_4|x| + C_5 y^2 + C_6 y|x| + C_7 x^2 + C_8 y^3 + \quad (c)$$
$$C_9 y^2|x| + C_{10} yx^2 + C_{11}|x^3| + C_{12} y^4 + C_{13} y^3|x| + C_{14} y^2 x^2 +$$
$$C_{15} y|x^3| + C_{16} x^4 + C_{17} y^5 + C_{18} y^4|x| + C_{19} y^3 x^2 + C_{20} y^2|x^3| +$$
$$C_{21} yx^4 + C_{22}|x^5| + C_{23} y^6 + C_{24} y^5|x| + C_{25} y^4 x^2 + C_{26} y^3|x^3| +$$
$$C_{27} y^2 x^4 + C_{28} y|x^5| + C_{29} x^6 + C_{30} y^7 + C_{31} y^6|x| + C_{32} y^5 x^2 +$$
$$C_{33} y^4|x^3| + C_{34} y^3 x^4 + C_{35} y^2|x^5| + C_{36} yx^6 + C_{37}|x^7|$$

Although in the examples of the present invention the surface configuration is expressed by a free-form surface using the above equation (a), it should be noted that the same advantageous effect can be obtained by using the above equation (b) or (c).

Aspherical surfaces are rotationally symmetric aspherical surfaces given by the following equation:

$$Z = (y^2/R)/[1 + \{1 - (1+K)y^2/R^2\}^{1/2}] + Ay^4 + By^6 + Cy^8 + Dy^{10} + \dots \quad (d)$$

In the above equation, Z is an optical axis (axial principal ray) for which the direction of travel of light is defined as a positive direction, and y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

Although the prisms and refracting lenses in Examples 1 to 6 are formed by using a plastic material, it should be noted that these optical elements may be made of glass. When a plastic material is used, in particular, it is desirable to use a material of low moisture absorption because performance degradation caused by environmental changes is minimized by the use of such a material.

Of the surfaces of the refracting lenses of the objective and ocular optical systems, the spherical surfaces may be changed to rotationally symmetric aspherical surfaces. Similarly, the spherical or aspherical surfaces may be changed to rotationally asymmetric free-form surfaces.

EXAMPLE 1

Figure 2:
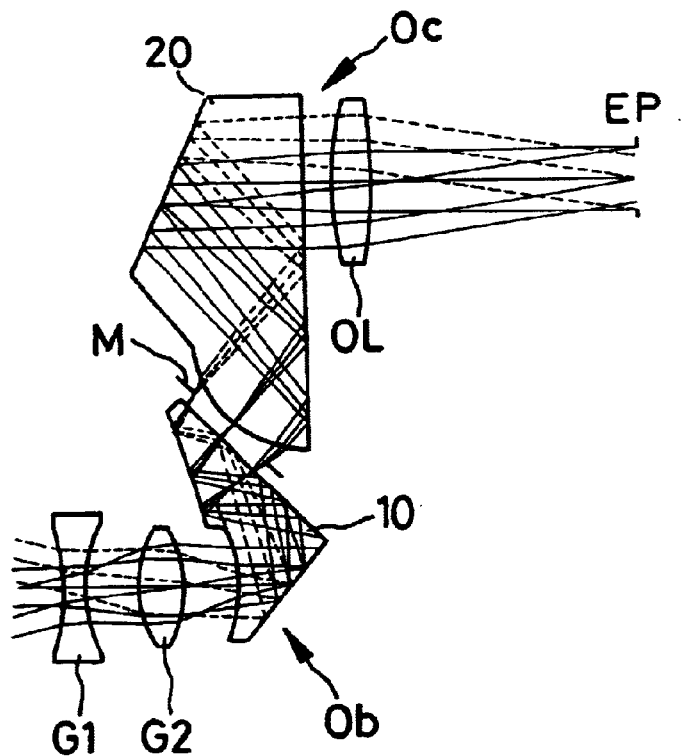
FIG. 2 is a sectional view of the finder optical system according to Example 1 at the standard position.
Figure 3:
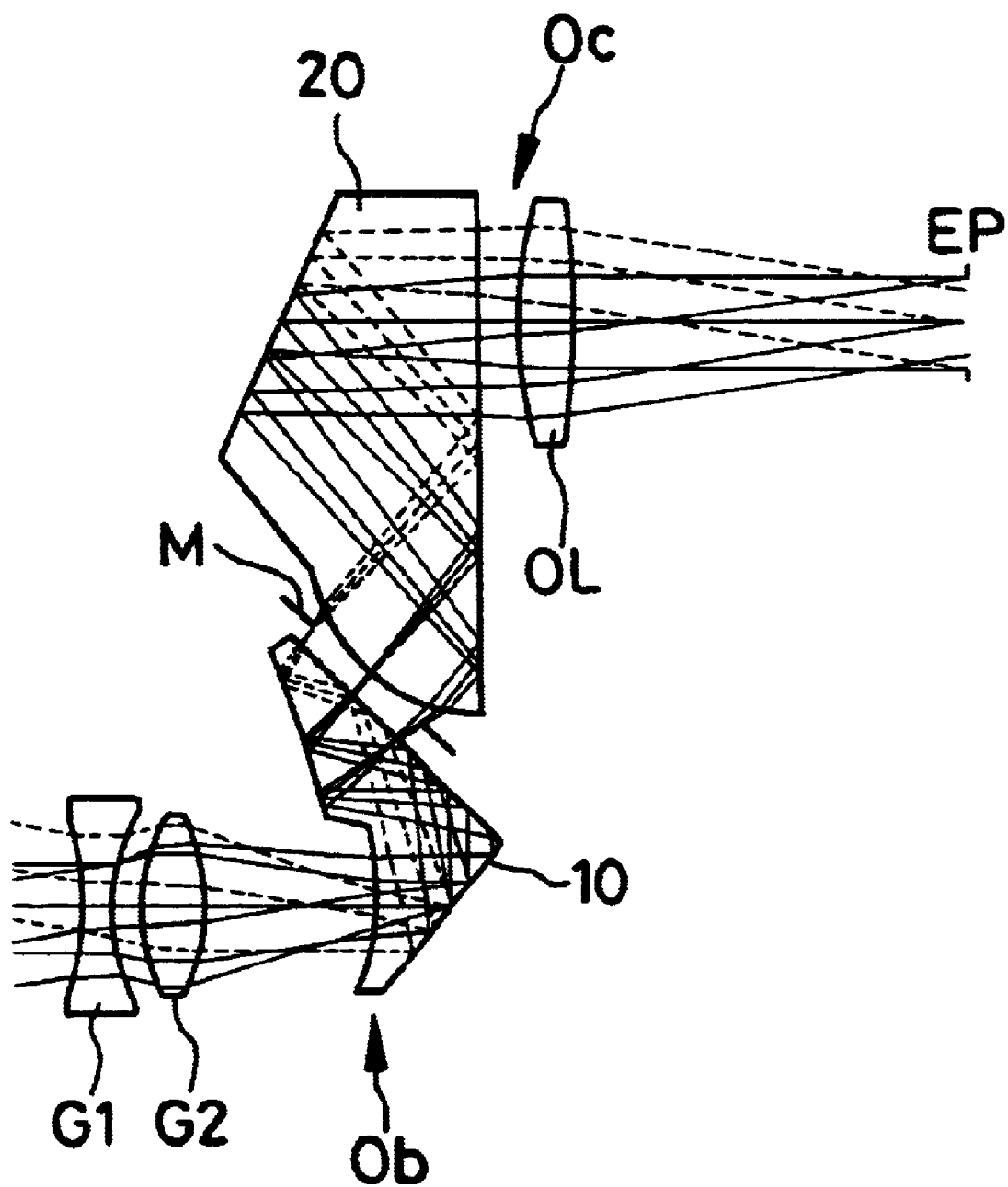
FIG. 3 is a sectional view of the finder optical system according to Example 1 at the telephoto end.

FIGS. 1 to 3 are sectional views of Example 1 taken along the YZ-plane containing the axial principal ray. FIG. 1 is a sectional view of Example 1 at the wide-angle end. FIG. 2 is a sectional view of Example 1 at the standard position. FIG. 3 is a sectional view of Example 1 at the telephoto end.

In Example 1, the horizontal half field angle is 14.19°, and the vertical half field angle is 21.36°. The pupil diameter is 4 millimeters. The size of the intermediate image is 2.04× 2.96 millimeters (the diagonal image height: 3.59 millimeters). The finder magnification is 0.4 to 0.96 times. In terms of the focal length of a rotationally symmetric optical system, the focal length of the objective optical system is equivalent to 8.43 millimeters to 20.26 millimeters. The focal length of the ocular optical system is 21.0 millimeters. The displacements of each of the surface Nos. 6 to 16 are expressed by the amounts of displacement from the decentration reference plane of surface No. 5 (hypothetic plane: HRP).

The finder optical system according to Example 1 has, in order in which light passes from the object side, an objective optical system Ob, a field mask M for defining the visual field, and an ocular optical system Oc. The objective optical system Ob includes a lens group having a negative first unit G1 consisting essentially of a biconcave lens and a positive second unit G2 consisting essentially of a biconvex lens. The objective optical system Ob further includes a first prism 10 of negative power which has a first transmitting surface 11 of negative power, a first reflecting surface 12 of negative power, a second reflecting surface 13 of positive power, a third reflecting surface 14 of negative power, and a second transmitting surface 15 of positive power. The ocular optical system Oc includes a second prism 20 having a first transmitting surface 21 of positive power, a first reflecting surface 22, a second reflecting surface 23 formed from a roof surface, and a second transmitting surface 24. The ocular optical system Oc further includes a biconvex positive lens OL. During zooming, the first unit G1 and the second unit G2 move. The prism 10, which forms the third unit, is stationary. It should be noted that in FIGS. 1 to 3, the eye point is denoted by EP (the same shall apply hereinafter).

In the first prism 10 of Example 1, the first reflecting surface 12, the third reflecting surface 14 and the first transmitting surface 11 are all independent optical functional surfaces that are separate from other surfaces. The second transmitting surface 15 and the second reflecting surface 13 are formed from the identical optical functional surface having both transmitting and reflecting actions. The first transmitting surface 11, the second transmitting surface 15, the first reflecting surface 12, the second reflecting surface 13 and the third reflecting surface 14 are all formed from rotationally asymmetric free-form surfaces. The first prism 10 has an optical path in which the axial principal ray bends in the same direction at the first reflecting surface 12 and the second reflecting surface 13 with respect to the travel direction of light and further bends in the opposite direction to the above at the third reflecting surface 14.

Although the reflecting surfaces 22 and 23 of the second prism 20 in this example are formed from plane surfaces, these surfaces may also be formed from free-form surfaces. The arrangement may be such that the second transmitting surface 24 and the first reflecting surface 22 of the second prism 20 are formed from independent surfaces, and a roof surface is provided on the first reflecting surface 22.

EXAMPLE 2

Figure 4:
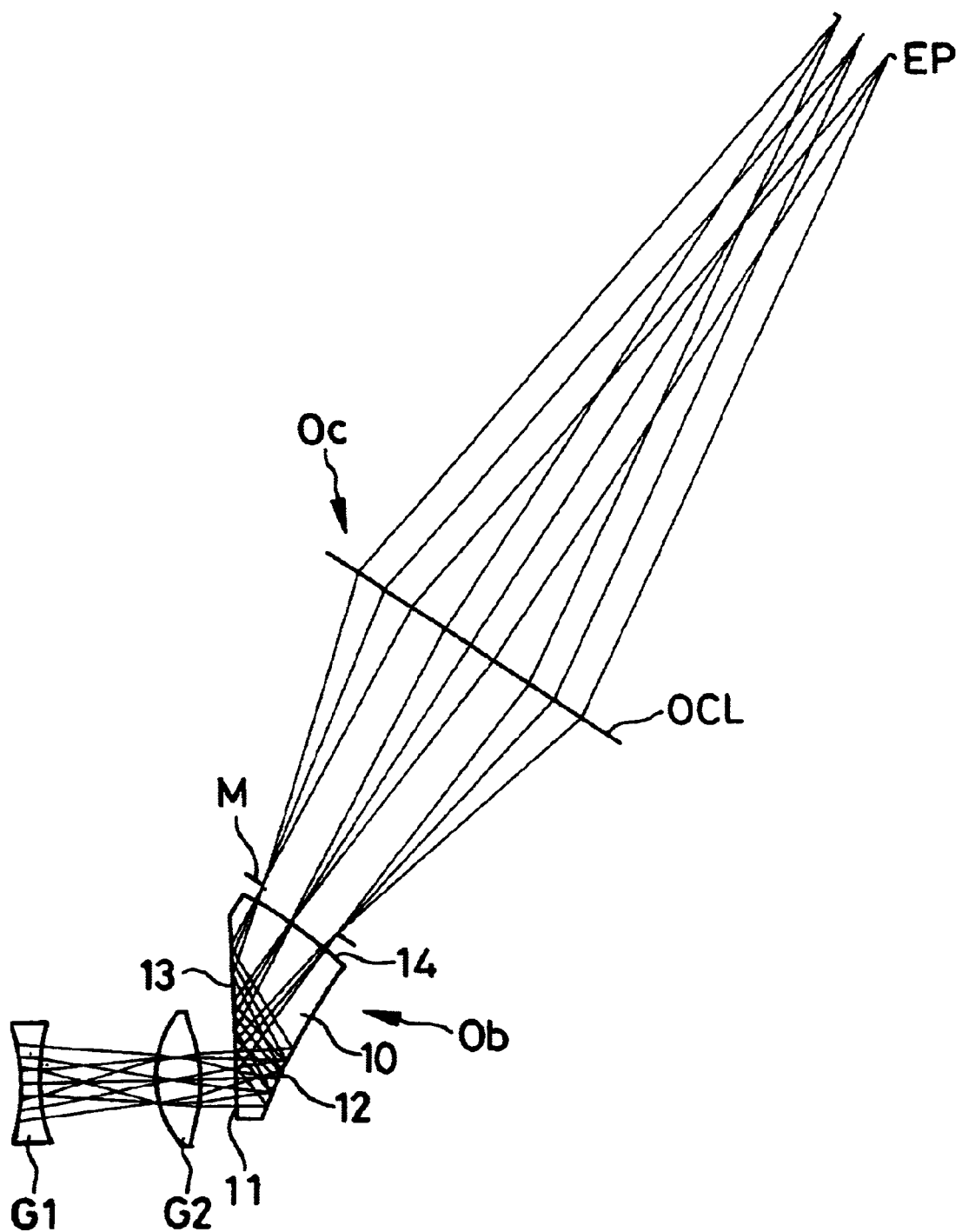
FIG. 4 is a sectional view of a finder optical system according to Example 2 of the present invention at the wide-angle end.

FIG. 4 is a sectional view of Example 2 taken along the YZ-plane containing the axial principal ray. FIG. 4 is a sectional view of Example 2 at the wide-angle end. Illustration of sectional views showing Example 2 at the standard position and the telephoto end is omitted (the same shall apply to Examples 3 to 6).

In Example 2, the horizontal half field angle is 14.19°, and the vertical half field angle is 21.36°. The pupil diameter is 4 millimeters. The size of the intermediate image is 2.04× 2.96 millimeters (the diagonal image height: 3.59 millimeters). The finder magnification is 0.4 to 0.96 times. In terms of the focal length of a rotationally symmetric optical system, the focal length of the objective optical system is equivalent to 8.43 millimeters to 20.26 millimeters. The focal length of the ocular optical system is 21.0 millimeters. The displacements of each of the surface Nos. 6 to 10 are expressed by the amounts of displacement from the decentration reference plane of surface No. 5 (hypothetic plane: HRP).

The finder optical system according to Example 2 has an objective optical system Ob, a field mask M for defining the visual field, and an ocular optical system Oc. The objective optical system Ob includes a lens group having a negative first unit G1 consisting essentially of a biconcave lens and a positive second unit G2 consisting essentially of a biconvex lens. The objective optical system Ob further includes a prism 10 of negative power which has a first transmitting surface 11 with a positive power in the X-direction and a negative power in the Y-direction, a first reflecting surface 12 of negative power, a second reflecting surface 13 with a positive power in the X-direction and a negative power in the Y-direction, and a second transmitting surface 14 of positive power. The ocular optical system Oc is formed from an ideal lens OCL. During zooming, the first unit G1 and the second unit G2 move. The prism 10, which forms the third unit, is stationary.

In the prism 10 of Example 2, the first reflecting surface 12 and the second transmitting surface 14 are both independent optical functional surfaces that are separate from other surfaces. The first transmitting surface 11 and the second reflecting surface 13 are formed from the identical optical functional surface having both transmitting and reflecting actions. The first transmitting surface 11, the second transmitting surface 14, the first reflecting surface 12 and the second reflecting surface 13 are all formed from rotationally asymmetric free-form surfaces. The prism 10 has an optical path in which the axial principal ray bends in opposite directions to each other at the first reflecting surface 12 and the second reflecting surface 13 with respect to the travel direction of light.

Figure 9:
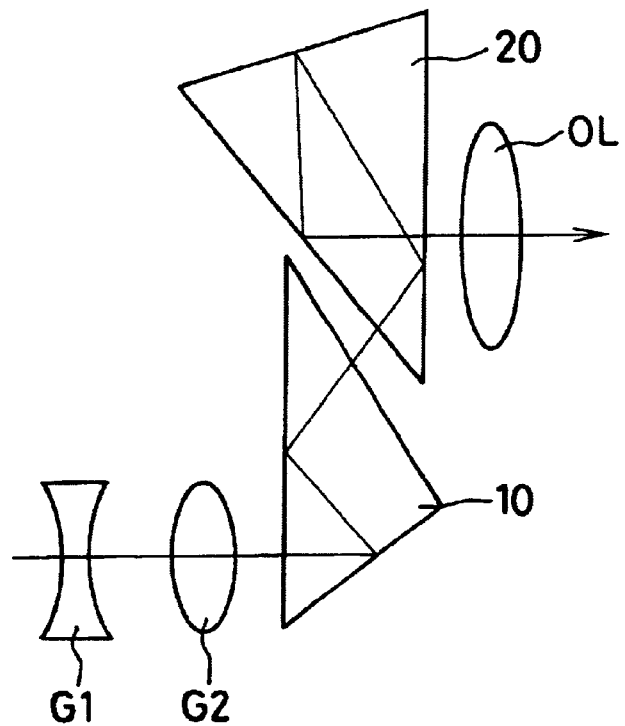
FIG. 9 is a diagram schematically showing a modification of the finder optical system according to Example 2.

It is preferable to place an image-inverting optical system on the pupil side of the intermediate image formation plane as shown in the schematic view of FIG. 9. By doing so, a thin finder optical system can be attained. In this case, the second prism 20 constitutes an image-inverting optical system, and it is necessary to provide a roof surface for inverting an image on the second reflecting surface 23. The transmitting surfaces and reflecting surfaces of the image-inverting optical system may also be formed from free-form surfaces.

EXAMPLE 3

Figure 5:
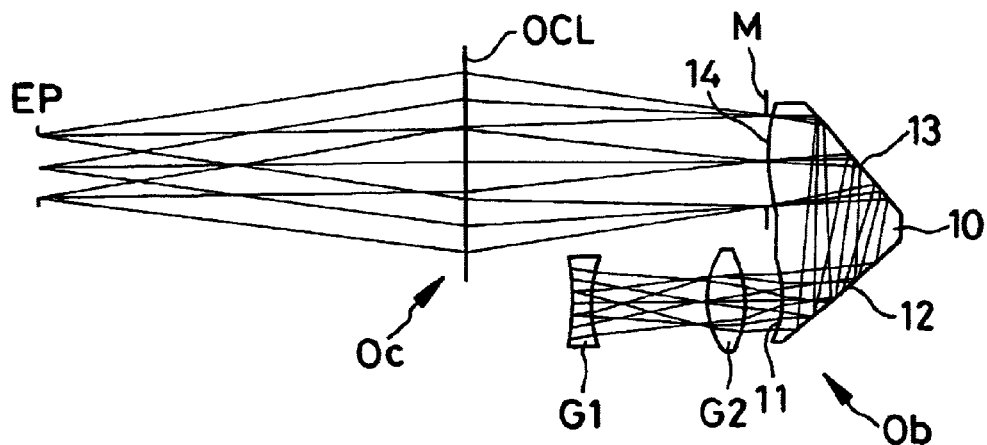
FIG. 5 is a sectional view of a finder optical system according to Example 3 of the present invention at the wide-angle end.

FIG. 5 is a sectional view of Example 3 taken along the YZ-plane containing the axial principal ray. In Example 3, the horizontal half field angle is 14.19°, and the vertical half field angle is 21.36°. The pupil diameter is 4 millimeters. The size of the intermediate image is 2.04×2.96 millimeters (the diagonal image height: 3.59 millimeters). The finder magnification is 0.4 to 0.96 times. In terms of the focal length of a rotationally symmetric optical system, the focal length of the objective optical system is equivalent to 8.43 millimeters to 20.26 millimeters. The focal length of the ocular optical system is 21.0 millimeters. The displacements of each of the surface Nos. 6 to 10 are expressed by the amounts of displacement from the decentration reference plane of surface No. 5 (hypothetic plane: HRP).

The finder optical system according to Example 3 has, in order in which light passes from the object side, an objective optical system Ob, a field mask M for defining the visual field, and an ocular optical system Oc. The objective optical system Ob includes a lens group having a negative first unit G1 consisting essentially of a biconcave lens and a positive second unit G2 consisting essentially of a biconvex lens. The objective optical system Ob further includes a prism 10 of positive power which has a first transmitting surface 11 of negative power, a first reflecting surface 12 of positive power, a second reflecting surface 13 with a positive power in the X-direction and a negative power in the Y-direction, and a second transmitting surface 14 of positive power. The ocular optical system Oc is formed from an ideal lens OCL. During zooming, the first unit G1 and the second unit G2 move. The prism 10, which forms the third unit, is stationary.

In the prism 10 of Example 3, the first reflecting surface 12, the second reflecting surface 13, the first transmitting surface 11 and the second transmitting surface 14 are all independent optical functional surfaces that are separate from other surfaces. The first transmitting surface 11, the second transmitting surface 14, the first reflecting surface 12 and the second reflecting surface 13 are all formed from rotationally asymmetric free-form surfaces. The prism 10 has an optical path in which the axial principal ray bends in the same direction at the first reflecting surface 12 and the second reflecting surface 13 with respect to the travel direction of light.

Figure 10:
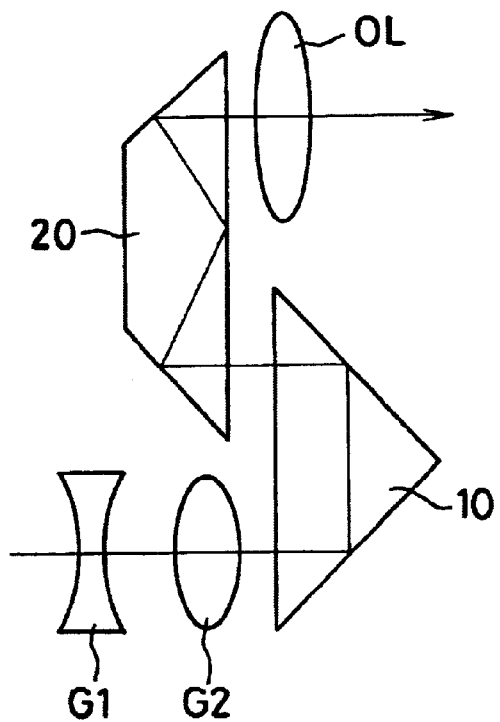
FIG. 10 is a diagram schematically showing a modification of the finder optical system according to Example 3.
Figure 11A:
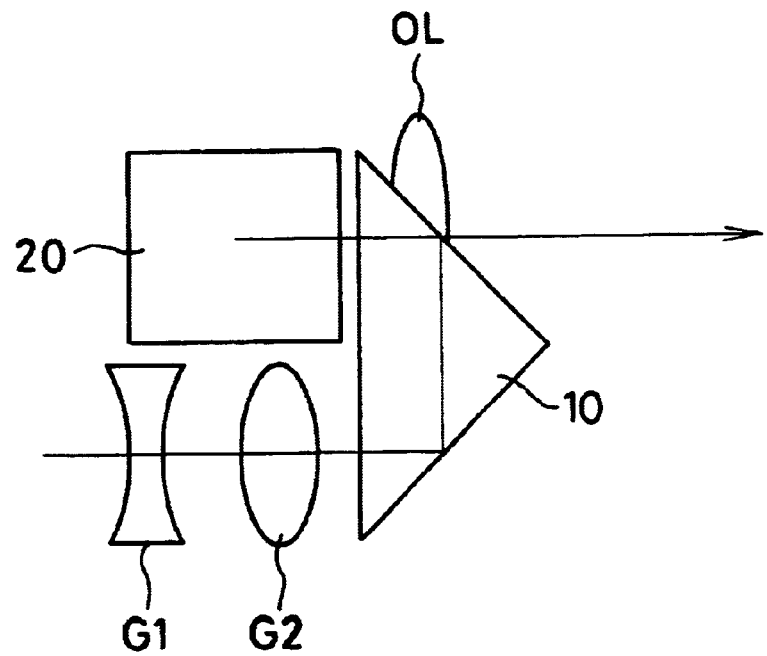
FIGS. 11(a) and 11(b) are diagrams schematically showing a modification of the finder optical system according to Example 3.
Figure 11B:
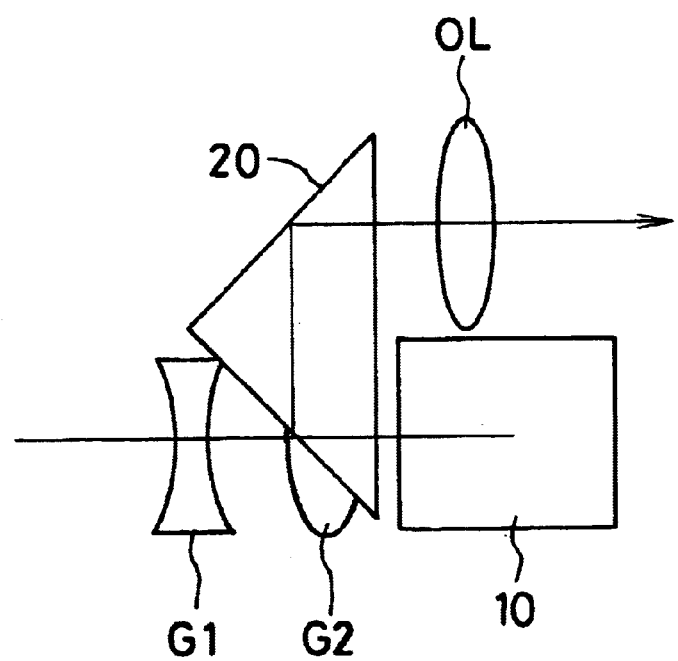

It is preferable to place an image-inverting optical system on the pupil side of the intermediate image formation plane as shown in the schematic view of FIG. 10 or 11. By doing so, a thin finder optical system can be attained. In the case of FIG. 10, the second prism 20 constitutes an image-inverting optical system, and it is necessary to provide a roof surface for inverting an image on the first reflecting surface 22 or the third transmitting surface 24. The transmitting surfaces and reflecting surfaces of the image-inverting optical system may also be formed from free-form surfaces. Part (a) of FIG. 11 is a side view, and part (b) of FIG. 11 is a top plan view. The second prism 20 constitutes an image-inverting optical system. The transmitting surfaces and reflecting surfaces of the image-inverting optical system may also be formed from free-form surfaces.

EXAMPLE 4

Figure 6:
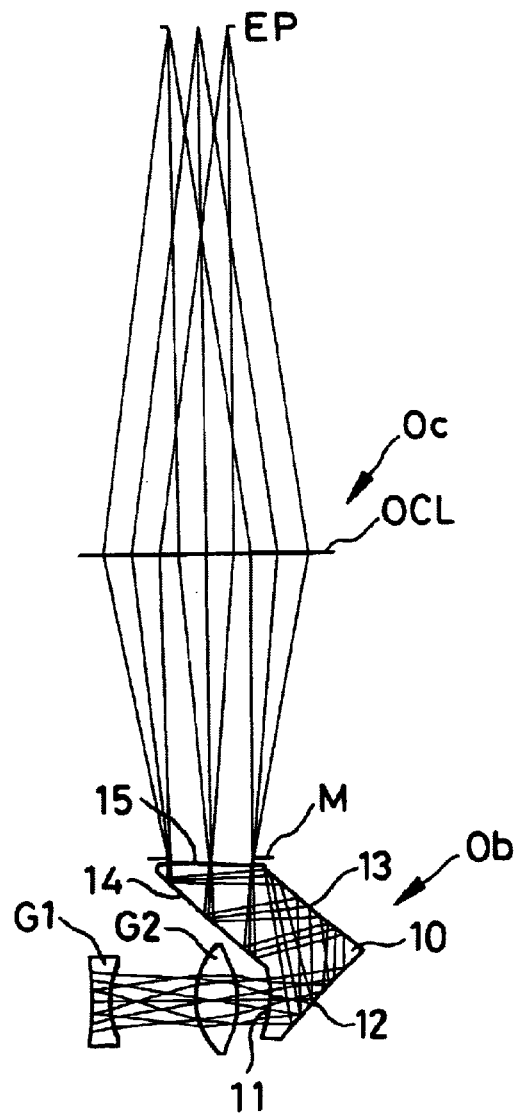
FIG. 6 is a sectional view of a finder optical system according to Example 4 of the present invention at the wide-angle end.

FIG. 6 is a sectional view of Example 4 taken along the YZ-plane containing the axial principal ray. In Example 4, the horizontal half field angle is 14.19°, and the vertical half field angle is 21.36°. The pupil diameter is 4 millimeters. The size of the intermediate image is 2.04×2.96 millimeters (the diagonal image height: 3.59 millimeters). The finder magnification is 0.4 to 0.96 times. In terms of the focal length of a rotationally symmetric optical system, the focal length of the objective optical system is equivalent to 8.43 millimeters to 20.26 millimeters. The focal length of the ocular optical system is 21.0 millimeters. The displacements of each of the surface Nos. 6 to 11 are expressed by the amounts of displacement from the decentration reference plane of surface No. 5 (hypothetic plane: HRP).

The finder optical system according to Example 4 has, in order in which light passes from the object side, an objective optical system Ob, a field mask M for defining the visual field, and an ocular optical system Oc. The objective optical system Ob includes a lens group having a negative first unit G1 consisting essentially of a biconcave lens and a positive second unit G2 consisting essentially of a biconvex lens. The objective optical system Ob further includes a prism 10 of negative power which has a first transmitting surface 11 of negative power, a first reflecting surface 12 of positive power, a second reflecting surface 13 of positive power, a third reflecting surface 14 of negative power, and a second transmitting surface 15 of positive power. The ocular optical system Oc is formed from an ideal lens OCL. During zooming, the first unit G1 and the second unit G2 move. The prism 10, which forms the third unit, is stationary.

In the prism 10 of Example 4, the first reflecting surface 12, the second reflecting surface 13, the third reflecting surface 14, the first transmitting surface 11 and the second transmitting surface 15 are all independent optical functional surfaces that are separate from other surfaces. The first transmitting surface 11, the second transmitting surface 15, the first reflecting surface 12, the second reflecting surface 13 and the third reflecting surface 14 are all formed from rotationally asymmetric free-form surfaces. The prism 10 has an optical path in which the axial principal ray bends in the same direction at the first reflecting surface 12 and the second reflecting surface 13 with respect to the travel direction of light and further bends in the opposite direction to the above at the third reflecting surface 14.

Figure 12:
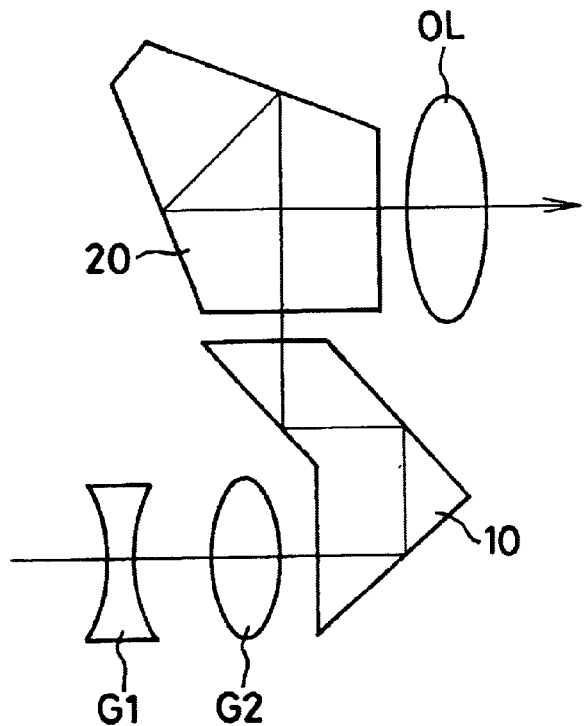
FIG. 12 is a diagram schematically showing a modification of the finder optical system according to Example 4.

It is preferable to place an image-inverting optical system on the pupil side of the intermediate image formation plane as shown in the schematic view of FIG. 12. By doing so, a thin finder optical system can be attained. In this case, the second prism 20 constitutes an image-inverting optical system, and it is necessary to provide a roof surface for inverting an image on one of the surfaces thereof. The transmitting surfaces and reflecting surfaces of the image-inverting optical system may also be formed from free-form surfaces.

EXAMPLE 5

Figure 7:
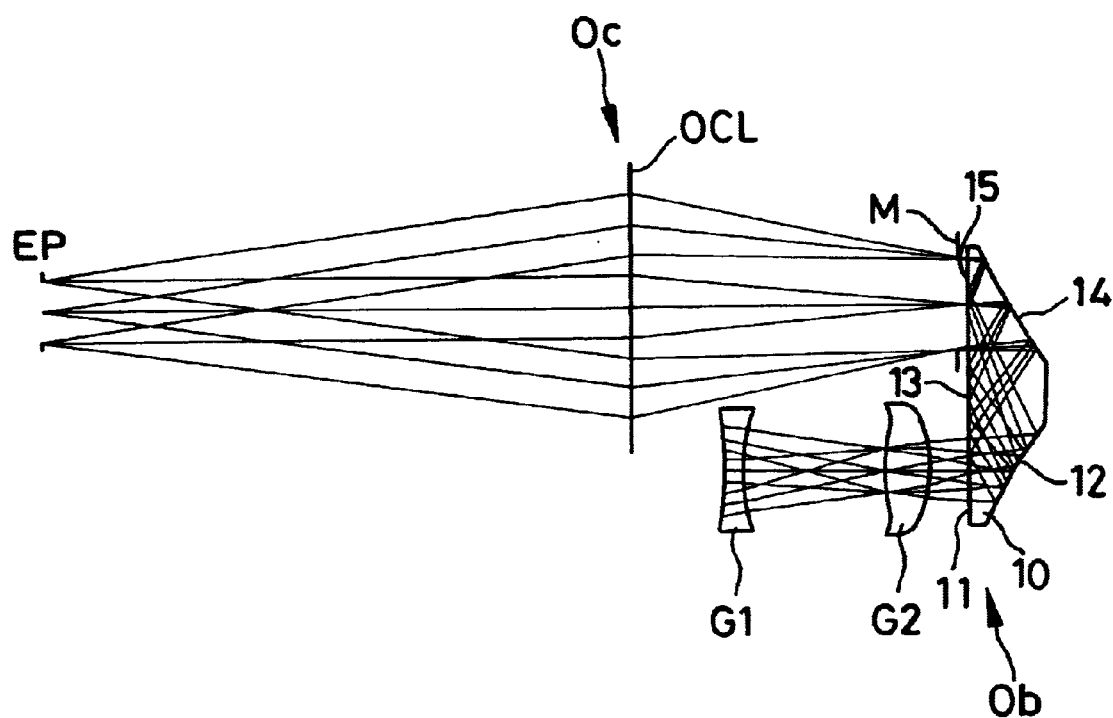
FIG. 7 is a sectional view of a finder optical system according to Example 5 of the present invention at the wide-angle end.

FIG. 7 is a sectional view of Example 5 taken along the YZ-plane containing the axial principal ray. In Example 5, the horizontal half field angle is 14.19°, and the vertical half field angle is 21.36°. The pupil diameter is 4 millimeters. The size of the intermediate image is 2.04×2.96 millimeters (the diagonal image height: 3.59 millimeters). The finder magnification is 0.4 to 0.96 times. In terms of the focal length of a rotationally symmetric optical system, the focal length of the objective optical system is equivalent to 8.43 millimeters 5 to 20.26 millimeters. The focal length of the ocular optical system is 21.0 millimeters. The displacements of each of the surface Nos. 6 to 11 are expressed by the amounts of displacement from the decentration reference plane of surface No. 5 (hypothetic plane: HRP).

The finder optical system according to Example 5 has, in order in which light passes from the object side, an objective optical system Ob, a field mask M for defining the visual field, and an ocular optical system Oc. The objective optical system Ob includes a lens group having a negative first unit G1 consisting essentially of a biconcave lens and a positive second unit G2 consisting essentially of a biconvex lens. The objective optical system Ob further includes a prism 10 of positive power which has a first transmitting surface 11 of positive power, a first reflecting surface 12 with a positive power in the X-direction and a negative power in the Y-direction, a second reflecting surface 13 of positive power, a third reflecting surface 14 with a negative power in the X-direction and a positive power in the Y-direction, and a second transmitting surface 15 of positive power. The ocular optical system Oc is formed from an ideal lens OCL. During zooming, the first unit G1 and the second unit G2 move. The prism 10, which forms the third unit, is stationary.

In the prism 10 of Example 5, the first reflecting surface 12 and the third reflecting surface 14 are both independent optical functional surfaces that are separate from other surfaces. The first transmitting surface 11, the second transmitting surface 15 and the second reflecting surface 13 are formed from the identical optical functional surface having both transmitting and reflecting actions. The first transmitting surface 11, the second transmitting surface 15, the first reflecting surface 12, the second reflecting surface 13 and the third reflecting surface 14 are all formed from rotationally asymmetric free-form surfaces. The prism 10 has an optical path in which the axial principal ray bends in the opposite directions to each other successively at the first reflecting surface 12, the second reflecting surface 13 and the third reflecting surface 14 with respect to the travel direction of light.

Figure 13:
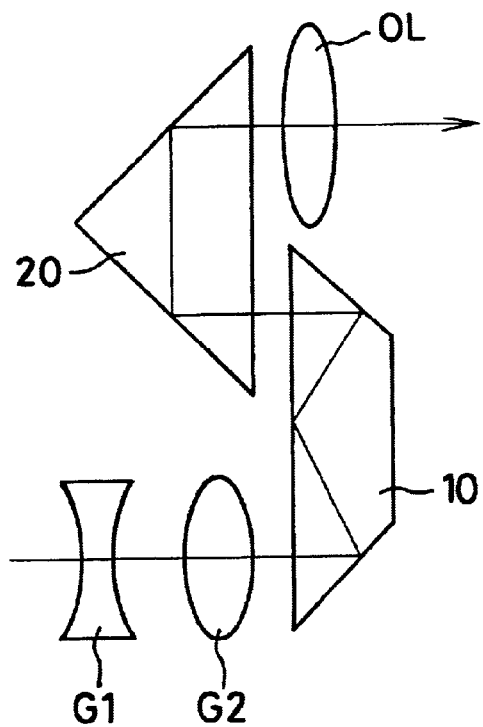
FIG. 13 is a diagram schematically showing a modification of the finder optical system according to Example 5.

It is preferable to place an image-inverting optical system on the pupil side of the intermediate image formation plane as shown in the schematic view of FIG. 13. By doing so, a thin finder optical system can be attained. In this case, the second prism 20 constitutes an image-inverting optical system, and it is necessary to provide a roof surface for inverting an image on one of the surfaces thereof. The transmitting surfaces and reflecting surfaces of the image-inverting optical system may also be formed from free-form surfaces.

EXAMPLE 6

Figure 8A:
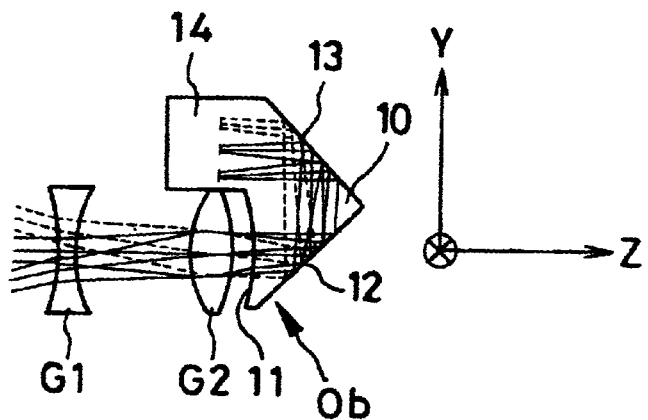
FIGS. 8(a) and 8(b) are sectional view of a finder optical system according to Example 6 of the present invention at the wide-angle end.
Figure 8B:
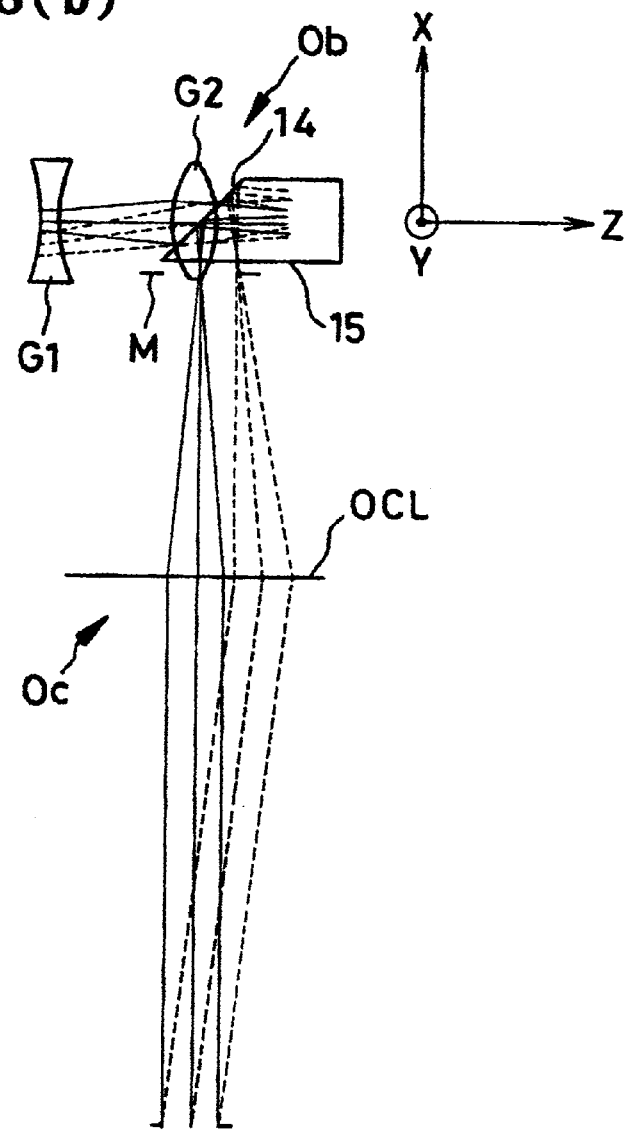

Part (a) of FIG. 8 is a sectional view of Example 6 taken along the YZ-plane containing the axial principal ray. Part (b) of FIG. 8 is a sectional view of Example 6 taken along the XZ-plane containing the axial principal ray.

In Example 6, the horizontal half field angle is 14.19°, and the vertical half field angle is 21.36°. The pupil diameter is 4 millimeters. The size of the intermediate image is 2.04× 2.96 millimeters (the diagonal image height: 3.59 millimeters). The finder magnification is 0.4 to 0.96 times. In terms of the focal length of a rotationally symmetric optical system, the focal length of the objective optical system is equivalent to 8.43 millimeters to 20.26 millimeters. The focal length of the ocular optical system is 21.0 millimeters. The displacements of each of the surface Nos. 6 to 11 are expressed by the amounts of displacement from the decentration reference plane of surface No. 5 (hypothetic plane: HRP).

The finder optical system according to Example 6 has, in order in which light passes from the object side, an objective optical system Ob, a field mask M for defining the visual field, and an ocular optical system Oc. The objective optical system Ob includes a lens group having a negative first unit G1 consisting essentially of a biconcave lens and a positive second unit G2 consisting essentially of a biconvex lens. The objective optical system Ob further includes a prism 10 of positive power which has a first transmitting surface 11 of negative power, a first reflecting surface 12 with a positive power in the X-direction and a negative power in the Y-direction, a second reflecting surface 13 with a negative power in the X-direction and a positive power in the Y-direction, a third reflecting surface 14 with a positive power in the X-direction and approximately zero power in the Y-direction, and a second transmitting surface 15 with a positive power in the X-direction and a negative power in the Y-direction. The ocular optical system Oc is formed from an ideal lens OCL. During zooming, the first unit G1 and the second unit G2 move. The prism 10, which forms the third unit, is stationary.

In the prism 10 of Example 6, the first reflecting surface 12, the second reflecting surface 13, the third reflecting surface 14, the first transmitting surface 11 and the second transmitting surface 15 are all independent optical functional surfaces that are separate from other surfaces. The first transmitting surface 11, the second transmitting surface 15, the first reflecting surface 12, the second reflecting surface 13 and the third reflecting surface 14 are all formed from rotationally asymmetric free-form surfaces. The prism 10 has an optical path in which the axial principal ray bends in the same direction at the first reflecting surface 12 and the second reflecting surface 13 with respect to the travel direction of light and which is twisted at the third reflecting surface 14.

Figure 14A:
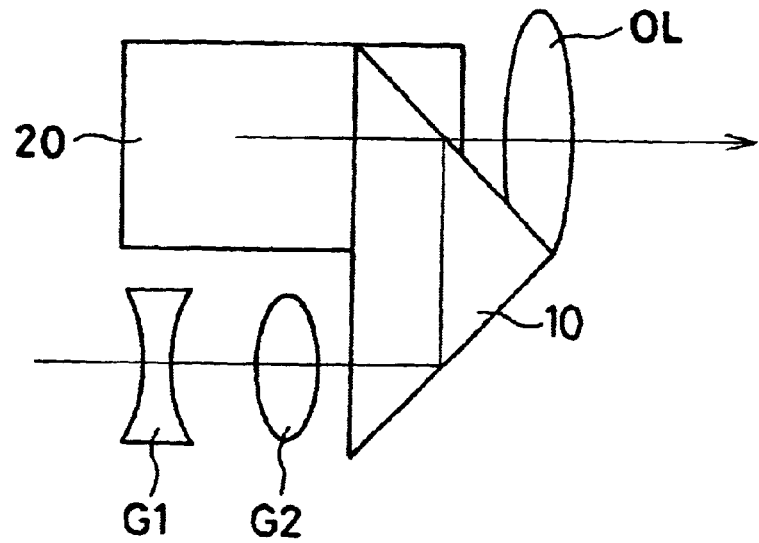
FIGS. 14(a) and 14(b) are diagrams schematically showing a modification of the finder optical system according to Example 6.
Figure 14B:
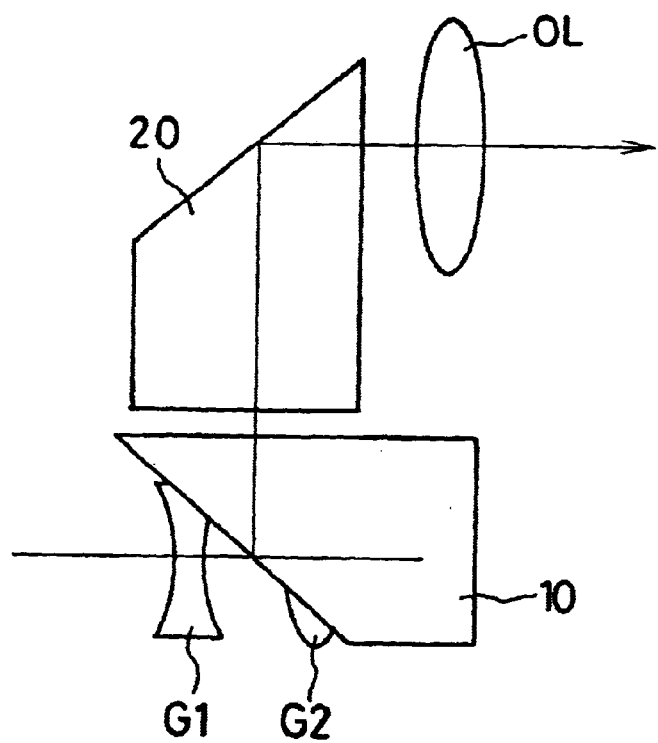

It is preferable to place an image-inverting optical system on the pupil side of the intermediate image formation plane as shown in the schematic view of FIG. 14. By doing so, a thin finder optical system can be attained. Part (a) of FIG. 14 is a side view, and part (b) of FIG. 14 is a top plan view. The second prism 20 constitutes an image-inverting optical system. The transmitting surfaces and reflecting surfaces of the image-inverting optical system may also be formed from free-form surfaces.

Commonly in all the foregoing Examples 1 to 6, the first unit G1 moves toward the pupil side during zooming from the wide-angle end to the intermediate position and moves toward the object side during zooming from the intermediate position to the telephoto end. The second unit G2 moves toward the object side during zooming from the wide-angle end to the telephoto end.

Constituent parameters of the foregoing Examples 1 to 6 are shown below. In the tables below: "FFS" denotes a free-form surface; "ASS" denotes a rotationally symmetric aspherical surface; "RS" denotes a reflecting surface; "MSK" denotes a field mask; "OCL" denotes an ocular lens (ideal lens); "EP" denotes an eye point (stop); and "HRP" denotes a hypothetic plane.

EXAMPLE 1

| Surface No. | Radius of curvature | Surface separation | Displacement and tilt | Refractive index | Abbe's No. |
|---|---|---|---|---|---|
| Object plane | ∞ | 3000.00 | | | |
| 1 | -11.86 | 1.20 | | 1.5842 | 30.5 |
| 2 | 8.20 | $d_2$ | | | |
| 3 | ASS① | 3.00 | | 1.4924 | 57.6 |
| 4 | ASS② | $d_4$ | | | |
| 5 | ∞ (HRS) | | | | |
| 6 | FFS① | | (1) | 1.5254 | 56.2 |
| 7 | FFS② (RS) | | (2) | 1.5254 | 56.2 |
| 8 | FFS③ (RS) | | (3) | 1.5254 | 56.2 |
| 9 | FFS④ (RS) | | (4) | 1.5254 | 56.2 |
| 10 | FFS③ | | (3) | | |
| 11 | ∞ (MSK) | | (5) | | |
| 12 | 7.55 | | (6) | 1.5254 | 56.2 |
| 13 | ∞ (RS) | | (7) | 1.5254 | 56.2 |
| 14 | ∞ (RS) | | (8) | 1.5254 | 56.2 |
| 15 | ∞ | | (7) | | |
| 16 | ASS③ | 2.50 | (9) | 1.4924 | 57.6 |
| 17 | -30.03 | 17.00 | | | |
| 18 | ∞ (EP) | | | | |

ASS①

R  5.29
K  0.0000
A  $-6.4744 \times 10^{-4}$
B  $-8.5852 \times 10^{-5}$
C  $6.5776 \times 10^{-8}$

ASS②

R  -6.46
K  0.0000
A  $1.4010 \times 10^{-3}$
B  $-7.6860 \times 10^{-5}$
C  $1.3589 \times 10^{-6}$

ASS③

R  16.56
K  0.0000
A  $-1.6574 \times 10^{-4}$
B  $4.1116 \times 10^{-6}$
C  $-9.8958 \times 10^{-8}$

FFS①

| $C_4$ | $-4.9131 \times 10^{-2}$ | $C_6$ | $-4.9592 \times 10^{-2}$ | $C_8$ | $1.7062 \times 10^{-3}$ |
| $C_{10}$ | $2.6485 \times 10{-3}$ | $C_{11}$ | $2.1497 \times 10^{-5}$ | $C_{13}$ | $-2.7609 \times 10^{-3}$ |
| $C_{15}$ | $-9.0009 - 10^{-4}$ | | | | |

FFS②

| $C_4$ | $-1.0935 \times 10^{-3}$ | $C_6$ | $-1.3486 \times 10^{-3}$ | $C_8$ | $3.7172 \times 10^{-4}$ |
| $C_{10}$ | $6.6094 \times 10^{-4}$ | $C_{11}$ | $3.3892 \times 10^{-5}$ | $C_{13}$ | $-1.3656 \times 10^{-4}$ |
| $C_{15}$ | $1.4937 \times 10^{-4}$ | | | | |

FFS③

| $C_4$ | $-3.8102 \times 10^{-3}$ | $C_6$ | $-3.5527 \times 10^{-4}$ | $C_8$ | $-1.9399 \times 10^{-4}$ |
| $C_{10}$ | $4.2586 \times 10^{-4}$ | $C_{11}$ | $8.7822 \times 10^{-4}$ | $C_{13}$ | $2.3146 \times 10^{-4}$ |
| $C_{15}$ | $4.0294 \times 10^{-5}$ | | | | |

FFS④

| $C_4$ | $-6.5727 \times 10^{-3}$ | $C_6$ | $-4.3521 \times 10-3$ | $C_8$ | $-2.7068 \times 10^{-4}$ |
| $C_{10}$ | $5.1724 \times 10^{-4}$ | $C_{11}$ | $1.2600 \times 10^{-3}$ | $C_{13}$ | $4.8722 \times 10^{-4}$ |
| $C_{15}$ | $3.4087 \times 10^{-6}$ | | | | |

Displacement and tilt(1)

| X | 0.00 | Y | 0.00 | Z | 0.80 |
| α | 0.48 | β | 0.00 | γ | 0.00 |

-continued

|   |   |   |   |   |   |   |   |
|---|---|---|---|---|---|---|---|
|   |   | Displacement and tilt(2) |   |   |   |   |   |
| X | 0.00 | Y | 0.01 | Z | 3.98 |   |   |
| α | −39.25 | β | 0.00 | γ | 0.00 |   |   |
|   |   | Displacement and tilt(3) |   |   |   |   |   |
| X | 0.00 | Y | 6.08 | Z | 2.75 |   |   |
| α | 45.31 | β | 0.00 | γ | 0.00 |   |   |
|   |   | Displacement and tilt(4) |   |   |   |   |   |
| X | 0.00 | Y | 7.05 | Z | −2.38 |   |   |
| α | 18.60 | β | 0.00 | γ | 0.00 |   |   |
|   |   | Displacement and tilt(5) |   |   |   |   |   |
| X | 0.00 | Y | 9.80 | Z | 0.08 |   |   |
| α | 49.52 | β | 0.00 | γ | 0.00 |   |   |
|   |   | Displacement and tilt(6) |   |   |   |   |   |
| X | 0.00 | Y | 10.18 | Z | 0.40 |   |   |
| α | 49.52 | β | 0.00 | γ | 0.00 |   |   |
|   |   | Displacement and tilt(7) |   |   |   |   |   |
| X | 0.00 | Y | 15.72 | Z | 5.12 |   |   |
| α | 0.57 | β | 0.00 | γ | 0.00 |   |   |
|   |   | Displacement and tilt(8) |   |   |   |   |   |
| X | 0.00 | Y | 25.39 | Z | −3.47 |   |   |
| α | −24.09 | β | 0.00 | γ | 0.00 |   |   |
|   |   | Displacement and tilt(9) |   |   |   |   |   |
| X | 0.00 | Y | 25.42 | Z | 6.76 |   |   |
| α | 0.00 | β | 0.00 | γ | 0.00 |   |   |

| Zooming Spaces | Wide-end | Standard | Tele-end |
|---|---|---|---|
| $d_2$ | 6.99995 | 3.55455 | 1.20000 |
| $d_4$ | 0.80000 | 2.89816 | 6.59995 |

EXAMPLE 2

| Surface No. | Radius of curvature | Surface separation | Displacement and tilt | Refractive index | Abbe's No. |
|---|---|---|---|---|---|
| Object plane | ∞ | 3000.00 |   |   |   |
| 1 | −11.14 | 1.24 |   | 1.5842 | 30.5 |
| 2 | 11.67 | $d_2$ |   |   |   |
| 3 | ASS① | 3.00 |   | 1.4924 | 57.6 |
| 4 | ASS② | $d_4$ |   |   |   |
| 5 | ∞ (HRS) |   |   |   |   |
| 6 | FFS① |   | (1) | 1.5254 | 56.2 |
| 7 | FFS② (RS) |   | (2) | 1.5254 | 56.2 |
| 8 | FFS① (RS) |   | (1) | 1.5254 | 56.2 |
| 9 | FFS③ |   | (3) |   |   |
| 10 | ∞ (MSK) | 20.78 | (4) |   |   |
| 11 | OCL | 47.78 |   |   |   |
| 12 | ∞ (EP) |   |   |   |   |

ASS①

| R | 5.86 |
|---|---|
| K | 0.0000 |
| A | $-8.4991 \times 10^{-4}$ |
| B | $-1.0411 \times 10^{-5}$ |
| C | $1.3159 \times 10^{-6}$ |

ASS②

| R | −7.81 |
|---|---|
| K | 0.0000 |
| A | $6.0656 \times 10^{-4}$ |
| B | $4.8824 \times 10^{-6}$ |
| C | $1.3023 \times 10^{-6}$ |

-continued

FFS①

| $C_4$ | $2.3369 \times 10^{-3}$ | $C_6$ | $-1.3528 \times 10^{-4}$ | $C_8$ | $2.1349 \times 10^{-4}$ |
|---|---|---|---|---|---|
| $C_{10}$ | $-4.1406 \times 10^{-5}$ | $C_{11}$ | $1.0040 \times 10^{-3}$ | $C_{13}$ | $4.8542 \times 10^{-5}$ |
| $C_{15}$ | $4.0149 \times 10^{-5}$ | $C_{17}$ | $4.4136 \times 10^{-5}$ | $C_{19}$ | $2.7527 \times 10^{-5}$ |
| $C_{21}$ | $3.8355 \times 10^{-6}$ |   |   |   |   |

FFS②

| $C_4$ | $8.9068 \times 10^{-3}$ | $C_6$ | $6.7547 \times 10^{-3}$ | $C_8$ | $9.6197 \times 10^{-4}$ |
|---|---|---|---|---|---|
| $C_{10}$ | $1.7154 \times 10^{-4}$ | $C_{11}$ | $9.9374 \times 10^{-4}$ | $C_{13}$ | $2.3684 \times 10^{-4}$ |
| $C_{15}$ | $2.4102 \times 10^{-4}$ | $C_{17}$ | $-7.1618 \times 10^{-5}$ | $C_{19}$ | $8.4108 \times 10^{-5}$ |
| $C_{21}$ | $5.7261 \times 10^{-6}$ |   |   |   |   |

FFS③

| $C_4$ | $-9.5974 \times 10^{-3}$ | $C_6$ | $-1.5589 \times 10^{-2}$ | $C_8$ | $-1.1372 \times 10^{-3}$ |
|---|---|---|---|---|---|
| $C_{10}$ | $-6.8569 \times 10^{-4}$ | $C_{11}$ | $1.5767 \times 10^{-3}$ | $C_{13}$ | $2.9766 \times 10^{-4}$ |
| $C_{15}$ | $2.7340 \times 10^{-4}$ | $C_{17}$ | $5.9875 \times 10^{-4}$ | $C_{19}$ | $9.0116 \times 10^{-5}$ |
| $C_{21}$ | $1.0921 \times 10^{-4}$ |   |   |   |   |

|   |   |   |   |   |   |
|---|---|---|---|---|---|
|   |   | Displacement and tilt(1) |   |   |   |
| X | 0.00 | Y | 4.11 | Z | 1.42 |
| α | 0.83 | β | 0.00 | γ | 0.00 |
|   |   | Displacement and tilt(2) |   |   |   |
| X | 0.00 | Y | 0.02 | Z | 4.40 |
| α | −26.77 | β | 0.00 | γ | 0.00 |
|   |   | Displacement and tilt(3) |   |   |   |
| X | 0.00 | Y | 10.13 | Z | 5.54 |
| α | 55.74 | β | 0.00 | γ | 0.00 |
|   |   | Displacement and tilt(4) |   |   |   |
| X | 0.00 | Y | 11.04 | Z | 6.17 |
| α | 55.58 | β | 0.00 | γ | 0.00 |

| Zooming Spaces | Wide-end | Standard | Tele-end |
|---|---|---|---|
| $d_2$ | 7.83905 | 3.82890 | 1.20000 |
| $d_4$ | 0.80000 | 3.26703 | 7.43905 |

EXAMPLE 3

| Surface No. | Radius of curvature | Surface separation | Displacement and tilt | Refractive index | Abbe's No. |
|---|---|---|---|---|---|
| Object plane | ∞ | 3000.00 |   |   |   |
| 1 | −14.29 | 1.20 |   | 1.5842 | 80.5 |
| 2 | 7.24 | $d_2$ |   |   |   |
| 3 | ASS① | 2.67 |   | 1.4924 | 57.6 |
| 4 | ASS② | $d_4$ |   |   |   |
| 5 | ∞ (HRS) |   |   |   |   |
| 6 | FFS① |   | (1) | 1.5254 | 56.2 |
| 7 | FFS② (RS) |   | (2) | 1.5254 | 56.2 |
| 8 | FFS③ (RS) |   | (3) | 1.5254 | 56.2 |
| 9 | FFS④ |   | (4) |   |   |
| 10 | ∞ (MSK) | 20.78 | (5) |   |   |
| 11 | OCL | 29.86 |   |   |   |
| 12 | ∞ (EP) |   |   |   |   |

-continued

ASS①

| | |
|---|---|
| R | 5.64 |
| K | 0.0000 |
| A | $-7.0498 \times 10^{-4}$ |
| B | $-7.5459 \times 10^{-5}$ |
| C | $5.2691 \times 10^{-6}$ |

ASS②

| | |
|---|---|
| R | -6.83 |
| K | $0.0000e + 000$ |
| A | $1.0789 \times 10^{-3}$ |
| B | $-7.5610 \times 10^{-5}$ |
| C | $6.3722 \times 10^{-6}$ |

FFS①

| | | | | | |
|---|---|---|---|---|---|
| $C_4$ | $-5.7553 \times 10^{-2}$ | $C_6$ | $-8.1248 \times 10^{-2}$ | $C_8$ | $-4.7730 \times 10^{-4}$ |
| $C_{10}$ | $1.9712 \times 10^{-3}$ | $C_{11}$ | $-6.9219 \times 10^{-4}$ | $C_{13}$ | $-7.1482 \times 10^{-4}$ |
| $C_{15}$ | $-4.9132 \times 10^{-4}$ | | | | |

FFS②

| | | | | | |
|---|---|---|---|---|---|
| $C_4$ | $-1.7485 \times 10^{-3}$ | $C_6$ | $-4.7051 \times 10^{-3}$ | $C_8$ | $-1.5112 \times 10^{-4}$ |
| $C_{10}$ | $1.7841 \times 10^{-5}$ | $C_{11}$ | $2.2289 \times 10^{-4}$ | $C_{13}$ | $2.3597 \times 10^{-4}$ |
| $C_{15}$ | $3.6727 \times 10^{-5}$ | | | | |

FFS③

| | | | | | |
|---|---|---|---|---|---|
| $C_4$ | $-8.9372 \times 10^{-4}$ | $C_6$ | $1.5599 \times 10^{-3}$ | $C_8$ | $-1.1534 \times 10^{-4}$ |
| $C_{10}$ | $-1.6218 \times 10^{-4}$ | $C_{11}$ | $-3.3857 \times 10^{-5}$ | $C_{13}$ | $-3.8888 \times 10^{-5}$ |
| $C_{15}$ | $3.4209 \times 10^{-6}$ | | | | |

FFS④

| | | | | | |
|---|---|---|---|---|---|
| $C_4$ | $3.4173 \times 10^{-2}$ | $C_6$ | $3.8829 \times 10^{-2}$ | $C_8$ | $-7.2783 \times 10^{-4}$ |
| $C_{10}$ | $-2.5525 \times 10^{-4}$ | $C_{11}$ | $9.2340 \times 10^{-5}$ | $C_{13}$ | $2.3184 \times 10^{-4}$ |
| $C_{15}$ | $1.4697 \times 10^{-4}$ | | | | |

Displacement and tilt(1)

| X | 0.00 | Y | 0.00 | Z | 1.57 |
|---|---|---|---|---|---|
| α | -0.01 | β | 0.00 | γ | 0.00 |

Displacement and tilt(2)

| X | 0.00 | Y | 0.01 | Z | 4.98 |
|---|---|---|---|---|---|
| α | -49.01 | β | 0.00 | γ | 0.00 |

Displacement and tilt(3)

| X | 0.00 | Y | 9.50 | Z | 6.32 |
|---|---|---|---|---|---|
| α | 41.01 | β | 0.00 | γ | 0.00 |

Displacement and tilt(4)

| X | 0.00 | Y | 9.50 | Z | 0.55 |
|---|---|---|---|---|---|
| α | 0.13 | β | 0.00 | γ | 0.00 |

Displacement and tilt(5)

| X | 0.00 | Y | 9.50 | Z | 0.38 |
|---|---|---|---|---|---|
| α | 180.00 | β | 0.00 | γ | 0.00 |

| Zooming Spaces | Wide-end | Standard | Tele-end |
|---|---|---|---|
| $d_2$ | 8.15555 | 4.39096 | 2.00000 |
| $d_4$ | 1.10000 | 3.38907 | 7.25555 |

EXAMPLE 4

| Surface No. | Radius of curvature | Surface separation | Displacement and tilt | Refractive index | Abbe's No. |
|---|---|---|---|---|---|
| Object plane | ∞ | 3000.00 | | | |
| 1 | -11.50 | 1.20 | | 1.5842 | 30.5 |
| 2 | 5.88 | $d_2$ | | | |
| 3 | ASS① | 3.00 | | 1.4924 | 57.6 |
| 4 | ASS② | $d_4$ | | | |
| 5 | ∞ (HRS) | | | | |
| 6 | FFS① | | (1) | 1.5254 | 56.2 |
| 7 | FFS② (RS) | | (2) | 1.5254 | 56.2 |
| 8 | FFS③ (RS) | | (3) | 1.5254 | 56.2 |
| 9 | FFS④ (RS) | | (4) | 1.5254 | 56.2 |
| 10 | FFS⑤ | | (5) | | |
| 11 | ∞ (MSK) | 20.78 | (6) | | |
| 12 | OCL | 36.88 | | | |
| 13 | ∞ (EP) | | | | |

ASS①

| | |
|---|---|
| R | 4.48 |
| K | 0.0000 |
| A | $5.5018 \times 10^{-4}$ |
| B | $-1.0835 \times 10^{-3}$ |
| C | $2.4690 \times 10^{-5}$ |

ASS②

| | |
|---|---|
| R | -5.25 |
| K | 0.0000 |
| A | $2.3168 \times 10^{-3}$ |
| B | $-2.0626 \times 10^{-4}$ |
| C | $1.2813 \times 10^{-5}$ |

FFS①

| | | | | | |
|---|---|---|---|---|---|
| $C_4$ | $1.4743 \times 10^{-1}$ | $C_6$ | $-1.4090 \times 10^{-1}$ | $C_8$ | $3.8963 \times 10^{-3}$ |
| $C_{10}$ | $-6.7672 \times 10^{-4}$ | $C_{11}$ | $7.7369 \times 10^{-5}$ | $C_{13}$ | $-9.1587 \times 10^{-5}$ |
| $C_{15}$ | $3.2032 \times 10^{-3}$ | | | | |

FFS②

| | | | | | |
|---|---|---|---|---|---|
| $C_4$ | $-8.4766 \times 10^{-3}$ | $C_8$ | $-4.7899 \times 10^{-3}$ | $C_8$ | $5.6605 \times 10^{-4}$ |
| $C_{10}$ | $-5.2847 \times 10^{-4}$ | $C_{11}$ | $4.1384 \times 10^{-4}$ | $C_{13}$ | $4.7154 \times 10^{-4}$ |
| $C_{15}$ | $2.8820 \times 10^{-4}$ | | | | |

FFS③

| | | | | | |
|---|---|---|---|---|---|
| $C_4$ | $-1.1549 \times 10^{-2}$ | $C_6$ | $-2.6750 \times 10^{-3}$ | $C_8$ | $-2.8887 \times 10^{-4}$ |
| $C_{10}$ | $-8.8526 \times 10^{-4}$ | $C_{11}$ | $6.8703 \times 10^{-5}$ | $C_{13}$ | $7.2649 \times 10^{-6}$ |
| $C_{15}$ | $3.4284 \times 10^{-5}$ | | | | |

FFS④

| | | | | | |
|---|---|---|---|---|---|
| $C_4$ | $-6.7186 \times 10^{-3}$ | $C_6$ | $-6.4824 \times 10^{-4}$ | $C_8$ | $-7.7840 \times 10^{-4}$ |
| $C_{10}$ | $-8.5329 \times 10^{-4}$ | $C_{11}$ | $3.1754 \times 10^{-4}$ | $C_{13}$ | $1.0191 \times 10^{-4}$ |
| $C_{15}$ | $1.4334 \times 10^{-4}$ | | | | |

FFS⑤

| | | | | | |
|---|---|---|---|---|---|
| $C_4$ | $-2.6315 \times 10^{-2}$ | $C_6$ | $-2.1715 \times 10^{-2}$ | $C_8$ | $-2.0258 \times 10^{-3}$ |
| $C_{10}$ | $-3.3550 \times 10^{-3}$ | $C_{11}$ | $7.6765 \times 10^{-4}$ | $C_{13}$ | $3.0974 \times 10^{-4}$ |
| $C_{15}$ | $1.5156 \times 10^{-3}$ | | | | |

Displacement and tilt(1)

| X | 0.00 | Y | 0.00 | Z | 1.48 |
|---|---|---|---|---|---|
| α | 0.68 | β | 0.00 | γ | 0.00 |

Displacemeent and tilt(2)

| X | 0.00 | Y | 0.01 | Z | 4.48 |
|---|---|---|---|---|---|
| α | -43.59 | β | 0.00 | γ | 0.00 |

-continued

| | | | | | | |
|---|---|---|---|---|---|---|
| | | | Displacement and tilt(3) | | | |
| X | 0.00 | Y | 6.35 | Z | 4.20 | |
| α | 49.03 | β | 0.00 | γ | 0.00 | |
| | | | Displacement and tilt(4) | | | |
| X | 0.00 | Y | 5.67 | Z | −2.80 | |
| α | 47.16 | β | 0.00 | γ | 0.00 | |
| | | | Displacement and tilt(5) | | | |
| X | 0.00 | Y | 9.26 | Z | −2.73 | |
| α | 86.65 | β | 0.00 | γ | 0.00. | |
| | | | Displacement and tilt(6) | | | |
| X | 0.00 | Y | 9.77 | Z | −2.73 | |
| α | 90.00 | β | 0.00 | γ | 0.00 | |

| Zooming Spaces | Wide-end | Standard | Tele-end |
|---|---|---|---|
| $d_2$ | 6.11892 | 3.15900 | 1.20000 |
| $d_4$ | 0.80000 | 2.54034 | 5.71892 |

EXAMPLE 5

| Surface No. | Radius of curvature | Surface separation | Displacement and tilt | Refractive index | Abbe's No. |
|---|---|---|---|---|---|
| Object plane | ∞ | 3000.00 | | | |
| 1 | −21.44 | 1.20 | | 1.5842 | 30.5 |
| 2 | 10.79 | $d_2$ | | | |
| 3 | ASS① | 3.00 | | 1.4924 | 57.6 |
| 4 | ASS② | $d_4$ | | | |
| 5 | ∞ (HRS) | | | | |
| 6 | FFS① | | (1) | 1.5254 | 56.2 |
| 7 | FFS② (RS) | | (2) | 1.5254 | 56.2 |
| 8 | FFS① (RS) | | (1) | 1.5254 | 56.2 |
| 9 | FFS③ (RS) | | (3) | 1.5254 | 56.2 |
| 10 | FFS① | | (1) | | |
| 11 | (MSK) | 21.22 | (4) | | |
| 12 | OCL | 38.49 | | | |
| 13 | ∞ (EP) | | | | |

ASS①

| | |
|---|---|
| R | 9.47 |
| K | 0.0000 |
| A | $-8.2774 \times 10^{-4}$ |
| B | $-2.6238 \times 10^{-5}$ |
| C | $-5.7408 \times 10^{-6}$ |

ASS②

| | |
|---|---|
| R | −7.34 |
| K | 0.0000 |
| A | $9.5056 \times 10^{-5}$ |
| B | $-6.2435 \times 10^{-5}$ |
| C | $-1.2735 \times 10^{-6}$ |

FFS①

| | | | | | |
|---|---|---|---|---|---|
| $C_4$ | $-6.6220 \times 10^{-3}$ | $C_6$ | $1.4741 \times 10^{-3}$ | $C_8$ | $6.9888 \times 10^{-4}$ |
| $C_{10}$ | $1.1582 \times 10^{-4}$ | $C_{11}$ | $3.0602 \times 10^{-4}$ | $C_{13}$ | $-6.9034 \times 10^{-5}$ |
| $C_{15}$ | $-6.4460 \times 10^{-5}$ | | | | |

FFS②

| | | | | | |
|---|---|---|---|---|---|
| $C_4$ | $-1.7484 \times 10^{-3}$ | $C_6$ | $2.8690 \times 10^{-3}$ | $C_6$ | $8.5869 \times 10^{-4}$ |
| $C_{10}$ | $8.0024 \times 10^{-5}$ | $C_{11}$ | $2.2351 \times 10^{-4}$ | $C_{13}$ | $2.6879 \times 10^{-5}$ |
| $C_{15}$ | $1.6036 \times 10^{-5}$ | | | | |

FFS③

| | | | | | |
|---|---|---|---|---|---|
| $C_4$ | $-7.2172 \times 10^{-3}$ | $C_6$ | $-1.8257 \times 10^{-3}$ | $C_8$ | $2.0960 \times 10^{-4}$ |
| $C_{10}$ | $2.7943 \times 10^{-4}$ | $C_{11}$ | $8.6439 \times 10^{-5}$ | $C_{13}$ | $-7.7192 \times 10^{-5}$ |
| $C_{15}$ | $-1.4361 \times 10^{-5}$ | | | | |

| | | | Displacement and tilt(1) | | | |
|---|---|---|---|---|---|---|
| X | 0.00 | Y | 5.64 | Z | 1.44 | |
| α | 0.23 | β | 0.00 | γ | 0.00 | |
| | | | Displacement and tilt(2) | | | |
| X | 0.00 | Y | 0.01 | Z | 4.61 | |
| α | −30.26 | β | 0.00 | γ | 0.00 | |
| | | | Displacement and tilt(3) | | | |
| X | 0.00 | Y | 10.72 | Z | 4.25 | |
| α | 30.37 | β | 0.00 | γ | 0.00 | |
| | | | Displacement and tilt(4) | | | |
| X | 0.00 | Y | 10.74 | Z | 0.94 | |
| α | 0.00 | β | 0.00 | γ | 0.00 | |

| Zooming Spaces | Wide-end | Standard | Tele-end |
|---|---|---|---|
| $d_2$ | 9.35799 | 4.37801 | 1.20000 |
| $d_4$ | 0.80000 | 3.87920 | 8.95799 |

EXAMPLE 6

| Surface No. | Radius of curvature | Surface separation | Displacement and tilt | Refractive index | Abbe's No. |
|---|---|---|---|---|---|
| Object plane | ∞ | 3000.00 | | | |
| 1 | −13.14 | 1.20 | | 1.5842 | 30.5 |
| 2 | 9.36 | $d_2$ | | | |
| 3 | ASS① | 3.00 | | 1.4924 | 57.6 |
| 4 | ASS② | $d_4$ | | | |
| 5 | ∞ (HRS) | | | | |
| 6 | FFS① | | (1) | 1.5254 | 56.2 |
| 7 | FFS② (RS) | | (2) | 1.5254 | 56.2 |
| 8 | FFS③ (RS) | | (3) | 1.5254 | 56.2 |
| 9 | FFS④ (RS) | | (4) | 1.5254 | 56.2 |
| 10 | FFS⑤ | | (5) | | |
| 11 | ∞ (MSK) | 20.78 | (6) | | |
| 12 | OCL | 36.88 | | | |
| 13 | ∞ (EP) | | | | |

ASS①

| | |
|---|---|
| R | 5.82 |
| K | 0.0000 |
| A | $-1.3958 \times 10^{-4}$ |
| B | $-1.1048 \times 10^{-4}$ |
| C | $3.2206 \times 10^{-6}$ |

ASS②

| | |
|---|---|
| R | −7.20 |
| K | 0.0000 |
| A | $1.3132 \times 10^{-3}$ |
| B | $-9.6016 \times 10^{-5}$ |
| C | $3.5317 \times 10^{-6}$ |

FFS①

| | | | | | |
|---|---|---|---|---|---|
| $C_4$ | $-3.6931 \times 10^{-2}$ | $C_5$ | $2.4034 \times 10^{-3}$ | $C_6$ | $-3.8156 \times 10^{-2}$ |
| $C_7$ | $5.0183 \times 10^{-4}$ | $C_8$ | $-5.5562 \times 10^{-4}$ | $C_{10}$ | $2.4955 \times 10^{-4}$ |
| $C_{11}$ | $-7.6246 \times 10^{-4}$ | $C_{12}$ | $-1.1638 \times 10^{-4}$ | $C_{13}$ | $-6.3406 \times 10^{-4}$ |
| $C_{14}$ | $1.5782 \times 10^{-5}$ | $C_{15}$ | $1.1475 \times 10^{-4}$ | | |

-continued

FFS(2)

| | | | | | |
|---|---|---|---|---|---|
| $C_4$ | $-1.2537 \times 10^{-4}$ | $C_5$ | $7.4897 \times 10^{-4}$ | $C_6$ | $1.7761 \times 10^{-4}$ |
| $C_7$ | $1.8387 \times 10^{-4}$ | $C_8$ | $-1.9272 \times 10^{-4}$ | $C_{10}$ | $8.9267 \times 10^{-5}$ |
| $C_{11}$ | $1.0683 \times 10^{-4}$ | $C_{12}$ | $-1.2218 \times 10^{-5}$ | $C_{13}$ | $1.6164 \times 10^{-4}$ |
| $C_{14}$ | $9.2102 \times 10^{-6}$ | $C_{15}$ | $8.2661 \times 10^{-5}$ | | |

FFS(3)

| | | | | | |
|---|---|---|---|---|---|
| $C_4$ | $6.7137 \times 10^{-4}$ | $C_5$ | $4.2997 \times 10^{-4}$ | $C_6$ | $-1.2873 \times 10^{-3}$ |
| $C_7$ | $1.0858 \times 10^{-4}$ | $C_8$ | $8.3744 \times 10^{-5}$ | $C_{10}$ | $1.0231 \times 10^{-4}$ |
| $C_{11}$ | $-9.6387 \times 10^{-5}$ | $C_{12}$ | $4.0612 \times 10^{-5}$ | $C_{13}$ | $-9.0058 \times 10^{-5}$ |
| $C_{14}$ | $7.3927 \times 10^{-6}$ | $C_{15}$ | $-3.3187 \times 10^{-5}$ | | |

FFS(4)

| | | | | | |
|---|---|---|---|---|---|
| $C_4$ | $4.8422 \times 10^{-3}$ | $C_5$ | $-3.3065 \times 10^{-4}$ | $C_6$ | $-4.9490 \times 10^{-5}$ |
| $C_7$ | $-3.1687 \times 10^{-4}$ | $C_8$ | $2.3077 \times 10^{-4}$ | $C_{10}$ | $-3.8185 \times 10^{-4}$ |
| $C_{11}$ | $8.6746 \times 10^{-6}$ | $C_{12}$ | $-3.8790 \times 10^{-6}$ | $C_{13}$ | $8.7123 \times 10^{-5}$ |
| $C_{14}$ | $8.9056 \times 10^{-5}$ | $C_{15}$ | $2.5656 \times 10^{-4}$ | | |

FFS(5)

| | | | | | |
|---|---|---|---|---|---|
| $C_4$ | $1.4423 \times 10^{-3}$ | $C_5$ | $-2.7180 \times 10^{-3}$ | $C_6$ | $-2.7696 \times 10^{-2}$ |
| $C_7$ | $-4.5148 \times 10^{-3}$ | $C_8$ | $1.4260 \times 10^{-3}$ | $C_{10}$ | $-1.1338 \times 10^{-3}$ |
| $C_{11}$ | $2.5537 \times 10^{-4}$ | $C_{12}$ | $-3.0227 \times 10^{-4}$ | $C_{13}$ | $-5.7820 \times 10^{-4}$ |
| $C_{14}$ | $7.9487 \times 10^{-4}$ | $C_{15}$ | $6.5970 \times 10^{-4}$ | | |

Displacement and tilt(1)

| | | | | | | |
|---|---|---|---|---|---|---|
| X | 0.00 | Y | 0.01 | Z | 1.06 | |
| α | 0.01 | β | 0.00 | γ | 0.00 | |

Displacement and tilt(2)

| | | | | | | |
|---|---|---|---|---|---|---|
| X | 0.00 | Y | 0.00 | Z | 4.71 | |
| α | −45.00 | β | 0.00 | γ | 0.00 | |

Displacement and tilt(3)

| | | | | | | |
|---|---|---|---|---|---|---|
| X | 0.00 | Y | 6.81 | Z | 4.72 | |
| α | 45.00 | β | 0.00 | γ | 0.00 | |

Displacement and tilt(4)

| | | | | | | |
|---|---|---|---|---|---|---|
| X | 0.00 | Y | 6.80 | Z | −1.45 | |
| α | 0.00 | β | 45.00 | γ | 0.00 | |

Displacement and tilt(5)

| | | | | | | |
|---|---|---|---|---|---|---|
| X | −2.59 | Y | 6.82 | Z | −1.46 | |
| α | 0.00 | β | 90.00 | 7 | 0.00 | |

Displacement and tilt(6)

| | | | | | | |
|---|---|---|---|---|---|---|
| X | −3.49 | Y | 6.82 | Z | −1.45 | |
| α | 0.00 | β | 90.00 | γ | 0.00 | |

| Zooming Spaces | Wide-end | Standard | Tele-end |
|---|---|---|---|
| $d_2$ | 7.61614 | 3.69770 | 1.20000 |
| $d_4$ | 0.42524 | 2.83762 | 6.84138 |

Figure 15:
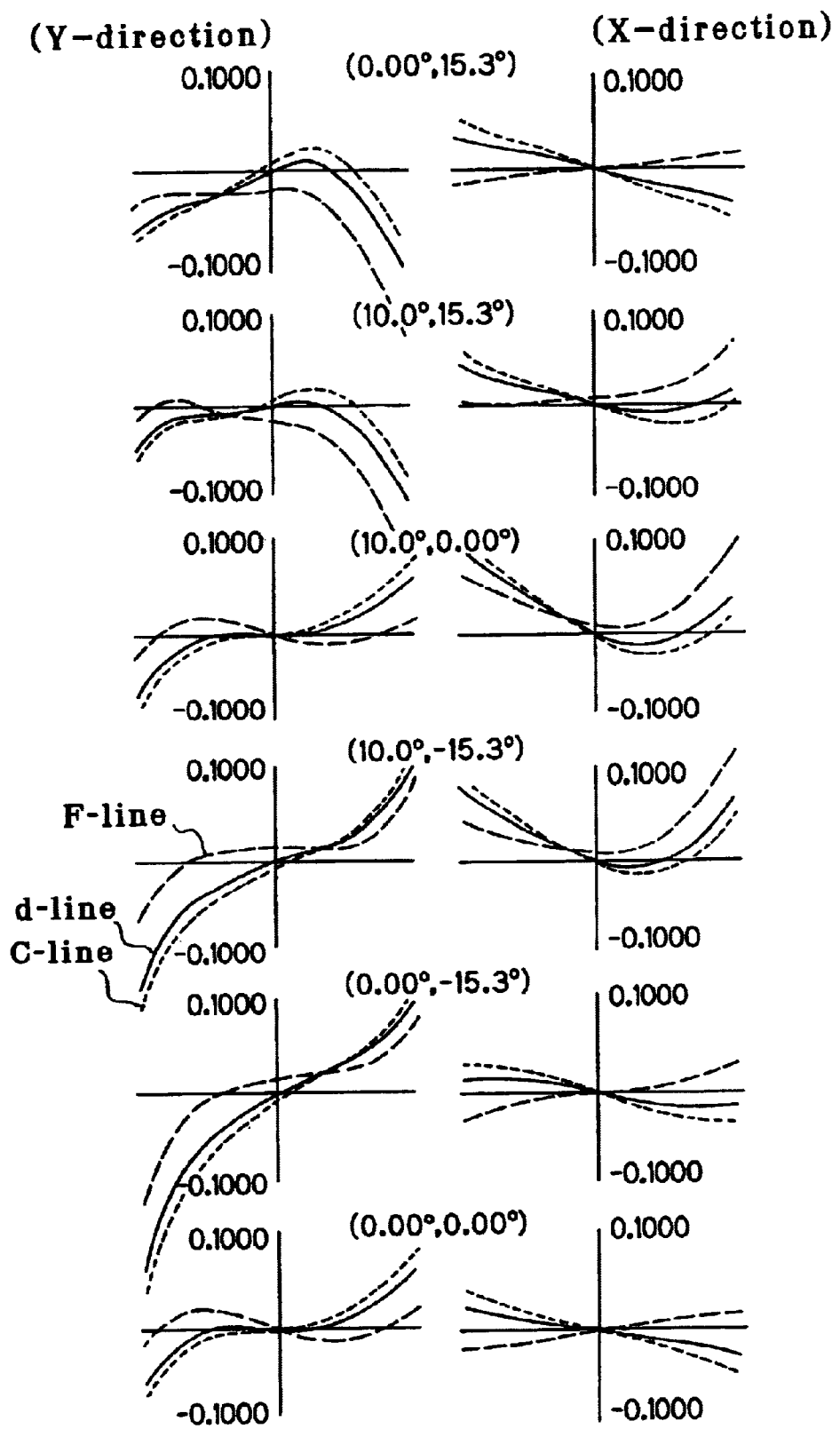
FIG. 15 is an aberrational diagram illustrating lateral aberrations produced at the wide-angle end in Example 1.
Figure 16:
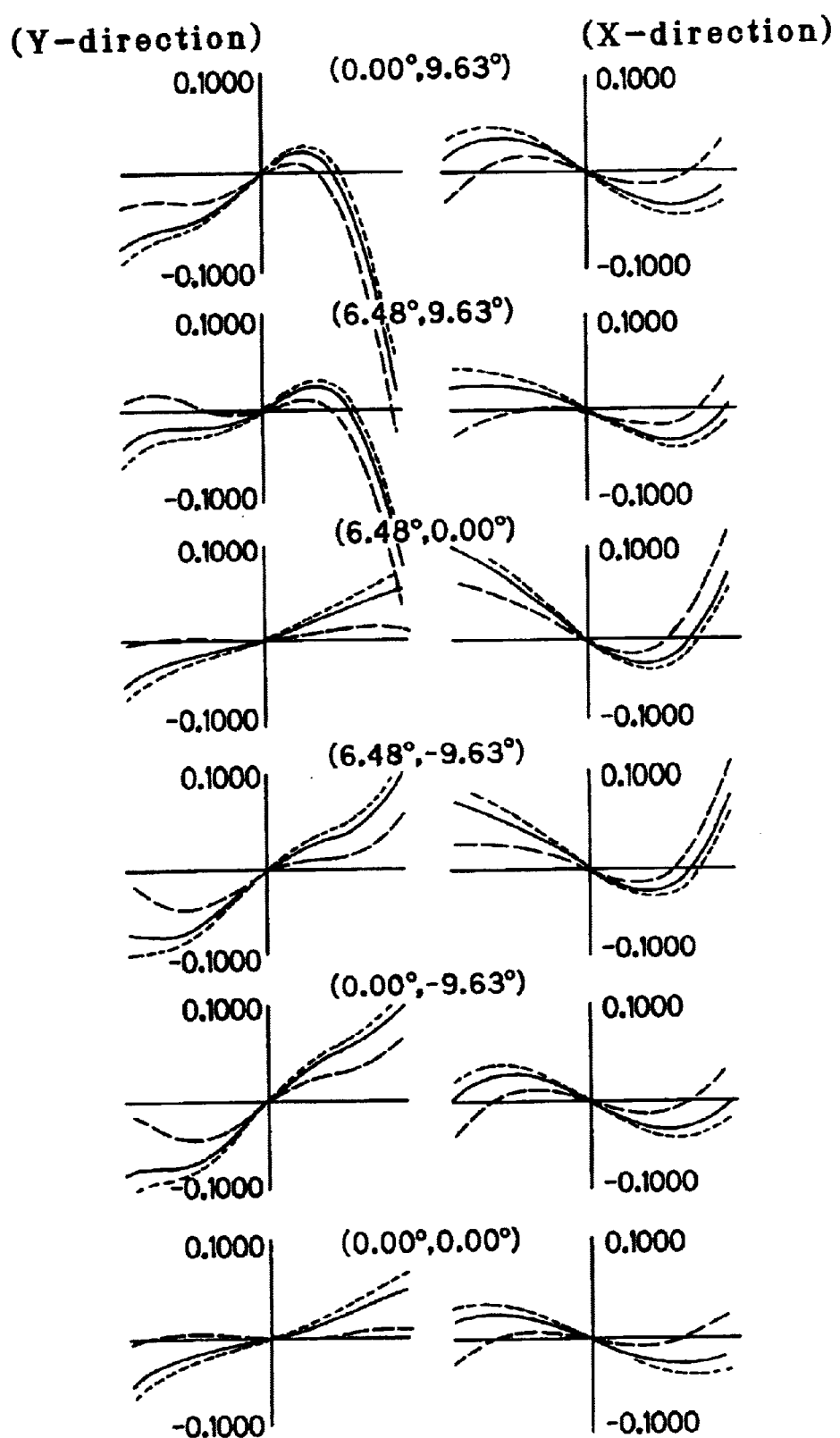
FIG. 16 is an aberrational diagram illustrating lateral aberrations produced at the standard position in Example 1.
Figure 17:
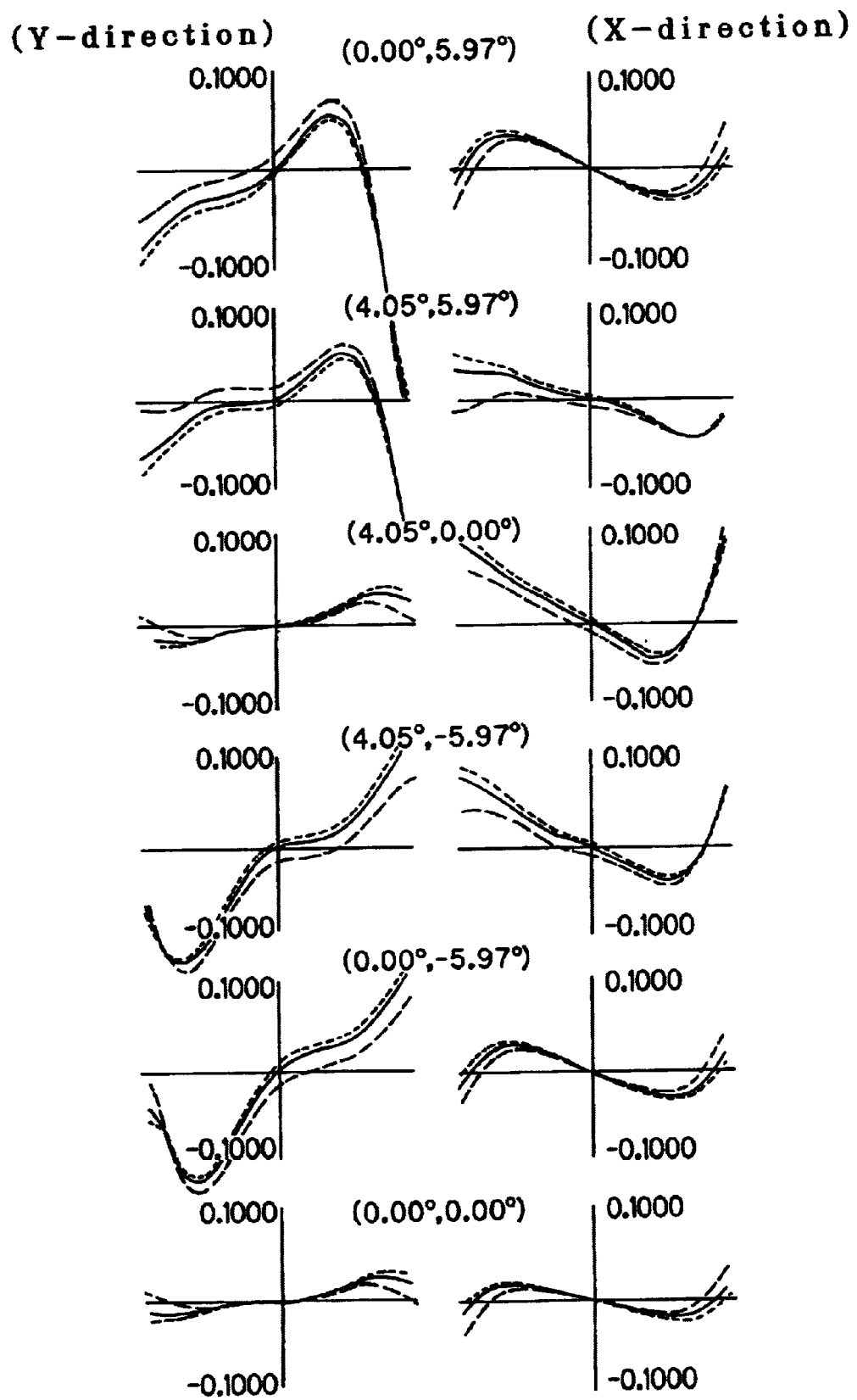
FIG. 17 is an aberrational diagram illustrating lateral aberrations produced at the telephoto end in Example 1.

FIGS. 15 to 17 graphically show lateral aberrations in the above-described Example 1 at the wide-angle end, standard position and telephoto end, respectively. In these diagrams showing lateral aberrations, the numerals in the parentheses denote (horizontal (X-direction) field angle, vertical (Y-direction) field angle), and lateral aberrations at the field angles are shown. It should be noted that these diagrams show lateral aberrations on the image-formation plane of an image-forming system having an ideal lens with a focal length of 31.62 millimeters placed at a point apart from the pupil plane (EP) by 31.62 millimeters (=10001/2 millimeters)

It should be noted that each aberrational diagram shows, in order from the bottom toward the top of the diagram, lateral aberrations in the center of the image field; lateral aberrations at the position of minus about 70% of the image height on the Y-axis; lateral aberrations at the position of about 70% of the image height in the X-axis direction and minus about 70% of the image height in the Y-axis direction; lateral aberrations at the position of about 70% of the image height on the X-axis; lateral aberrations at the position of about 70% of the image height in the X-axis direction and about 70% of the image height in the Y-axis direction; and lateral aberrations at the position of about 70% of the image height on the Y-axis.

The values concerning the conditions (1) to (52) in the above-described Examples 1 to 6 are shown below.

| | Ex. 1 | Ex. 2 | Ex. 3 | Ex. 4 | Ex. 5 | Ex. 6 |
|---|---|---|---|---|---|---|
| d | 16.0 | 17.3 | 18.1 | 15.6 | 19.0 | 17.0 |
| $f_w$ | 8.43 | 8.43 | 8.43 | 8.43 | 8.43 | 8.43 |
| $\tan\theta_w$ | 0.466 | 0.466 | 0.466 | 0.466 | 0.466 | 0.466 |
| Z | 2.40 | 2.40 | 2.40 | 2.40 | 2.40 | 2.40 |
| $f_{move}$ | 5.26 | 6.15 | 5.14 | 4.21 | 7.73 | 5.9 |
| dp | 3.2 | 3 | 3.4 | 3 | 3.2 | 3.7 |

| Conditions | Ex. 1 | Ex. 2 | Ex. 3 | Ex. 4 | Ex. 5 | Ex. 6 |
|---|---|---|---|---|---|---|
| (1), (2) | 1.69 | 1.83 | 1.92 | 1.65 | 2.01 | 1.80 |
| (3), (5) | | | | | | |
| (4), (6) | 0.81 | 0.76 | 0.87 | 0.76 | 0.81 | 0.94 |
| (9), (10) | | | | | | |
| (21), (22) | | | | | | |
| (7), (8) | 0.62 | 0.73 | 0.61 | 0.50 | 0.92 | 0.70 |
| (11), (12), (13) | | | | | | |
| (14), (15), (16) | | | | | | |
| (35), (36) | 39.4 | | | | | |
| (37), (38) | 29.3 | | | | | |
| (39), (40) | 40.5 | | | | | |
| (17), (18) | | 27.2 | | | | |
| (19), (20) | | 55.6 | | | | |
| (23), (24) | | | 49.0 | | | |
| (25), (26) | | | 41.0 | | | |
| (27), (28) | | | 180.0 | | | |
| (29), (30) | | | | 43.8 | | |
| (31), (32) | | | | 41.7 | | |
| (33), (34) | | | | 90.0 | | |
| (41), (42) | | | | | 30.4 | |
| (43), (44) | | | | | 30.7 | |
| (45), (46) | | | | | 180.0 | |
| (47), (48) | | | | | | 45.0 |
| (49), (50) | | | | | | 45.0 |
| (51), (52) | | | | | | 90.0 |

Figure 18A:
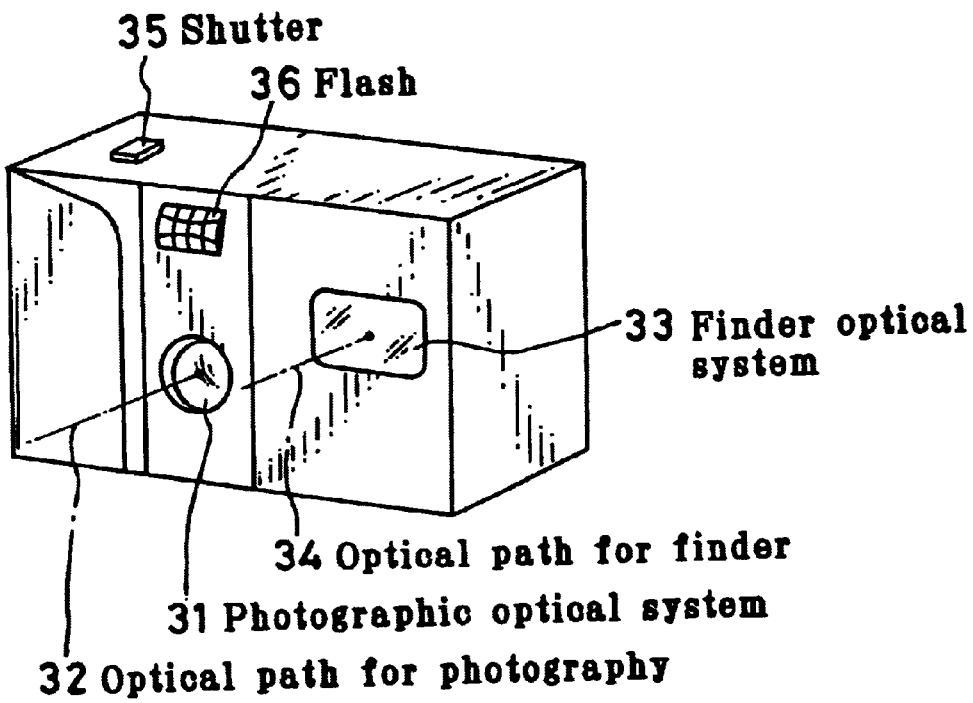
FIGS. 18(a) and 18(b) are diagrams for describing an electronic camera having a finder optical system according to the present invention.
Figure 18B:
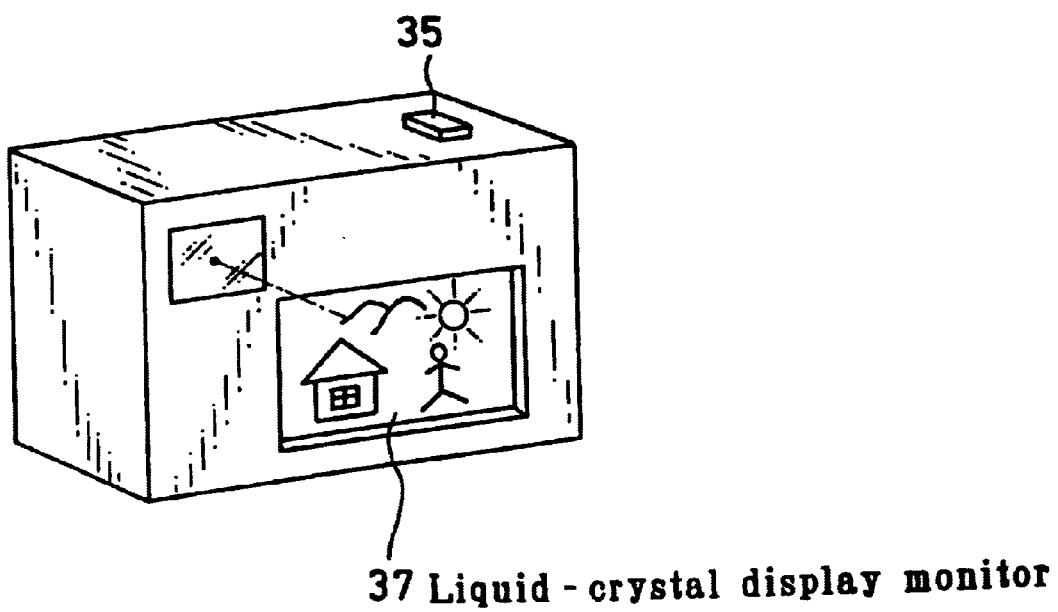

The above-described finder optical system according to the present invention can be used as a finder optical system 33 of an electronic camera as shown for example in FIG. 18. In FIG. 18, part (a) is a perspective view of the electronic camera as viewed from the front thereof, and part (b) is a perspective view of the electronic camera as viewed from the rear thereof. FIG. 19 is a ray path diagram showing the optical system of the electronic camera. The electronic camera includes a photographic optical system 31 having an optical path 32 for photography; a finder optical system 33 having an optical path 34 for a finder; a shutter 35; a flash 36; and a liquid-crystal display monitor 37. The finder optical system 33 includes an objective optical system Ob and an ocular optical system Oc as in Example 1 shown in FIG. 1, for example. The finder optical system 33 is of the type which enables the visual field to be viewed directly. It should be noted that a transparent finder window cover 41 is placed on the entrance side of the objective optical system Ob in the finder optical system 33.

The photographic optical system 31 includes an objective optical system 38 for photography, a filter 39, e.g. an infrared cutoff filter, and an electronic image pickup device 40 placed in the image-formation plane of the objective optical system 38. A subject image taken by the electronic image pickup device 40 or an image recorded in a recording device is displayed on the liquid-crystal display monitor 37.

It should be noted that the finder optical system according to the present invention can be used as a finder optical system of a compact camera for photography in which a photographic film is disposed in place of the electronic image pickup device 40 to take a picture of a subject.

The present invention makes it possible to provide a thin, high-performance finder optical system favorably corrected for aberrations due to decentration by appropriately disposing rotationally asymmetric surfaces.

I claim:

1. A finder optical system comprising, in order from an object side thereof:
    an objective optical system having a positive refracting power;
    an image-inverting optical system for erecting an intermediate image formed by said objective optical system; and
    an ocular optical system having a positive refracting power;
    wherein said objective optical system has:
        at least two movable units moving when zooming is performed; and
        a prism placed on an object side of the intermediate image formed by said objective optical system, said prism including at least one reflecting surface having a rotationally asymmetric surface configuration;
        said image-inverting optical system having at least one reflecting surface formed from a roof surface;
        said finder optical system satisfying the following condition:

$$1.0 < d/(f_W \cdot \tan \theta_w \cdot Z) < 2.5 \qquad (1)$$

where d is a distance from an entrance surface of said objective optical system to a first reflecting surface of said image-inverting optical system at the wide-angle end; $f_W$ is a focal length of said objective optical system at a wide-angle end; $\theta_w$ is a maximum field angle of said objective optical system at the wide-angle end; and Z is a zoom ratio.

2. A finder optical system according to claim 1, wherein said roof surface is placed on a pupil side of said intermediate image.

3. A finder optical system according to claim 1, wherein a number of reflection in said prism is three.

4. A finder optical system according to claim 1, wherein the number of said movable units is two.

5. A finder optical system comprising, in order from an object side thereof:
    an objective optical system having a positive refracting power;
    an image-inverting optical system for erecting an intermediate image formed by said objective optical system; and
    an ocular optical system having a positive refracting power;
    wherein said objective optical system includes:
        an optical system having at least two movable units moving when zooming is performed, said optical system having a positive composite power; and
        a prism placed on a pupil side of said optical system, said prism including an image-inverting function, and said prism including at least one reflecting surface having a rotationally asymmetric surface configuration;
    wherein:
        at least either one of a first transmitting surface and first reflecting surface of said prism has a negative power, and a second transmitting surface of said prism has a positive power, and
        a composite focal length of said at least two movable units satisfies the following condition:

$$0.3 < f_{move}/f_W < 0.9 \qquad (7)$$

where $f_{move}$ is the composite focal length of said at least two movable units at a wide-angle end, and $f_W$ is a focal length of said objective optical system at the wide-angle end.

6. A finder optical system comprising, in order from an object side thereof:
    an objective optical system having a positive refracting power;
    an image-inverting optical system for erecting an intermediate image formed by said objective optical system; and
    an ocular optical system having a positive refracting power;
    wherein said objective optical system has:
        at least two movable units moving when zooming is performed; and
        a prism placed on an object side of the intermediate image formed by said objective optical system, said prism having three reflecting surfaces, wherein at least one of said reflecting surfaces has a rotationally asymmetric surface configuration, and
        wherein a composite focal length of said at least two movable units satisfies the following condition:

$$0.3 < f_{move}/f_W < 0.9 \qquad (13)$$

where $f_{move}$ is the composite focal length of said at least two movable units at a wide-angle end, and $f_W$ is a focal length of said objective optical system at the wide-angle end.

7. A finder optical system according to claim 1, 5 or 6, wherein said prism is placed closer to a pupil than any of said movable units.

8. An image pickup apparatus comprising:
    a photographic optical system having an optical path for photography; an
    a finder optical system having an optical path for a finder;
    wherein said finder optical system according to claim 1, 5, or 6, is used as said finder optical system.

9. A finder optical system according to claim 1, wherein a number of reflections in said prism is two.

10. A finder optical system according to claim 5, wherein a number of reflections in said prism is three.

11. A finder optical system according to claim 5, wherein a number of reflections in said prism is two.

12. A finder optical system according to claim 6 wherein at least two of the reflecting surfaces of said prism are formed from independent surfaces, respectively, which are separate from other transmitting and reflecting surfaces.

13. A finder optical system according to claim 6, wherein a first reflecting surface of said prism has a rotationally asymmetric surface configuration and is formed from an independent surface that is separate from other transmitting and reflecting surfaces.

14. A finder optical system according to claim 6, wherein a third reflecting surface of said prism has a rotationally asymmetric surface configuration and is formed from an independent surface that is separate from other transmitting and reflecting surfaces.

15. A finder optical system according to claim 6, wherein a second transmitting surface of said prism has a power.

16. A finder optical system according to claim 15, wherein the second transmitting surface has a rotationally asymmetric surface configuration.

17. A finder optical system according to claim 6, wherein an axial principal ray or a projective axial principal ray defined by projecting the axial principal ray onto a plane containing a part of the axial principal ray does not cross itself in said prism.

18. A finder optical system according to claim 6, wherein either one of a first transmitting surface and first reflecting surface of said prism has a negative power.

19. A finder optical system comprising, in order from an object side thereof:
   an objective optical system having a positive refracting power;
   an image-inverting optical system for erecting an intermediate image formed by said objective optical system; and
   an ocular optical system having a positive refracting power;
   wherein said objective optical system includes, in order from an object side thereof:
      a negative first unit;
      a positive second unit; and
      a negative third unit;
         wherein at least the first unit and the second unit are movable units moving when zooming is performed, and the third unit is formed from a prism including an image-inverting function, said prism including an entrance surface having a negative refracting power and at least one reflecting surface having a rotationally asymmetric surface configuration with a negative power.

20. A finder optical system comprising, in order from an object side thereof:
   an objective optical system having a positive refracting power;
   an image-inverting optical system for erecting an intermediate image formed by said objective optical system; and
   an ocular optical system having a positive refracting power;
   wherein said objective optical system includes, in order from an object side thereof:
      a negative first unit;
      a positive second unit; and
      a positive third unit;
   wherein at least the first unit and the second unit are movable units moving when zooming is performed, and the third unit is formed from a prism including an image-inverting function, said prism including at least one reflecting surface having a rotationally asymmetric surface configuration, and said prism including at least one transmitting surface or reflecting surface that has a negative power, said third unit having a principal point positioned on a pupil side of a plane where the intermediate image is formed, and
   wherein a composite focal length of said movable units satisfies the following condition:

$$0.3 < f_{move}/f_W < 0.9 \qquad (15)$$

where $f_{move}$ is the composite focal length of said movable units at a wide-angle end, and $f_W$ is a focal length of said objective optical system at the wide-angle end.

21. A finder optical system according to claim 19 or 20, wherein a second transmitting surface of said prism has a power.

22. A finder optical system according to claim 21, wherein said second transmitting surface has a rotationally asymmetric surface configuration.

23. A finder optical system according to claim 19 or 20, wherein a number of reflections in said prism is three.

24. A finder optical system according to claim 19 or 20, wherein when zooming is performed, said third unit is stationary with respect to a plane where the intermediate image is formed.

25. A finder optical system according to claim 19 or 20, wherein both said movable units are formed from refracting lenses.

26. A finder optical system according to claim 19 or 20, wherein said movable units are each formed from a single refracting lens.

27. A finder optical system according to claims or 19 or 20, wherein a number of reflections in said prism is two.

28. A finder optical system comprising, in order from an object side thereof:
   an objective optical system having a positive refracting power;
   an image-inverting optical system for erecting an intermediate image formed by said objective optical system; and
   an ocular optical system having a positive refracting power;
   wherein said objective optical system includes:
      an optical system having at least two movable units moving when zooming is performed, said optical system having a positive composite power; and
      a prism placed on a pupil side of said optical system, said prism including an image-inverting function, and said prism including at least one reflecting surface having a rotationally asymmetric surface configuration;
   wherein at least either one of a first transmitting surface and first reflecting surface of said prism has a negative power, and a second transmitting surface of said prism has a positive power, and
   wherein said finder optical system satisfies the following condition:

$$1.0 < d/(f_W \cdot \tan \theta_w \cdot Z) < 2.5 \qquad (1)$$

where d is a distance from an entrance surface of said objective optical system to a first reflecting surface of said image-inverting optical system at the wide-angle end; $f_W$ is a focal length of said objective optical system at a wide-angle end; $\theta_w$ is a maximum field angle of said objective optical system at the wide-angle end; and Z is a zoom ratio.

29. A finder optical system comprising, in order from an object side thereof:
   an objective optical system having a positive refracting power;
   an image-inverting optical system for erecting an intermediate image formed by said objective optical system; and
   an ocular optical system having a positive refracting power;
   wherein said objective optical system has:
      at least two movable units moving when zooming is performed; and
      a prism placed on an object side of the intermediate image formed by said objective optical system, said prism having three reflecting surfaces, wherein at least one of said reflecting surfaces has a rotationally asymmetric surface configuration, and
   wherein said finder optical system satisfies the following condition:

$$1.0 < d/(f_W \cdot \tan \theta_w \cdot Z) < 2.5 \quad (1)$$

where d is a distance from an entrance surface of said objective optical system to a first reflecting surface of said image-inverting optical system at a wide-angle end; $f_W$ is a focal length of said objective optical system at a wide-angle end; $\theta_w$ is a maximum field angle of said objective optical system at the wide-angle end; and Z is a zoom ratio.

30. A finder optical system comprising, in order from an object side thereof:
   an objective optical system having a positive refracting power;
   an image-inverting optical system for erecting an intermediate image formed by said objective optical system; and
   an ocular optical system having a positive refracting power;
   wherein said objective optical system includes, in order from an object side thereof:
      a negative first unit;
      a positive second unit; and
      a negative third unit;
   wherein at least the first unit and the second unit are movable units moving when zooming is performed, and the third unit is formed from a prism including an image-inverting function, said prism including at least one reflecting surface having a rotationally asymmetric surface configuration, and
   wherein said finder optical system satisfies the following condition:

$$1.0 < d/(f_W \cdot \tan \theta_w \cdot Z) < 2.5 \quad (1)$$

where d is a distance from an entrance Surface of said objective optical system to a first reflecting surface of said image-inverting optical system at a wide-angle end; $f_W$ is a focal length of said objective optical system at a wide-angle end; $\theta_w$ is a maximum field angle of said objective optical system at the wide-angle end; and Z is a zoom ratio.

31. A finder optical system comprising, in order from an object side thereof:
   an objective optical system having a positive refracting power;
   an image-inverting optical system for erecting an intermediate image formed by said objective optical system; and
   an ocular optical system having a positive refracting power;
   wherein said objective optical system includes, in order from an object side thereof:
      a negative first unit;
      a positive second unit; and
      a positive third unit;
   wherein at least the first unit and the second unit are movable units moving when zooming is performed, and the third unit is formed from a prism including an image-inverting function, said prism including at least one reflecting surface having a rotationally asymmetric surface configuration, and said prism including at least one transmitting surface or reflecting surface that has a negative power, said third unit having a principal point positioned on a pupil side of a plane where the intermediate image is formed, and
   wherein said finder optical system satisfies the following condition:

$$1.0 < d/(f_W \cdot \tan \theta_w \cdot Z) < 2.5 \quad (1)$$

where d is a distance from an entrance Surface of said objective optical system to a first reflecting surface of said image-inverting optical system at a wide-angle end; $f_W$ is a focal length of said objective optical system at a wide-angle end; $\theta_w$ is a maximum field angle of said objective optical system at the wide-angle end; and Z is a zoom ratio.

32. A finder optical system comprising, in order from an object side thereof;
   an objective optical system having a positive refracting power;
   an image-inverting optical system for erecting an intermediate image formed by said objective optical system; and
   an ocular optical system having a positive refracting power,
   wherein said objective optical system has:
      at least two movable units moving when zooming is performed; and
      a prism placed on an object side of the intermediate image formed by said objective optical system, said prism including at least one reflecting surface having a rotationally asymmetric surface configuration;
   said image-inverting optical system including a Porro prism;
   said finder optical system satisfying the following conditions:

$$1.0 < d/(f_W \cdot \tan \theta_w \cdot Z) < 2.5 \quad (3)$$

$$0.5 < dp/(f_W \cdot \tan \theta_w) < 1.1 \quad (4)$$

where d is a distance from an entrance surface of said objective optical system to a first reflecting surface of said image-inverting optical system at the wide-angle end; $f_W$ is a focal length of said objective optical system at a wide-angle end; $\theta_w$ is a maximum field angle of said objective optical system at the wide-angle end; Z is a zoom ratio; and dp is a distance from an entrance surface of said image-inverting optical system placed on the object side of said intermediate image to said first reflecting surface.

33. A finder optical system according to claim 32, wherein a second transmitting surface of said prism of said objective optical system has a power.

34. A finder optical system according to claim 33, wherein said second transmitting surface of said prism has a rotationally asymmetric surface configuration.

35. A finder optical system according to claim 32, wherein a first reflecting surface of said objective optical system has a power.

36. A finder optical system according to claim 32, wherein a number of reflections in said prism is two or three.

37. A finder optical system according to claim 32, wherein the number of said movable units is two.

38. A finder optical system according to claim 32, wherein said prism is placed closer to a pupil than any of said movable units.

39. An image pickup apparatus comprising:

a photographic optical system having an optical path for photography; and a finder optical system having an optical path for a finder, wherein said finder optical system according to claim 32, is used as said finder optical system.

40. A finder optical system according to claim 32, wherein a number of reflections in said prism is two.

41. A finder optical system comprising, in order from an object side thereof:

an objective optical system having a positive refracting power;

an image-inverting optical system for erecting an intermediate image formed by said objective optical system; and an ocular optical system having a positive refracting power;

wherein said objective optical system has:

at least two movable units moving when zooming is performed; and a prism placed on an object side of the intermediate image formed by said objective optical system, said prism having two reflecting surfaces, wherein at least one of said reflecting surfaces has a rotationally asymmetric surface configuration, and said prism constituting a part of said objective optical system and a part of said image-inverting optical system;

said finder optical system satisfying the following condition:

$$0.5 < dp/(f_W \cdot \tan \theta_W) < 1.1 \quad (9)$$

where $f_W$ is a focal length of said objective optical system at a wide-angle end; $\theta_W$ is a maximum field angle of said objective optical system at the wide-angle end; and dp is a distance from an entrance surface of said prism placed on the object side of the intermediate image to a first reflecting surface thereof.

42. A finder optical system comprising, in order from an object side thereof:

an objective optical system having a positive refracting power;

an image-inverting optical system for erecting an intermediate image formed by said objective optical system; and an ocular optical system having a positive refracting power, wherein said objective optical system has:

at least two movable units moving when zooming is performed; and a prism placed on an object side of the intermediate image formed by said objective optical system, said prism including two reflecting surfaces, both of said reflecting surfaces being independent of other transmitting and reflecting surfaces, at least one of said reflecting surfaces having a rotationally asymmetric surface configuration, said prism having an optical path in which an axial principal ray or a projective axial principal ray defined by projecting the axial principal ray onto a plane containing a part of the axial principal ray bends in a same direction with respect to a travel direction of light rays at said two reflecting surfaces, and said prism constituting a part of said objective optical system and a part of said image-inverting optical system;

said finder optical system satisfying the following condition:

$$0.5 < dp/(f_W \cdot \tan \theta_W) < 1.1 \quad (21)$$

where dp is a distance from an entrance surface of said prism placed on the object side of the intermediate image to a first reflecting surface thereof; $f_W$ is a focal length of said objective optical system at a wide-angle end; $\theta_W$ is a maximum field angle of said objective optical system at the wide-angle end.

43. A finder optical system according to claim 41, wherein a first reflecting surface of said prism has a rotationally asymmetric surface configuration and is formed from an independent surface that is separate from other transmitting and reflecting surfaces.

44. A finder optical system according to claim 41, wherein a second transmitting surface of said prism has a power.

45. A finder optical system according to claim 41, wherein the second transmitting surface has a rotationally asymmetric surface configuration.

46. A finder optical system according to claim 41, wherein an axial principal ray or a projective axial principal ray defined by projecting the axial principal ray onto a plane containing a part of the axial principal ray does not cross itself in said prism.

47. A finder optical system according to claim 41, wherein either one of a first transmitting surface and first reflecting surface of said prism has a negative power.

48. A finder optical system according to claim 41, wherein a composite focal length of said at least two movable units satisfies the following condition:

$$0.3 < f_{move}/f_W < 0.9 \quad (11)$$

where $f_{move}$ is the composite focal length of said at least two movable units at a wide-angle end, and $f_W$ is a focal length of said objective optical system at the wide-angle end.

49. A finder optical system according to claim 41 or 42, wherein said prism is placed closer to a pupil than any of said movable units.

50. An image pickup apparatus comprising:

a photographic optical system having an optical path for photography; and a finder optical system having an optical path for a finder;

wherein said finder optical system according to claim 41 or 42, is used as said finder optical system.

51. A finder optical system according to claim 42, wherein a first transmitting surface of said prism has a negative power.

52. A finder optical system according to claim 42, wherein a second transmitting surface of said prism has a positive power.

53. A finder optical system according to claim 42, wherein a reflection angle at a first reflecting surface of said prism satisfies the following condition:

$$30° < \theta_{B1} < 60° \quad (23)$$

where $\theta_{B1}$ is the reflection angle at the first reflecting surface.

54. A finder optical system according to claim 42, wherein a reflection angle at a second reflecting surface of said prism satisfies the following condition:

$$30° < \theta_{B2} < 60° \quad (25)$$

where $\theta_{B2}$ is the reflection angle at the second reflecting surface.

55. A finder optical system according to claim 42, wherein an exit angle of said prism with respect to an optical axis entering said objective optical system satisfies the following condition:

$$150° < \phi_B < 210° \quad (27)$$

where $\phi_B$ is the exit angle of said prism with respect to the optical axis entering said objective optical system.

56. A finder optical system according to claim 42, wherein a roof surface is disposed on a pupil side of the intermediate image.

57. A finder optical system according to claim 42, wherein said image-inverting optical system is a Porro prism.

* * * * *